US012051060B2

(12) United States Patent
Kikinis et al.

(10) Patent No.: US 12,051,060 B2
(45) Date of Patent: *Jul. 30, 2024

(54) DISTRIBUTED SMART WALLET COMMUNICATIONS PLATFORM

(71) Applicant: Liquineq AG, Zug (CH)

(72) Inventors: Dan Kikinis, Los Altos, CA (US); Ari Birger, Palo Alto, CA (US); Haim Dror, Tel Mond (IL); Aleksandr Vorobets, Fair Oaks, CA (US)

(73) Assignee: LIQUINEQ AG, Zug (CH)

( * ) Notice: Subject to any disclaimer, the term of this patent is extended or adjusted under 35 U.S.C. 154(b) by 88 days.

This patent is subject to a terminal disclaimer.

(21) Appl. No.: 17/867,584

(22) Filed: Jul. 18, 2022

(65) Prior Publication Data

US 2023/0017855 A1   Jan. 19, 2023

Related U.S. Application Data

(63) Continuation of application No. 16/875,595, filed on May 15, 2020, now Pat. No. 11,410,163, which is a continuation-in-part of application No. 16/796,159, filed on Feb. 20, 2020, now Pat. No. 11,042,804, which is a continuation-in-part of application No.
(Continued)

(51) Int. Cl.
*G06Q 20/36* (2012.01)
*G06Q 20/38* (2012.01)
*H04L 9/00* (2022.01)
*H04L 9/06* (2006.01)

(52) U.S. Cl.
CPC ..... *G06Q 20/3678* (2013.01); *G06Q 20/3827* (2013.01); *H04L 9/0643* (2013.01); *H04L 9/50* (2022.05); *H04L 2209/56* (2013.01)

(58) Field of Classification Search
CPC ............ G06Q 20/0655; G06Q 20/108; G06Q 20/367; G06Q 20/3678; G06Q 20/38215; G06Q 20/3827; G06Q 20/389; H04L 2209/38; H04L 2209/56; H04L 2209/84; H04L 2209/88; H04L 63/12; H04L 9/0643; H04L 9/3239
See application file for complete search history.

(56) References Cited

U.S. PATENT DOCUMENTS 9,849,364 B2    12/2017   Tran et al.
9,876,775 B2    1/2018   Mossbarger
(Continued)

FOREIGN PATENT DOCUMENTS

KR    20170137388 A    12/2017

*Primary Examiner* — Theodore C Parsons
(74) *Attorney, Agent, or Firm* — Galvin Patent Law LLC; Brian R. Galvin

(57) ABSTRACT

A system and method for digital smart wallet communications that operates by managing separately-owned, private blockchains to reduce processing times, eliminate proof of work burdens, and retain blockchain immutable security while allowing protection of confidential information contained on each blockchain. The system and method may further comprise auditability of blockchains, and may be operated on an integrated communications platform that allows seamless interoperability of communication devices across multiple modes of communication, and automates digital smart wallet transactions.

6 Claims, 47 Drawing Sheets

Related U.S. Application Data

16/747,982, filed on Jan. 21, 2020, now Pat. No. 10,997,551, and a continuation-in-part of application No. 16/696,352, filed on Nov. 26, 2019, now abandoned, which is a continuation-in-part of application No. 16/684,517, filed on Nov. 14, 2019, now abandoned, said application No. 16/747,982 is a continuation-in-part of application No. 16/684,517, filed on Nov. 14, 2019, now abandoned, which is a continuation-in-part of application No. 16/660,695, filed on Oct. 22, 2019, now abandoned, which is a continuation-in-part of application No. 16/208,853, filed on Dec. 4, 2018, now Pat. No. 10,552,556, which is a continuation-in-part of application No. 16/152,090, filed on Oct. 4, 2018, now abandoned, which is a continuation-in-part of application No. 16/122,870, filed on Sep. 5, 2018, now abandoned.

(60) Provisional application No. 62/772,527, filed on Nov. 28, 2018, provisional application No. 62/767,757, filed on Nov. 15, 2018, provisional application No. 62/749,665, filed on Oct. 23, 2018, provisional application No. 62/667,153, filed on May 4, 2018, provisional application No. 62/661,595, filed on Apr. 23, 2018, provisional application No. 62/616,060, filed on Jan. 11, 2018, provisional application No. 62/594,519, filed on Dec. 4, 2017, provisional application No. 62/570,064, filed on Oct. 9, 2017, provisional application No. 62/554,546, filed on Sep. 5, 2017, provisional application No. 62/549,138, filed on Aug. 23, 2017, provisional application No. 62/547,227, filed on Aug. 18, 2017, provisional application No. 62/540,943, filed on Aug. 3, 2017.

(56) References Cited

U.S. PATENT DOCUMENTS

| | | |
|---|---|---|
| 2013/0268437 A1 | 10/2013 | Desai et al. |
| 2015/0170112 A1 | 6/2015 | DeCastro |
| 2016/0260091 A1 | 9/2016 | Tobias |
| 2017/0085555 A1* | 3/2017 | Bisikalo ................. G06Q 20/10 |
| 2017/0098291 A1 | 4/2017 | Code et al. |
| 2018/0300382 A1* | 10/2018 | Madisetti ............. H04L 9/0637 |
| 2019/0052453 A1* | 2/2019 | de Ligt ................... H04L 63/12 |
| 2019/0172026 A1* | 6/2019 | Vessenes ............. G06Q 20/065 |
| 2019/0303920 A1* | 10/2019 | Balaraman .......... H04L 67/1042 |
| 2019/0319808 A1* | 10/2019 | Fallah ................... H04L 9/3239 |
| 2020/0252202 A1* | 8/2020 | Madl ...................... G06F 21/64 |
| 2020/0412524 A1* | 12/2020 | Das ..................... G06F 16/1824 |

* cited by examiner

Real-time credit scoring may be performed with multiple servers such as microexpressions (is the user indicating serious and honest behavior, or potentially dodgy and illicit behavior?), transaction context, risk training, and connection to other information and services such as medical records and jurisdiction changes
1510

Microexpressions may identify other parties as being potentially illicit in intent
1520

Credit score information of user may be encoded in blockchain, accessed by agencies requiring a credit score, as a result of credit scoring
1530

Wallet may warn others if user is behaving potentially illicitly, or warn own user if other party or parties are behaving suspiciously based on body language (point camera at each other if allowed) or speech patterns, changes in voice and tone, specific wording and phrasing
1540

Fig. 15

Smart security gateways may be operated by government agencies to implement regional control or region-specific limitations on smart wallets
1810

Smart gateways, and tiered-access blockchains, allow smart wallets of specific origins or of certain tiers not to operate freely in a given region
1820 i.e. An American travelling to France might have regional controls prevent their wallet from making transactions over $1500, until certain security checks are made to ensure transactions are non-fraudulent and safe
1830

Conversely, a wallet of a high tier such as from a wealthy businessman who travels frequently, may be authorized by smart gateways to make transactions of large amounts without hassle
1840

Fig. 18

| User, when first creating smart wallet, performs pre-set gestures in front of mobile device camera (may be self-held, or held by another, depending on what their typical use case might be) |
|---|
| 2010 |

| Pre-set actions may be those defined by the user in advance, i.e. "what I will do now is typical body language while talking to someone," or defined by client application, i.e. "please make a hand gesture" or "please roll your eyes derisively" |
|---|
| 2020 |

| Client application may request user to repeat gestures multiple times, and may ask for or be given increasingly subtle gestures and contexts for them |
|---|
| 2030 |

| Convolutional neural networks may be applied to numerous angles and repeated gestures to learn how to visually analyze user gestures, i.e. "microexpressions" |
|---|
| 2040 |

| If the client identifies something incorrectly in production, a user may select an instance of the wallet taking action, and flag it as inaccurate, requiring re-learning, and backtesting of historical actions with re-learned models to attempt to differentiate its judgement, to improve performance |
|---|
| 2050 |

Fig. 20

| User sets specific circumstances or rules in client application for variable balances, limits, and features for smart wallet
2110 |

| Limitations may take the form of a smart contract that executes its code when conditions are met, limiting the smart wallet until conditions change
2120 |

| Conditions may include location (tracked by transactions, GPS and phone location), venues and merchants to spend money at, or context dependent (such as being under duress, detecting a suspicious third party actor such as an untrustworthy salesman, etc.)
2130 |

| When conditions are met, user balance may show a lower amount or user may have their spending limit temporarily lowered, to prevent misuse, fraud, and obey user directives for such limits if set prior, as well as limits not required to be set by a user (such as limiting purchases if fraudulent or untrustworthy transactions are suspected)
2140 |

Fig. 21

DISTRIBUTED SMART WALLET COMMUNICATIONS PLATFORM

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/875,595
Ser. No. 16/796,159
Ser. No. 16/747,982
Ser. No. 16/696,352
Ser. No. 16/684,517
Ser. No. 16/660,695
PCT/US19/41500
PCT/US19/28812
PCT/US19/13272
Ser. No. 16/208,853
62/772,527
62/767,757
62/749,665
Ser. No. 16/152,090
Ser. No. 16/122,870
62/697,377
62/696,793
62/667,153
62/661,595
62/616,060
62/594,519
62/570,064
62/554,546
62/549,138
62/547,227
62/540,943

BACKGROUND

Field of the Art

The disclosure relates to the field of digital wallets, and more particularly to the field of facilitating communications between blockchain-enabled and smart-contract-enabled digital smart wallets.

Discussion of the State of the Art

In their current incarnations, digital currencies, or cryptocurrencies, have substantial drawbacks that hinder their adoption by a broader segment of society. One drawback is that blockchains for a given digital currency are currently monolithic, and as they grow larger in size, the delays in transaction times increase. When these delays increase to more than a minute or two (and some digital currency validations currently take on the order of an hour to complete) the digital currency becomes unusable for everyday purposes. Another drawback is the enormous amount of time and energy that must be put into performing "proof of work" to validate the transactions. For example, some estimates put the global annual energy usage of Bitcoin at 30 terrawatt-hours (30 TWh) which is roughly the energy usage of a mid-sized country. Another drawback is that blockchains that are open to public view, by their very nature, cannot be used for sensitive or confidential information by their very nature, yet that transparency is a major part of the security of current digital currency implementations.

Compounding the blockchain implementation problems is the fact that communications platforms do not have the necessary capabilities to automate certain communications between devices, particularly in the area of integrations of communications across device types and communication modes, and the area automation of smart wallet transactions.

What is needed is a digital smart wallet communications platform that retains the beneficial characteristics of blockchains while reducing the problems that hinder wider adoption, and further integrates communications across device types and communication modes and automates digital smart wallet transactions.

SUMMARY

Accordingly, the inventor has conceived, and reduced to practice, a system and method for digital smart wallet communications that operates by managing separately-owned, private blockchains to reduce processing times, eliminate proof of work burdens, and retain blockchain immutable security while allowing protection of confidential information contained on each blockchain. The system and method may further comprise auditability of blockchains, and may be operated on an integrated communications platform that allows seamless interoperability of communication devices across multiple modes of communication, and automates digital smart wallet transactions.

According to a preferred embodiment, a system for digital smart wallet transactions is disclosed, comprising: an immutable ledger comprising an ledger of transactions wherein: each transaction is encrypted and cannot be changed without changing the cryptographic hash of the immutable ledger; and new entries in the immutable ledger reflect changes to prior entries in the immutable ledger without changing the earlier entries; an immutable ledger manager comprising a first plurality of programming instructions stored in a memory of, and operating on a processor of, a first computing device, wherein the first plurality of programming instructions, when operating on the processor, cause the first computing device to: receive a transaction request from a sender, the transaction request comprising instructions to transfer a token value to a recipient; enter a new transaction on the immutable ledger in favor of a recipient in the amount of the token value; notify the sender of the new transaction; and notify the recipient of the token distribution confirmation from the second immutable ledger.

According to another preferred embodiment, a system for digital smart wallet transactions is disclosed, comprising: an immutable ledger manager comprising a first plurality of programming instructions stored in a memory of, and operating on a processor of, a first computing device, wherein the first plurality of programming instructions, when operating on the processor, cause the first computing device to: receive a transaction request from a sender, the transaction request comprising instructions to transfer a token value to a recipient; issue a token distribution request to a first immutable ledger holding a token or tokens in favor of the sender, the token distribution request comprising instructions to enter a new transaction on the first immutable ledger in favor of a recipient in the amount of the token value; receive a token distribution confirmation from the first immutable ledger; notify the sender of the token distribution confirmation from the first immutable ledger; send a token issuance request to a second immutable ledger, the token issuance request comprising instructions to enter a new transaction on the second immutable ledger in favor of the recipient in the amount of the token value; receive a token distribution confirmation from the second immutable ledger; and notify the recipient of the token distribution confirmation from the second immutable ledger.

According to another preferred embodiment, a method for digital smart wallet transactions is disclosed, comprising the steps of: receiving a transaction request from a sender, the transaction request comprising instructions to transfer a token value to a recipient; issuing a token distribution request to a first immutable ledger holding a token or tokens in favor of the sender, the token distribution request comprising instructions to enter a new transaction on the first immutable ledger in favor of a recipient in the amount of the token value; receiving a token distribution confirmation from the first immutable ledger; notifying the sender of the token distribution confirmation from the first immutable ledger; sending a token issuance request to a second immutable ledger, the token issuance request comprising instructions to enter a new transaction on the second immutable ledger in favor of the recipient in the amount of the token value; receiving a token distribution confirmation from the second immutable ledger; and notifying the recipient of the token distribution confirmation from the second immutable ledger.

According to an aspect of an embodiment, a means if provided for auditing of the first and second immutable ledgers.

According to an aspect of an embodiment, the means for auditing of the first and second immutable ledgers is a manual audit by a third party auditor.

According to an aspect of an embodiment, the means for auditing of the first and second immutable ledgers is a distributed immutable ledger comprising at least one copy of each of the first and second immutable ledgers wherein a cryptographic hash of the copy of each immutable ledger must match the original of the ledger to which it corresponds prior to creation of a new entry on the original of the ledger.

According to an aspect of an embodiment, the means for auditing of the first and second immutable ledgers is a testing of the cryptographic hash of the ledger against a stored cryptographic hash.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 15 is a method diagram illustrating steps in real-time credit scoring of a smart wallet user, according to an aspect.

FIG. 18 is a method diagram illustrating steps in utilizing blockchain smart gateways and tiered blockchains to implement region-specific limits on a given smart wallet, according to an aspect.

FIG. 20 is a method diagram illustrating steps in microexpression learning, according to an aspect.

FIG. 21 is a method diagram illustrating steps in a smart wallet showing variable balance amounts, variable limits, and features based on rules specified by a user or by risk assessment and regional jurisdictions, according to an aspect.

DETAILED DESCRIPTION

Figure 1:
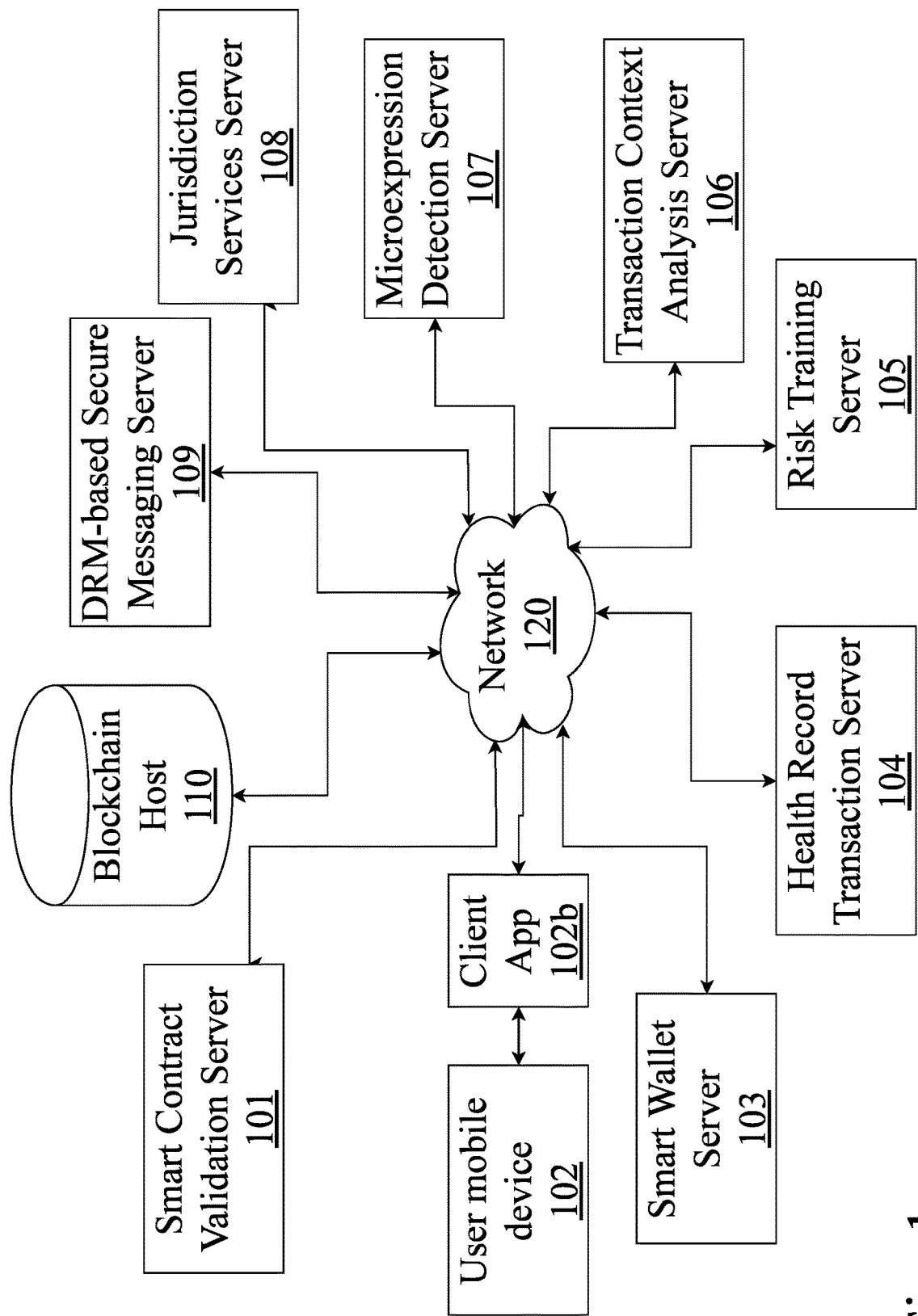
FIG. 1 is a block diagram illustrating an exemplary system architecture for distributed smart wallet services, according to one aspect.

The inventor has conceived, and reduced to practice, a system and method for digital smart wallet communications that operates by managing separately-owned, private blockchains to reduce processing times, eliminate proof of work burdens, and retain blockchain immutable security while allowing protection of confidential information contained on each blockchain. The system and method may further comprise auditability of blockchains, and may be operated on an integrated communications platform that allows seamless interoperability of communication devices across multiple modes of communication, and automates digital smart wallet transactions.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The terms "blockchain" or "immutable ledger" as used herein means an immutable, additive transaction database which is formed by encrypting "blocks" of information and adding them to a "chain" of prior blocks. Immutability of a blockchain is ensured by testing it against a hash of all prior transactions in the blockchain. If the test does not match the hash, the blockchain has been tampered with in some way. Blockchains do not have to be distributed, although most implementations to date have been of that type. The phrases "distributed blockchain" or "immutable distributed ledger" means an immutable, additive transaction database which is of the distributed type.

The term "transaction" as used herein means any electronic transaction between two or more parties, including but not limited to transactions in the form of smart contracts and digital currencies. Transactions may include zero-value transactions such as tracking of events, completion of checklists, etc.

The term "token" as used herein means any unit of data that allows tracking of some item of information. In many cases, a token will be a digital representation of an agreed unit of exchange, but a token may represent any trackable information for which a historical record is needed (e.g., a series of events, a checklist of items to complete, etc.). Where a token is a digital representation of an agreed unit of exchange, a token is not required to have any inherent value other than what people are willing to exchange for it (e.g., as in the case of cryptocurrencies), or it may be tied to a real world thing of value such as a real currency, a contractual right, or physical asset. Tokens may be unitary, meaning that each token represents a value that is indivisible, or they may be divisible, meaning that the value of each token can be divided into smaller units. In some embodiments, tokens may represent a sort of digital "account" to which value can be added or subtracted.

The terms "digital currency" or "virtual currency" as used herein mean a representation of value in digitized form which may be transferred to others or exchanged with others for goods and services.

The term "cryptocurrency" as used herein means a digital currency for which security is provided by means of encryption. The definition of a cryptocurrency does not necessarily require the use of blockchains, although all major cryptocurrencies currently in use are so defined. The valuation associated with cryptocurrencies is often referred to as coins or tokens, with fractional parts of a coin or token typically being allowed to be transferred or utilized.

The terms "mine" or "mining" as used herein mean incentivizing nodes to provide computer processing power to validate transactions by generating a small additional portion of the valuation associated with a blockchain database for each successful entry validation in that database, and giving that small portion to a node or nodes that perform(s) the successful entry validation.

The term "node" as used herein means any one of a plurality of computers that validate transactions in the blockchain database as part of a peer-to-peer network.

The term "proof of work" or "PoW" as used herein means solving of a complex mathematical operation such as a cryptographical puzzle which serves as validation of a potential block in the blockchain. In current blockchain implementations, PoW requires broadcasting of the potential block to every node in the network and competition among the nodes to complete the PoW first. This requires every node to have the entire information on the blockchain. As the blockchain grows, with more users and a higher number of transactions, there is increasing load on each node. Participation of every participating node in transaction validation makes the transaction process slower.

Conceptual Architecture

FIG. 1 is a block diagram illustrating an exemplary system architecture for distributed smart wallet services, according to one aspect. A smart contract validation server 101, user mobile device 102, client application 102b, smart wallet server 103, health record transaction server 104, risk training server 105, transaction context analysis server 106, microexpression detection server 107, jurisdiction services server 108, DRM-based secure messaging server 109, and blockchain host 110, are connected to a network 120, which may be a combination or amalgamation of networks including a Public Switched Telephone Network ("PSTN"), the internet, or another wide or local area network (WAN and LAN respectively), or a single network which they all may be connected to via a network adapter and software that communicates over the network or networks with each other.

A smart contract validation server 101 is a server which may, in some implementations, create the code for a smart contract or self-fulfilling digital contract, may encode the contract in a blockchain, and may validate and execute the contract when conditions are met, the conditions being specified at the time of creation for the smart contract. The smart contract validation server may do this by means of one or several computer programming languages and frameworks that allow for creation of such contract objects.

A user mobile device 102 may be a mobile phone such as a smartphone, a tablet computer, a personal digital assistant or similar, or some other mobile computing device capable of operating software applications and downloading new applications to operate over a network, such as those operating the ANDROID™ or IOS™ operating systems. A user mobile device may operate a client application 102b which handles interfacing between a user and at least a smart wallet server 103, over a network or networks 120, through the use of a graphical user interface and the computing power of the mobile device. Such an application may be used to gather and utilize biometric information about a user for verification purposes, display balances and information about the smart wallet, send information to a smart wallet server to be received and written on the smart wallet blockchain, or in some implementations the application may interact directly with the blockchain. The application may also interface over a network such as WIFI™ or BLUETOOTH™ or over the internet with email, with third party applications and services, to complete transactions, or may display a scannable code for a point-of-sale system to complete the transaction.

A smart wallet server 103 communicates with at least the user application 102b over the network or networks 120, and with a possible plurality of other servers and services, in order to manage the services' interactions with the smart wallet blockchain and end users. The smart wallet server 103 may be in charge of decrypting and providing access to the smart wallet blockchain, and may forward relevant communications between servers and services and the end user for purposes such as risk assessment and jurisdiction services. A smart wallet server may be synonymous with a blockchain host 110, or such a host may be a separate computing device or server.

A health record transaction server 104 is a server which may store blockchain-encoded records of a user's health records, or may provide services for handling them according to local laws and regulations such as HIPAA, for a user. It may also provide services and software protocols for a client application 102b to interface with hospital software over a network 120.

A risk training server 105 is a server which may operate a datastore of some manner internally or externally, such as MONGODB™ or MICROSOFT SQL SERVER™, may receive records of transactions, physical movements of a user, transaction locations and metadata, and establish patterns of behavior for users, which can be matched against future transactions and decisions to determine if potential fraud is being committed rather than a genuine transaction. Furthermore, such basic pattern recognition may be utilized in conjunction with microgestures in the user's body language, facial expressions, or voice patterns, to determine if the user is at risk, under duress, or is dealing with a potentially dishonest or illegitimate businessperson, with the help of a transaction context server 106 and microgesture analysis server 107.

A transaction context server 106 specifically may be used by a risk training server 105 for analyzing the context of given purchases of a user, such as analyzing patterns of user needs and habits in a more abstract sense and then comparing those, and typical or possible future needs such as getting a car oil change in 8 months even if no pattern of getting oil changes is identified yet, to current and pending transactions, to determine if a severe anomaly has been detected. For instance a user's habits might include buying certain accessories for their vehicle, which may not be out of the ordinary, but if they have no history of buying anything relating to new cars or any history of visiting car dealerships, and suddenly a new car has been purchased without any contextual basis for the transaction such as changes to their credit score, visiting dealerships, or having records of conversations with a dealer through the passive monitoring of the smart wallet app, this may be seen as highly suspicious because of the lack of context for the transaction.

A microexpression detection server 107 may receive patterns of user behavior both in terms of their physical body language and facial expressions, and their voice samples and voice patterns of people they interact with, to attempt to gauge the mental and emotional state of both parties in very general terms such as "potentially under duress," "potentially lying/deceiving," "honest vendor," and more, to provide the rating of the user and vendor if available to a risk training server 105 for training of risk models.

A jurisdiction services server 108 may communicate over a network 120 with a smart wallet app 103b to handle integration, if possible, with a user's jurisdiction or various jurisdictions for the purposes of digital voting and storage of voting records on the blockchain, with the smart wallet server 103 and a smart contract validation server 101, in which the smart contract validation server 101 may be used to execute smart contract code for voting mechanisms, if digital voting is allowed in a user's jurisdiction at all.

A DRM-based secure messaging server 109 may provide digital rights management ("DRM") protection for secure messaging between servers and services listed herein, to encrypt and protect messages exchanged between services and users, where possible. A DRM secure messaging server 109 may be communicated with inbetween each other server or service's communication with another server or service, or a DRM-based secure messaging server 109 may be operated locally in tandem with each other server or service, encrypting and protection messages before they go to the network and then being decrypted at the destination point.

Figure 2:
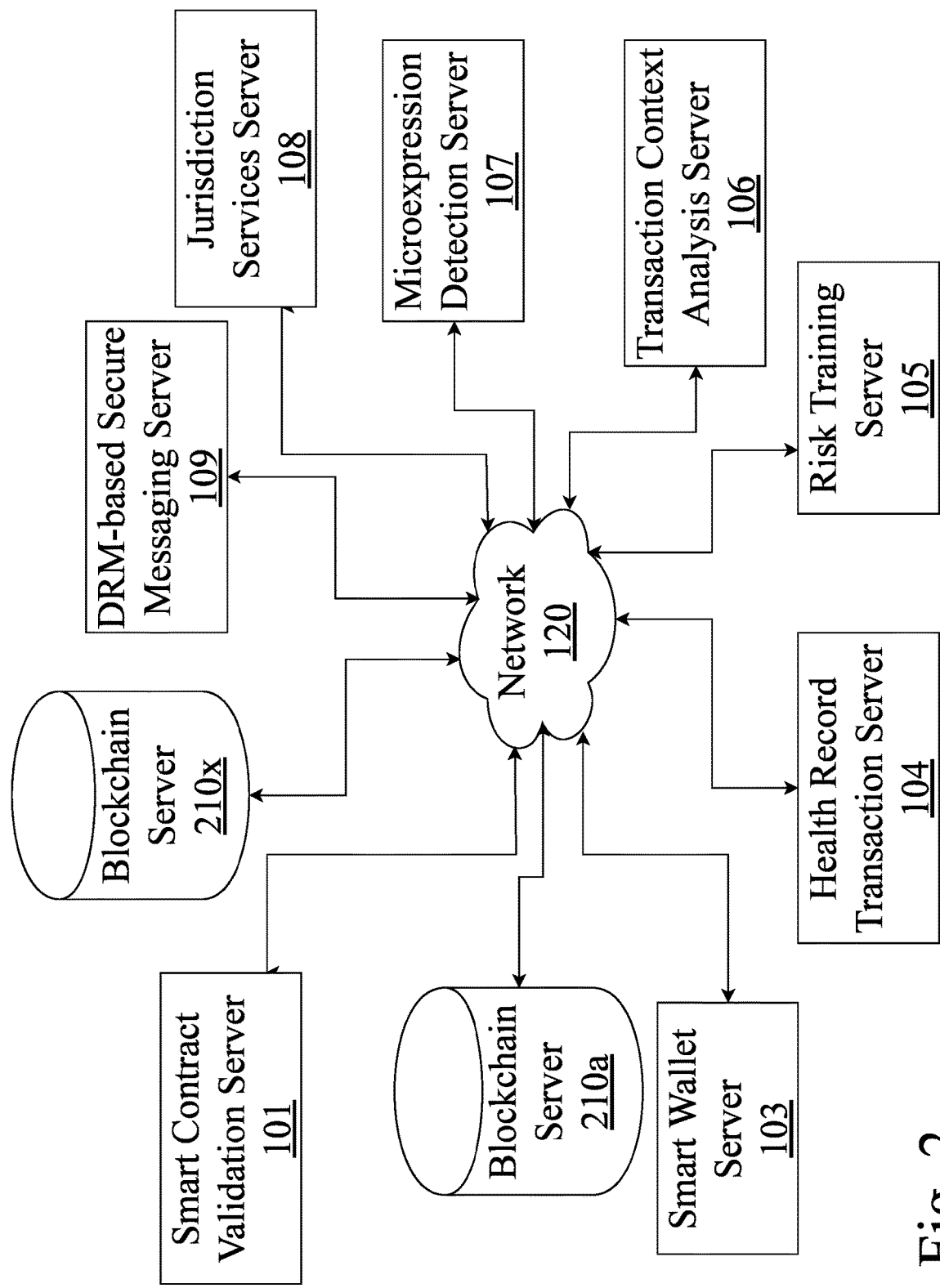
FIG. 2 is a block diagram illustrating an exemplary system architecture for distributed smart wallet services utilizing an implementation of a distributed blockchain, according to one aspect.

FIG. 2 is a block diagram illustrating an exemplary system architecture for distributed smart wallet services utilizing an implementation of a distributed blockchain, according to one aspect. A smart contract validation server 101, blockchain server 210a, smart wallet server 103, health record transaction server 104, risk training server 105, transaction context analysis server 106, microexpression detection server 107, jurisdiction services server 108, DRM-based secure messaging server 109, and blockchain host 110, are connected to a network 120, which may be a combination or amalgamation of networks including a Public Switched Telephone Network ("PSTN"), the Internet, or another wide or local area network (WAN and LAN respectively), or a single network which they all may be connected to via a network adapter and software that communicates over the network or networks with each other.

A smart contract validation server 101 is a server which may, in some implementations, create the code for a smart contract or self-fulfilling digital contract, may encode the contract in a blockchain, and may validate and execute the contract when conditions are met, the conditions being specified at the time of creation for the smart contract. The smart contract validation server may do this by means of one or several computer programming languages and frameworks that allow for creation of such contract objects.

A blockchain server or servers 210a, 210x may be a separate server that hosts a smart wallet blockchain, that may be communicated with, for instance with a smart wallet server 103 which may handle permissioned requests from the blockchain server 210a, 210x and then write data to the chain, which is sent back from the smart wallet server 103 to the blockchain servers 210a, 210x to be added as a new block.

A smart wallet server 103 communicates with at least a user application or blockchain server 210a, 210x over the network or networks 120, and with a possible plurality of other servers and services, in order to manage the services' interactions with the smart wallet blockchain and end users. The smart wallet server 103 may be in charge of decrypting and providing access to the smart wallet blockchain, and may forward relevant communications between servers and services and the end user for purposes such as risk assessment and jurisdiction services. A smart wallet server may be synonymous with a blockchain host 110, or such a host may be a separate computing device or server.

A health record transaction server 104 is a server which may store blockchain-encoded records of a user's health records, or may provide services for handling them according to local laws and regulations such as HIPAA, for a user. It may also provide services and software protocols for a client application or blockchain server 210a, 210x to interface with hospital software over a network 120.

A risk training server 105 is a server which may operate a datastore of some manner internally or externally, such as MONGODB™ or MICROSOFT SQL SERVER™, may receive records of transactions, physical movements of a user, transaction locations and metadata, and establish patterns of behavior for users, which can be matched against future transactions and decisions to determine if potential fraud is being committed rather than a genuine transaction. Furthermore, such basic pattern recognition may be utilized in conjunction with microgestures in the user's body language, facial expressions, or voice patterns, to determine if the user is at risk, under duress, or is dealing with a potentially dishonest or illegitimate businessperson, with the help of a transaction context server 106 and microgesture analysis server 107.

A transaction context server 106 specifically may be used by a risk training server 105 for analyzing the context of given purchases of a user, such as analyzing patterns of user needs and habits in a more abstract sense and then comparing those, and typical or possible future needs such as getting a car oil change in 8 months even if no pattern of getting oil changes is identified yet, to current and pending transactions, to determine if a severe anomaly has been detected. For instance a user's habits might include buying certain accessories for their vehicle, which may not be out of the ordinary, but if they have no history of buying anything relating to new cars or any history of visiting car dealerships, and suddenly a new car has been purchased without any contextual basis for the transaction such as changes to their credit score, visiting dealerships, or having records of conversations with a dealer through the passive monitoring of the smart wallet app, this may be seen as highly suspicious because of the lack of context for the transaction.

A microexpression detection server 107 may receive patterns of user behavior both in terms of their physical body language and facial expressions, and their voice samples and voice patterns of people they interact with, to attempt to gauge the mental and emotional state of both parties in very general terms such as "potentially under duress," "potentially lying/deceiving," "honest vendor," and more, to provide the rating of the user and vendor if available to a risk training server 105 for training of risk models.

A jurisdiction services server 108 may communicate over a network 120 with a smart wallet app 103b to handle integration, if possible, with a user's jurisdiction or various jurisdictions for the purposes of digital voting and storage of voting records on the blockchain, with the smart wallet server 103 and a smart contract validation server 101, in which the smart contract validation server 101 may be used to execute smart contract code for voting mechanisms, if digital voting is allowed in a user's jurisdiction at all.

A DRM-based secure messaging server 109 may provide digital rights management ("DRM") protection for secure messaging between servers and services listed herein, to encrypt and protect messages exchanged between services and users, where possible. A DRM secure messaging server 109 may be communicated with inbetween each other server or service's communication with another server or service, or a DRM-based secure messaging server 109 may be operated locally in tandem with each other server or service, encrypting and protection messages before they go to the network and then being decrypted at the destination point.

Figure 3:
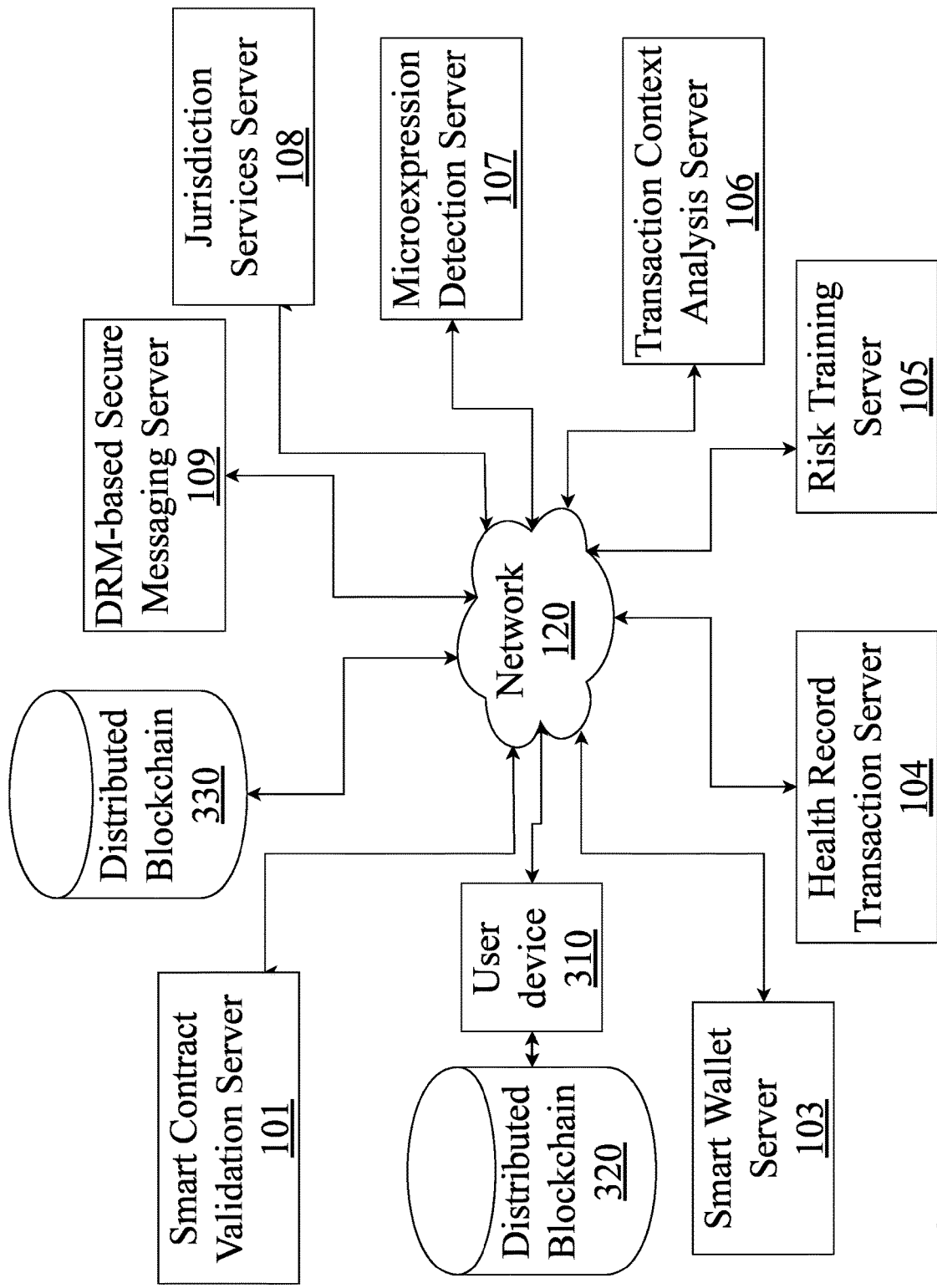
FIG. 3 is block diagram illustrating an exemplary system architecture for distributed smart wallet services utilizing an implementation of a blockchain hosted on client computers, according to one aspect.

FIG. 3 is block diagram illustrating an exemplary system architecture for distributed smart wallet services utilizing an implementation of a blockchain hosted on client computers, according to one aspect. A smart contract validation server 101, user device 310, distributed blockchain host 330, smart wallet server 103, health record transaction server 104, risk training server 105, transaction context analysis server 106, microexpression detection server 107, jurisdiction services server 108, DRM-based secure messaging server 109, and blockchain host 110, are connected to a network 120, which may be a combination or amalgamation of networks including a Public Switched Telephone Network ("PSTN"), the Internet, or another wide or local area network (WAN and LAN respectively), or a single network which they all may be connected to via a network adapter and software that communicates over the network or networks with each other.

A smart contract validation server 101 is a server which may, in some implementations, create the code for a smart contract or self-fulfilling digital contract, may encode the contract in a blockchain, and may validate and execute the contract when conditions are met, the conditions being specified at the time of creation for the smart contract. The smart contract validation server may do this by means of one or several computer programming languages and frameworks that allow for creation of such contract objects.

A user device 310 may possess a copy of a distributed blockchain 320, without having the ability to decrypt or access any blocks except for the blocks which their own biometrics may be permitted to access, through the use of a plurality of servers and services which provide the permissioned protocols and functionality. A distributed blockchain may be hosted by a plurality of devices 330 and exist in a plurality of instances, in which case a smart wallet server 103 or some other server may be required to verify and validate changes to the blockchain. A second possibility exists in which a distributed blockchain 320, 330 may each be a separate blockchain of their own, and not publicly accessible to others, but the blockchain must still be accessed with the proper permissions handled by the other servers and services such as a smart wallet server 103 and microgesture detection server 107 over a network 120.

A smart wallet server 103 communicates with at least a user application or blockchain 320, 330 over the network or networks 120, and with a possible plurality of other servers and services, in order to manage the services' interactions with the smart wallet blockchain and end users. The smart wallet server 103 may be in charge of decrypting and providing access to the smart wallet blockchain, and may forward relevant communications between servers and services and the end user for purposes such as risk assessment and jurisdiction services. A smart wallet server may be synonymous with a blockchain host 110, or such a host may be a separate computing device or server.

A health record transaction server 104 is a server which may store blockchain-encoded records of a user's health records, or may provide services for handling them according to local laws and regulations such as HIPAA, for a user. It may also provide services and software protocols for a client application or blockchain 320, 330 to interface with hospital software over a network 120.

A risk training server 105 is a server which may operate a datastore of some manner internally or externally, such as MONGODB™ or MICROSOFT SQL SERVER™, may receive records of transactions, physical movements of a user, transaction locations and metadata, and establish patterns of behavior for users, which can be matched against future transactions and decisions to determine if potential fraud is being committed rather than a genuine transaction. Furthermore, such basic pattern recognition may be utilized in conjunction with microgestures in the user's body language, facial expressions, or voice patterns, to determine if the user is at risk, under duress, or is dealing with a potentially dishonest or illegitimate businessperson, with the help of a transaction context server 106 and microgesture analysis server 107.

A transaction context server 106 specifically may be used by a risk training server 105 for analyzing the context of given purchases of a user, such as analyzing patterns of user needs and habits in a more abstract sense and then comparing those, and typical or possible future needs such as getting a car oil change in 8 months even if no pattern of getting oil changes is identified yet, to current and pending transactions, to determine if a severe anomaly has been detected. For instance a user's habits might include buying certain accessories for their vehicle, which may not be out of the ordinary, but if they have no history of buying anything relating to new cars or any history of visiting car dealerships, and suddenly a new car has been purchased without any contextual basis for the transaction such as changes to their credit score, visiting dealerships, or having records of conversations with a dealer through the passive monitoring of the smart wallet app, this may be seen as highly suspicious because of the lack of context for the transaction.

A microexpression detection server 107 may receive patterns of user behavior both in terms of their physical body language and facial expressions, and their voice samples and voice patterns of people they interact with, to attempt to gauge the mental and emotional state of both parties in very general terms such as "potentially under duress," "potentially lying/deceiving," "honest vendor," and more, to provide the rating of the user and vendor if available to a risk training server 105 for training of risk models.

A jurisdiction services server 108 may communicate over a network 120 with a smart wallet app 103b to handle integration, if possible, with a user's jurisdiction or various jurisdictions for the purposes of digital voting and storage of voting records on the blockchain, with the smart wallet server 103 and a smart contract validation server 101, in which the smart contract validation server 101 may be used to execute smart contract code for voting mechanisms, if digital voting is allowed in a user's jurisdiction at all.

A DRM-based secure messaging server 109 may provide digital rights management ("DRM") protection for secure messaging between servers and services listed herein, to encrypt and protect messages exchanged between services and users, where possible. A DRM secure messaging server 109 may be communicated with inbetween each other server or service's communication with another server or service, or a DRM-based secure messaging server 109 may be operated locally in tandem with each other server or service, encrypting and protection messages before they go to the network and then being decrypted at the destination point.

Figure 4:
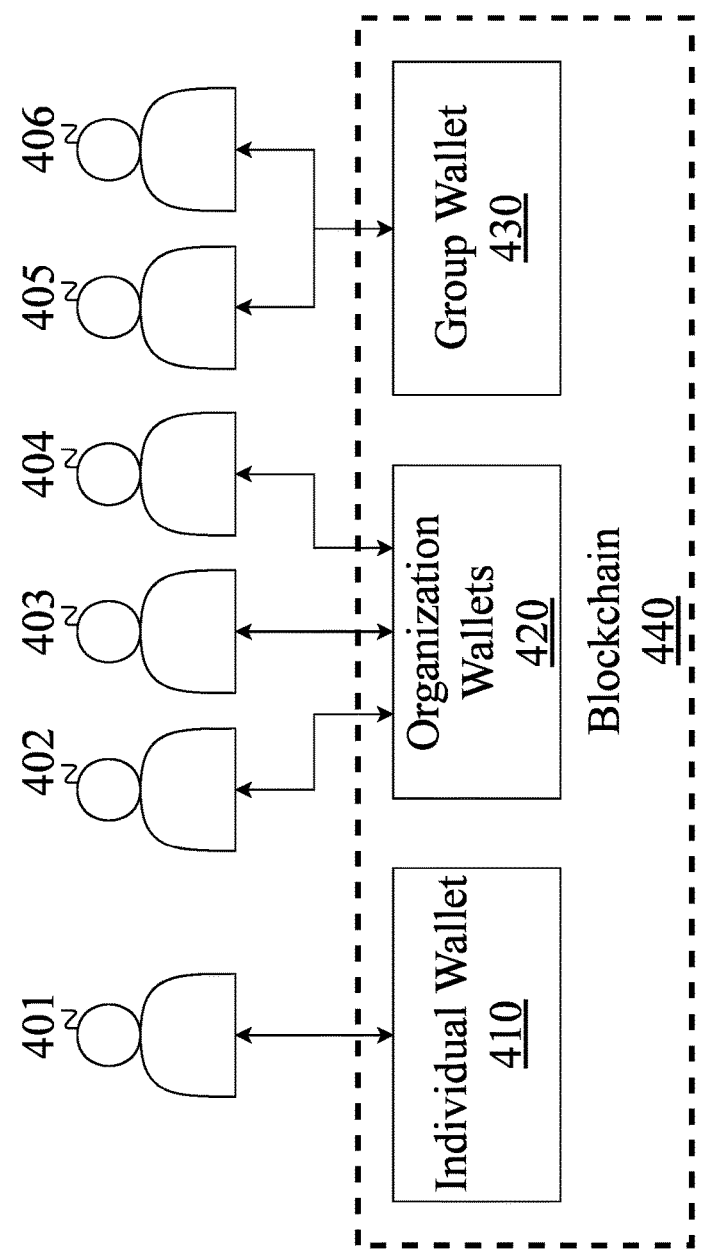
FIG. 4 is a diagram illustrating tiers or categories of wallets with their appropriate users, according to an aspect.

FIG. 4 is a diagram illustrating tiers or categories of wallets with their appropriate users, according to an aspect. A plurality of wallets 410, 420, 430 may be present on a smart wallet blockchain 440, some of which may be of varying configurations or tiers, to be used by individuals, groups of people, or have access to a common pool of funds or bank account that each has an individual wallet to access. An individual user 401 may be registered for, and have ownership over, an individual wallet or wallets 410, and use their biometrics in a smart wallet application to access the wallet. By contrast, organizational wallets 420 may be assigned individually to a group of users 402, 403, 404, which have individual wallets that access the same account for an organization's funds, such as a group of business employees whose charges all go to the same business account, but who have individual wallets to use for this purpose. A third implementation of wallet may be a group wallet 430 which is a single wallet that a group of users 405, 406 may use together, with only one wallet being used by both users, so that restrictions and balances and connections that the wallet makes are universal for all users who utilize the wallet.

Figure 5:
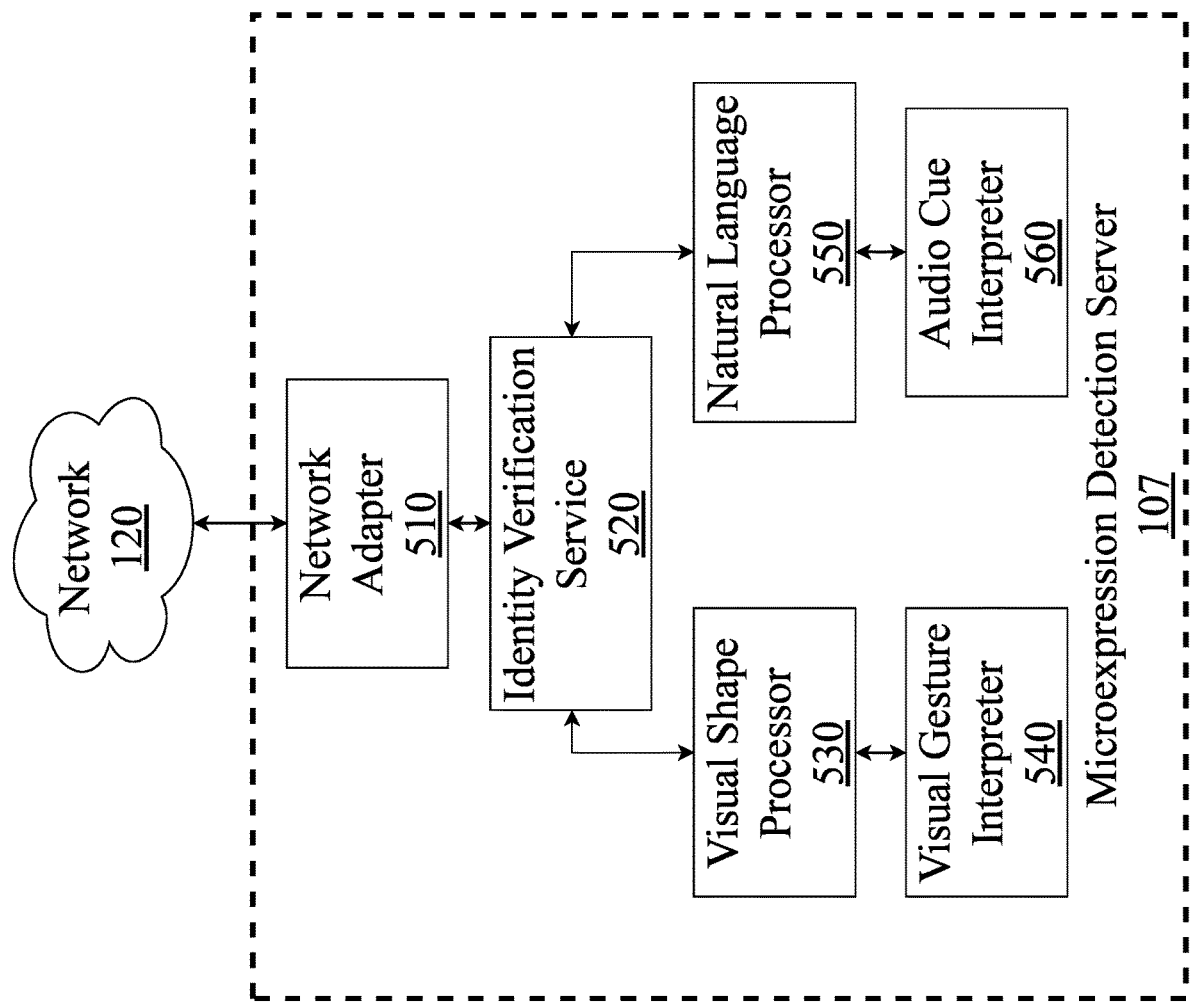
FIG. 5 is a block diagram illustrating internal components of a microexpression detection server, according to an aspect.

FIG. 5 is a block diagram illustrating internal components of a microexpression detection server, according to an aspect. A microexpression detection server 107 exists connected to a network or networks 120, for the purpose of receiving and analyzing user micro-expressions, which may take the form of verbal cues, physical and facial cues or gestures, and determine if a user or an analyzed vendor is under duress, exhibiting honest or dishonest behavior, and sends this information to a server that provided the data for analysis. An example of the use of this data may be to limit a user's smart wallet balance if a vendor is determined from passive verbal cues to be possibly dishonest, warn a user, and then allow a user to either bypass the warning and limitation, or the warning and limitation may be un-avoidable and require a vendor that does not flag as dishonest. Such a server may contain in it a network adapter 510 to interact and connect with the network or networks 120, which communicates data back and forth with an identity verification service 520 to determine a user's identity from verbal and physical biometrics, as well as providing the microexpression analysis services through a visual shape processor 530 and natural language processor 550. The identification aspect of the service may be bypassed if a user or subject has already been identified by a connected service before communicating the visual and verbal data to the microexpression detection server 107, but in either case, a given subject's verbal cues may be analyzed by a natural language processor 550 to translate the audio data to a format more readily processable, which an audio cue interpreter 560 then may process further, with both the processed audio data and the raw audio data to discern both words and phrases used by a subject as well as the intonation used.

These may be matched to predesigned, or learned, models of what such a subject might say or sound like in certain situations to indicate dishonesty, danger, stress or duress, and more. A visual shape processor 530 identifies visual shapes and outlines, and a visual gesture interpreter 540 uses this streaming data of a subject to discern specific gestures such as a hand movement, change in posture, or facial expressions that may also indicate specific moods or behaviors. The identity verification service 520 may take both of these evaluations from the audio and visual interpreters and processors, and determine a probability that the subject is displaying a certain risk-heightening pattern of behavior, which may then be referred to a risk training server or smart wallet server over a network 120.

Figure 6:
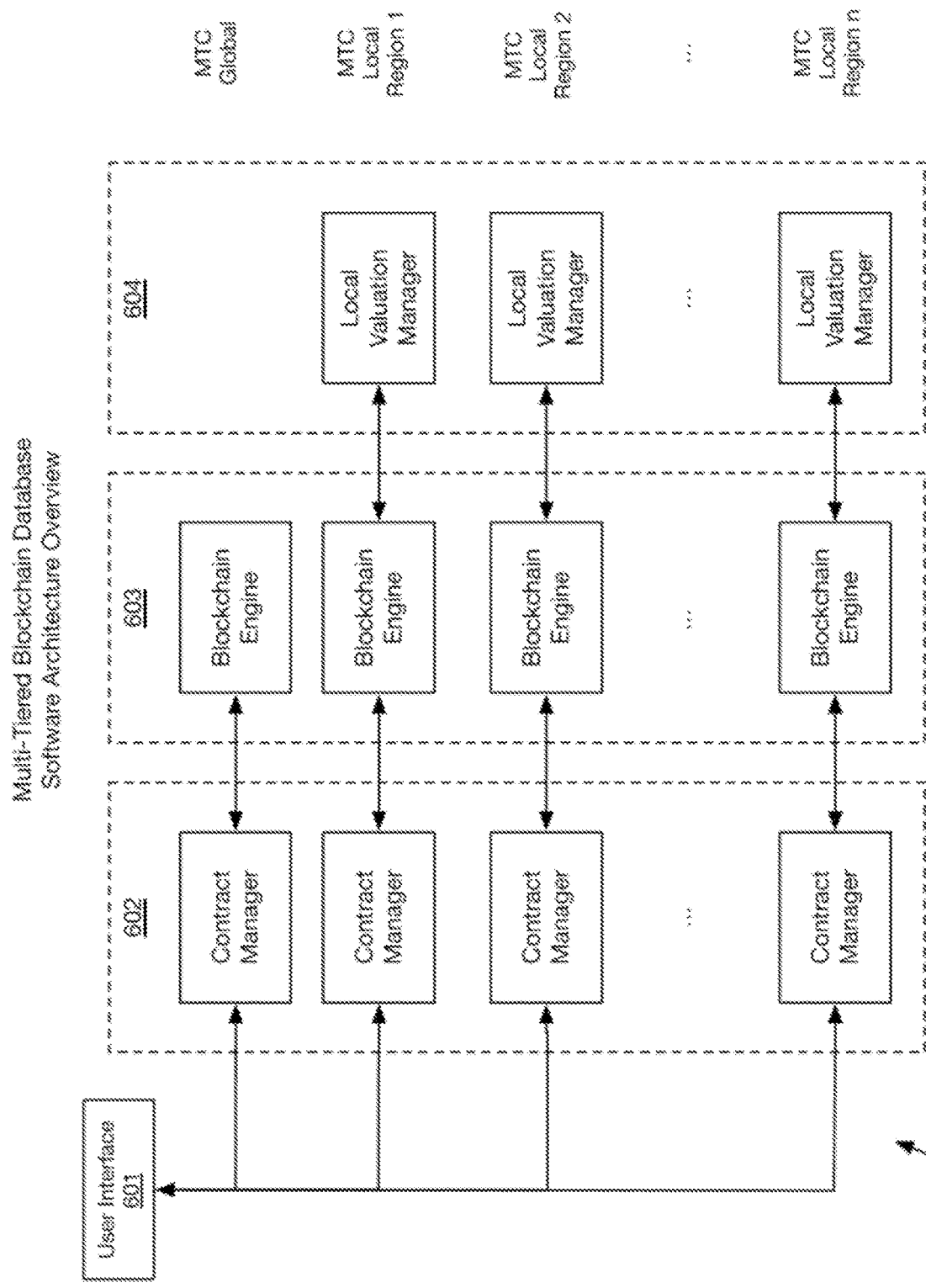
FIG. 6 shows an exemplary multi-tiered blockchain database software architecture overview, according to an aspect of the invention.

FIG. 6 shows an exemplary multi-tiered blockchain database software architecture overview 600, according to an aspect of the invention. The basic system would comprise a plurality of user interfaces 601 through which users could manage their accounts, a series of contract managers 602, one for the global database, and one for each lower tier database, a series of blockchain engines 603, one for each database, and a series of local valuation managers 604 at the lower tiers only, which serve to fix the exchange rate of tokens within each region within the lower tier databases relative to another valuation in that region.

Figure 7:
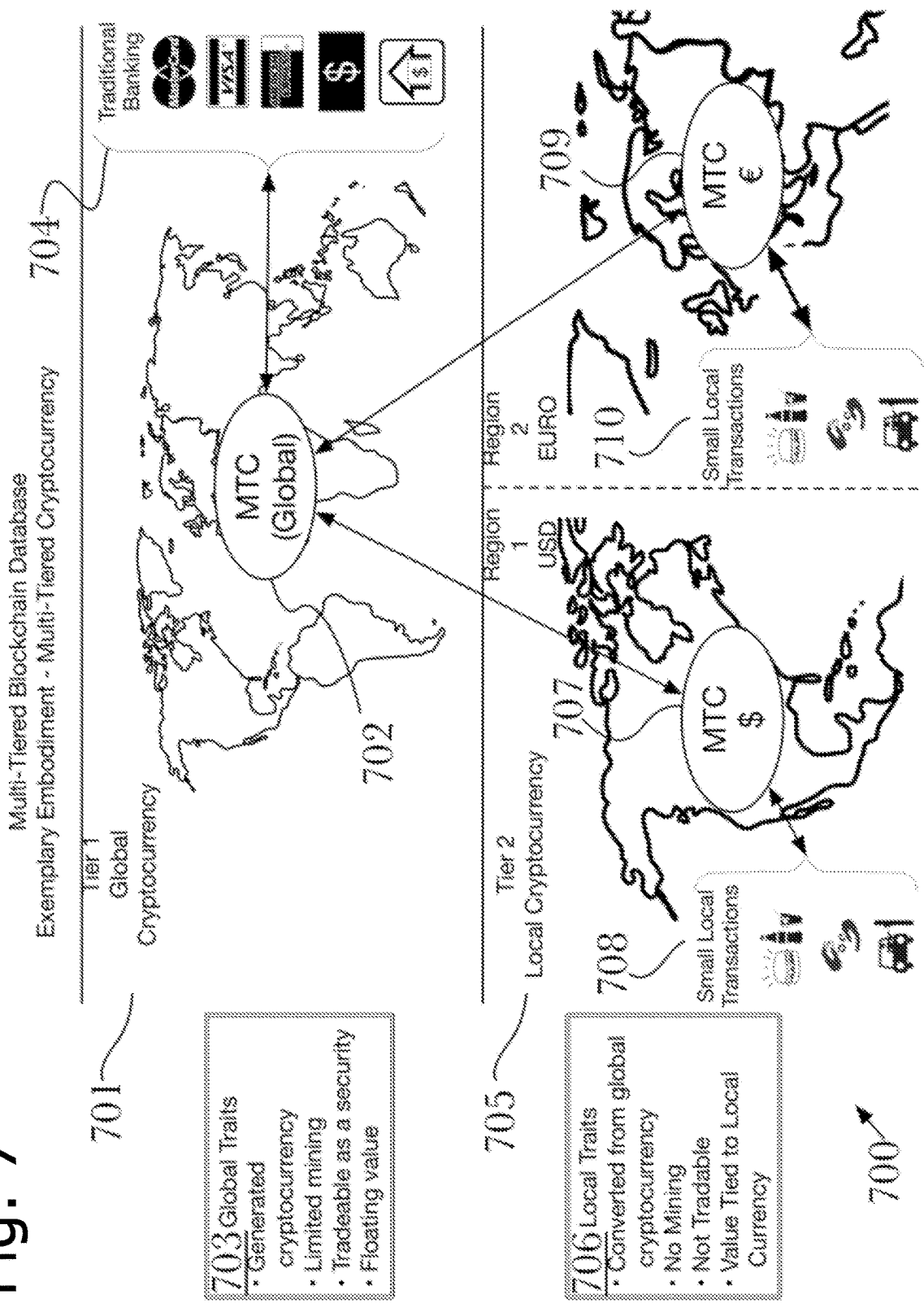
FIG. 7 shows an exemplary conceptual framework for a multi-tiered cryptocurrency.

FIG. 7 is a diagram showing an exemplary conceptual framework for a multi-tiered cryptocurrency 700. Tier 1 701 of the multi-tiered cryptocurrency would consist of a global cryptocurrency 702 with traits similar to existing cryptocurrencies 703 such as having currency generated over time, allowing mining, allowing the cryptocurrency to be traded as a security, and having a floating value. Other currencies could be exchanged for the global cryptocurrency through traditional banking means 704. Tier 2 705 would likely be regional or national in scope. The cryptocurrency at this tier would be converted from the global cryptocurrency 702, and would have traits different from existing cryptocurrencies 706 that facilitate small value transactions, such as no mining ability, not tradeable as securities, and value tied to a local real currency. In one embodiment, one Tier 2 705 cryptocurrency could be restricted to use in the United States with the value tied to value the USD 707 with transactions limited in value and optimized for small local transactions such as fast food or gas purchases 708, while another Tier 2 705 tier cryptocurrency could be restricted to use in Europe with the value tied to the Euro 709, with transactions limited in value and optimized for small local transactions such as fast food or gas purchases 710. For clarity and simplicity, only two exemplary regions are shown, but there could well exist many more. The 1st or "top tier" coin 701 is a generated coin—there will only be a limited number ever minted. It is the primary vehicle for monetary exchange and these coins contain all of the value in the system, except what is contained in the locally-valued 2nd Tier coins 705. These 2nd Tier coins 705 are also generated and are created when money moves into a local currency and are "destroyed" or invalidated when the money exits the system to the 1st Tier 701 or is cashed out of the system. The 2nd Tier coin 705 is also backed by a local agency or bank to stabilize the value of the 2nd Tier country-specific currency. In order to incentivize the local agencies, they will be allowed (under strict guidelines) to hold a portion of the funds in 1st Tier coinage 701 or utilize a portion of the funds for other activities. They will also have the option of insuring the value of the currency tied to 2nd Tier coin 705 and charge a fee to the users for that insurance.

Figure 8:
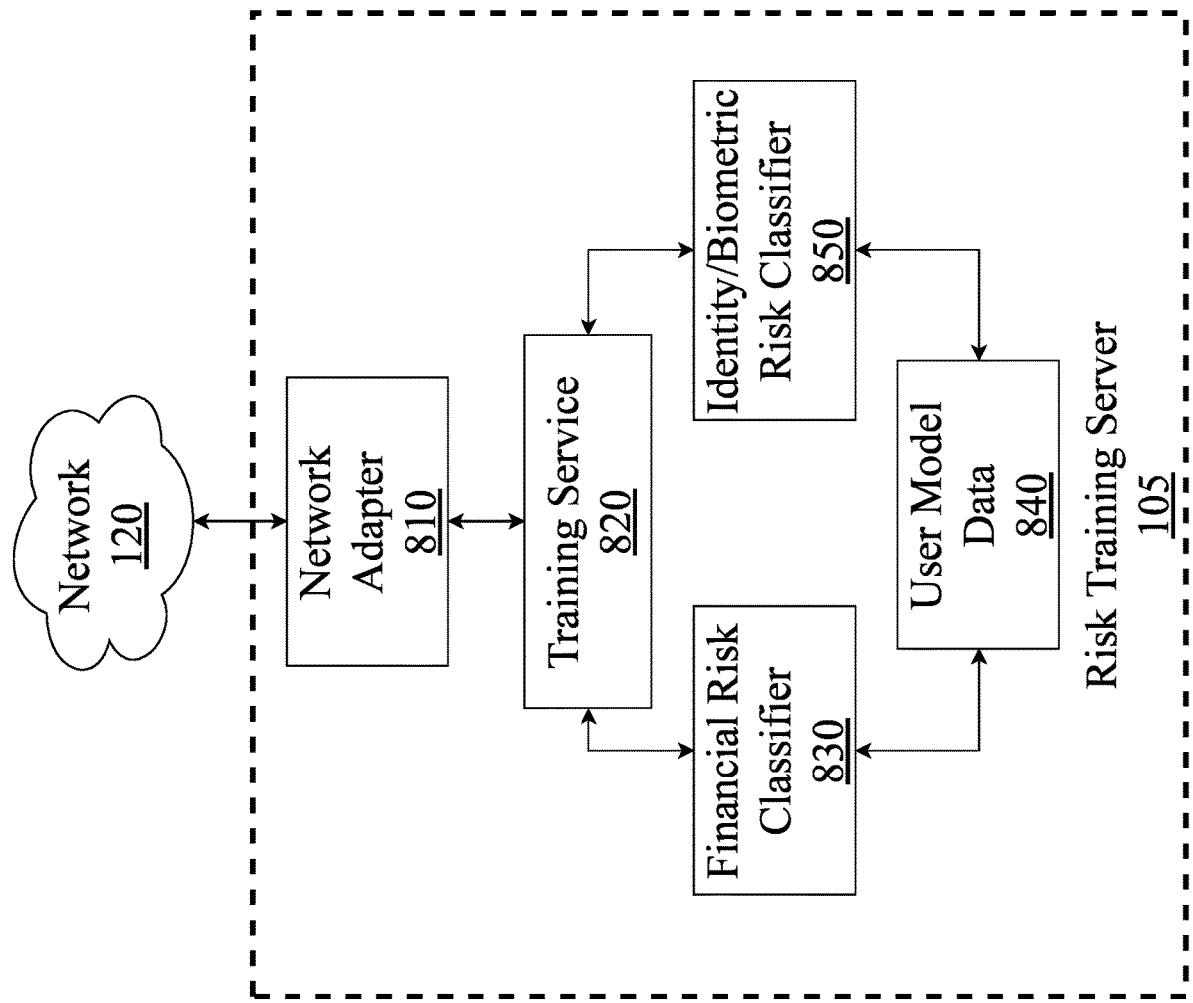
FIG. 8 is a block diagram illustrating internal components of a Risk Training Server, according to an aspect.

FIG. 8 is a block diagram illustrating internal components of a Risk Training Server, according to an aspect. A risk training server 105 exists which connects to a network or networks 120, with the user of a network adapter 810, to communicate with external services and servers, such as a smart wallet server or various servers and services that may feed data about users and transactions into the risk training server 105 to be considered for a composite risk assessment of a user or transaction. A training service 820 exists which may take incoming data, and train models 840 through the use of a financial risk classifier 830 and an identity and biometric risk classifier 850, to train a model for common or expected data from a user regarding their biometrics including their behaviors and common behaviors of vendors, financial transaction data to establish baseline transaction norms and patterns for a user including locations if applicable, and may locate anomalies that are far outside the range of the current model through the use of techniques such as mean reversion to determine anomalous patterns, or identifying individual events that are substantially different from the established norms. Such classification techniques may be configured and altered by a system administrator, and may incorporate machine learning techniques to identify pattern-defying datapoints. User data that is streamed to the server is used by the training service 820 to constantly train and update the user model 840 to build a comprehensive model that is capable of growing and changing with a user's growing and changing habits or biometrics (such as getting a haircut or suffering a disfigurement).

Figure 9:
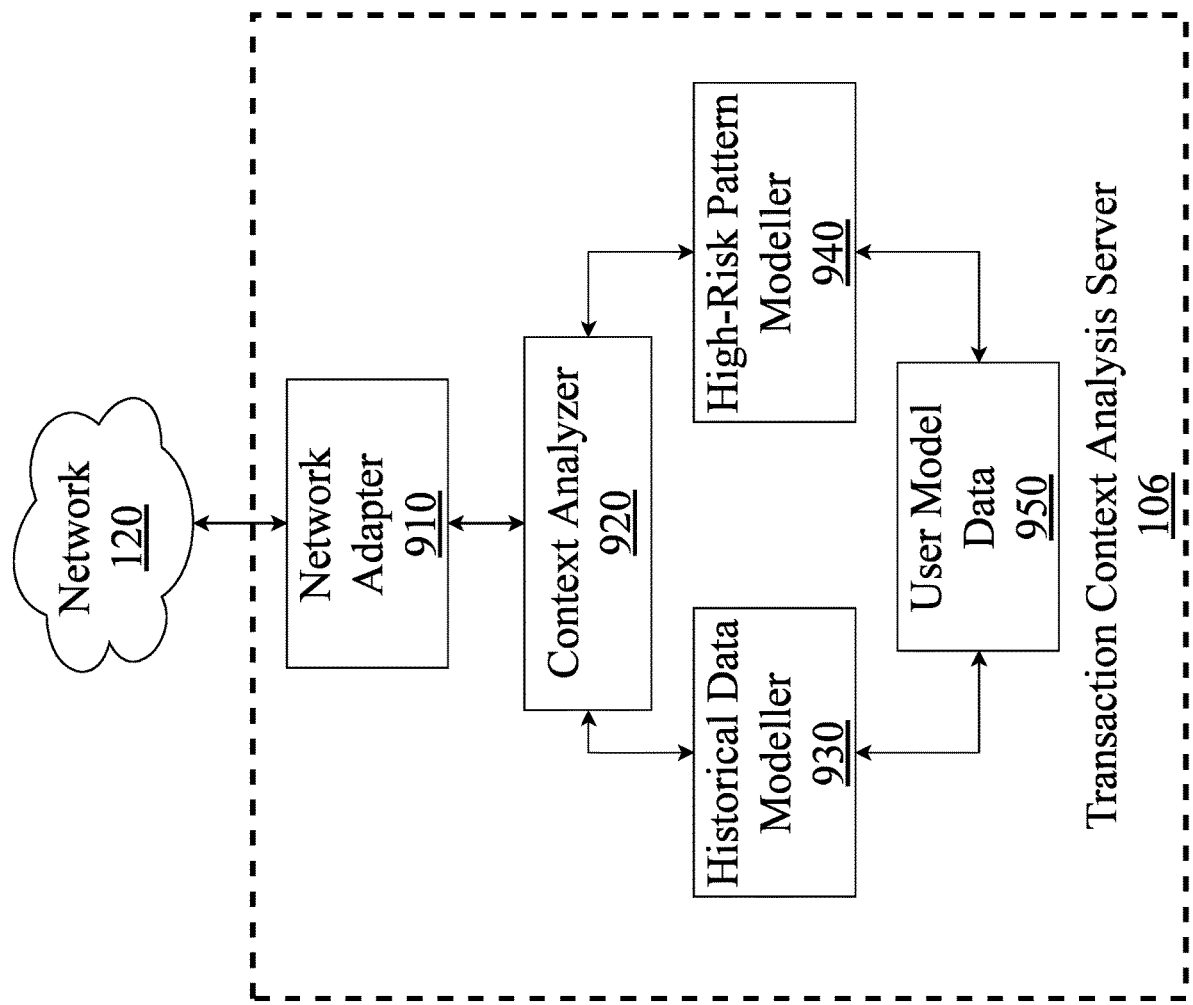
FIG. 9 is a block diagram illustrating internal components of a transaction context analysis server, according to an aspect.

FIG. 9 is a block diagram illustrating internal components of a transaction context analysis server, according to an aspect. A transaction context analysis server 106 exists connected to a network or networks 120, with a network adapter 910 for communicating with devices and services over the network 120. A context analyzer 920 is a software component that utilizes a historical data modeler 930 and high-risk pattern modeler 940 to model user data 950 and compare incoming data to that model. A historical data modeler 930 builds a model of typical user behavior based on historical patterns and typical transactions and parameters, while a high-risk pattern modeler 940 builds a model for high risk behaviors of a user based on both the individual user's high-risk actions, and based on high-risk transactions that other users have taken, or that are anticipated to be possible high-risk transactions. A model of the user 950 from both of these perspectives allows the context analyzer 920 to determine if a given transaction is an expected or non-anomalous transaction from a user, or if it is anomalous, if it's high-risk or not, and if it is either anomalous or high-risk or both, the context analyzer may respond to a requesting server or service with that information, such as for composite risk model generation from a risk training server.

Figure 10:
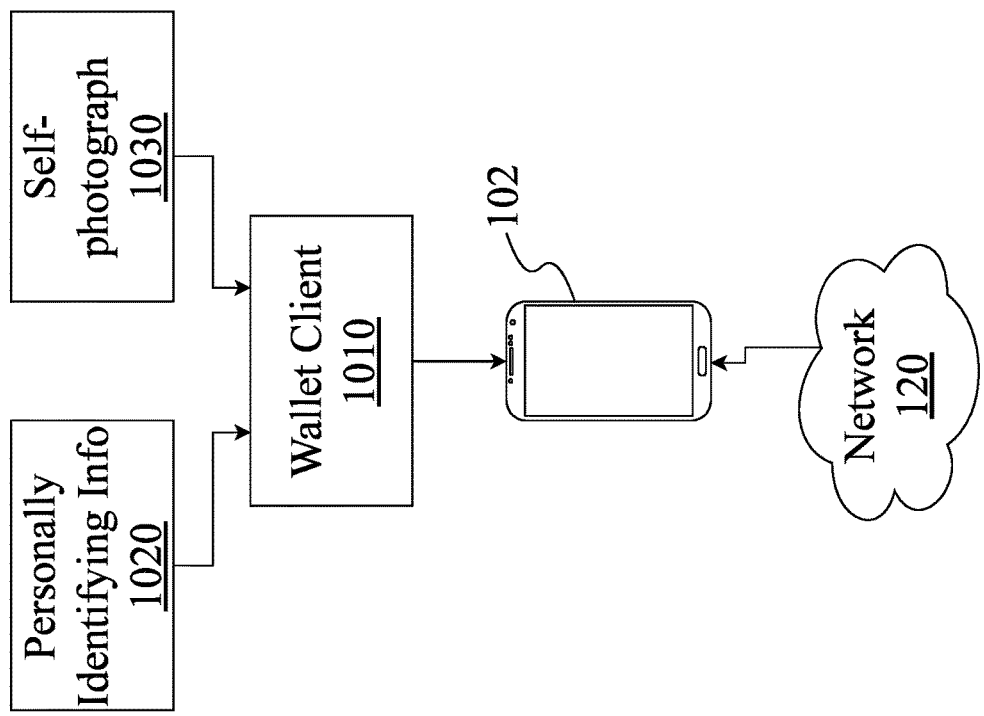
FIG. 10 is a block diagram illustrating a user mobile device with internal data including a self photograph and voice sample, connected over a network to a secure client on a server(s) or other device, according to an aspect.

FIG. 10 is a block diagram illustrating a user mobile device with internal data including a self photograph and voice sample, connected over a network to a secure client on a server(s) or other device, according to an aspect. A user's mobile device 102 may connect to a network or networks 120 to communicate with external servers and services, such as a smart wallet server, while using a smart wallet client application 1010. A mobile device 102 may be a cellular device such as a smartphone, or a tablet computer, or a personal digital assistant or something similar, and operate an operating system such as WINDOWS MOBILE™, WINDOWS 10™, IOS™, ANDROID™, or others that may be available. A smart wallet client 1010 is a software application running on a user device 102, that provides a user interface for interacting with a smart wallet, provides functionality for creating and accessing a smart wallet using personally identifying information 1020 and a self-photograph 1030 for identification of a user to access a wallet on an external server, and the wallet may provide communications services with a possible plurality of services and servers over a network 120 to provide additional functionality such as informing the smart wallet client 1010 of a limitation that should be placed on the wallet, allowing a smart wallet client to update records stored in or in conjunction with their smart wallet, and more.

Figure 11:
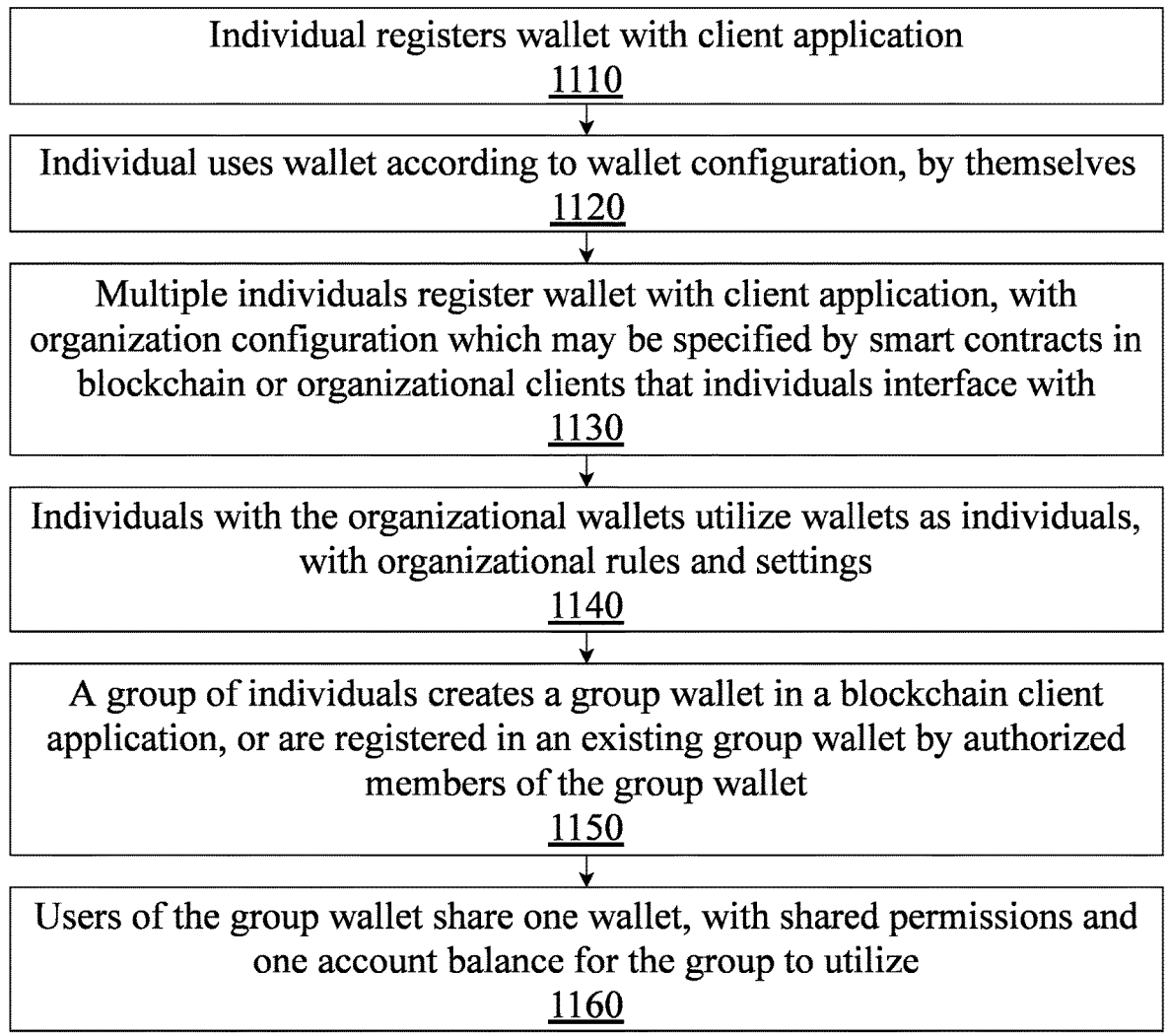
FIG. 11 is a method diagram illustrating steps in various users using different tiers or group-settings of smart wallets, according to an aspect.

FIG. 11 is a method diagram illustrating steps in various users using different tiers or group-settings of smart wallets, according to an aspect. An individual may register for a wallet with a smart wallet client application 1110, which may require some combination of password, biometric security, and personal information in order to register for it and access it in the future. An individual may use the wallet according to a specific wallet configuration, in this case an individual wallet 1120. User configurations that may be specified for wallets include the permission method and values, the wallet connection to a bank account or other financial institution (if any), preset limits on how much the wallet is allowed to spend on any one transaction, or other configuration settings. In another embodiment, multiple individuals may register a smart wallet with a client application, each registering individually and with their own device and application, wherein the wallets are set up with an organization configuration which may be specified through the use of smart contracts in the smart wallet blockchain, or which may be specified by the organization the wallet is tied to, using the smart wallet application itself to maintain the connection rather than the blockchain 1130. Individuals with the organizational wallets may utilize the wallets as separate individuals, but with organizational rules and settings 1140, such as any limits the organization's administrator may impose on the spending limit of the wallets, or jurisdiction limitations (such as being unable to use the organizational wallets outside of a specific country, or not being able to use them in a given jurisdiction such as a city), and their wallets may all connect to the same or separate business funding accounts depending on how the organization chooses to set up the wallets. According to a different embodiment for a shared group-wallet, a group of individuals may create a group wallet in a blockchain client application, or may be registered in an existing group wallet by authorized members of the group wallet 1150. In the case of a group wallet, users of the group wallet share one true wallet, with shared permissions and one account balance for the group to utilize 1160, and potentially one transaction history for the wallet that they all share and write to.

Figure 12:
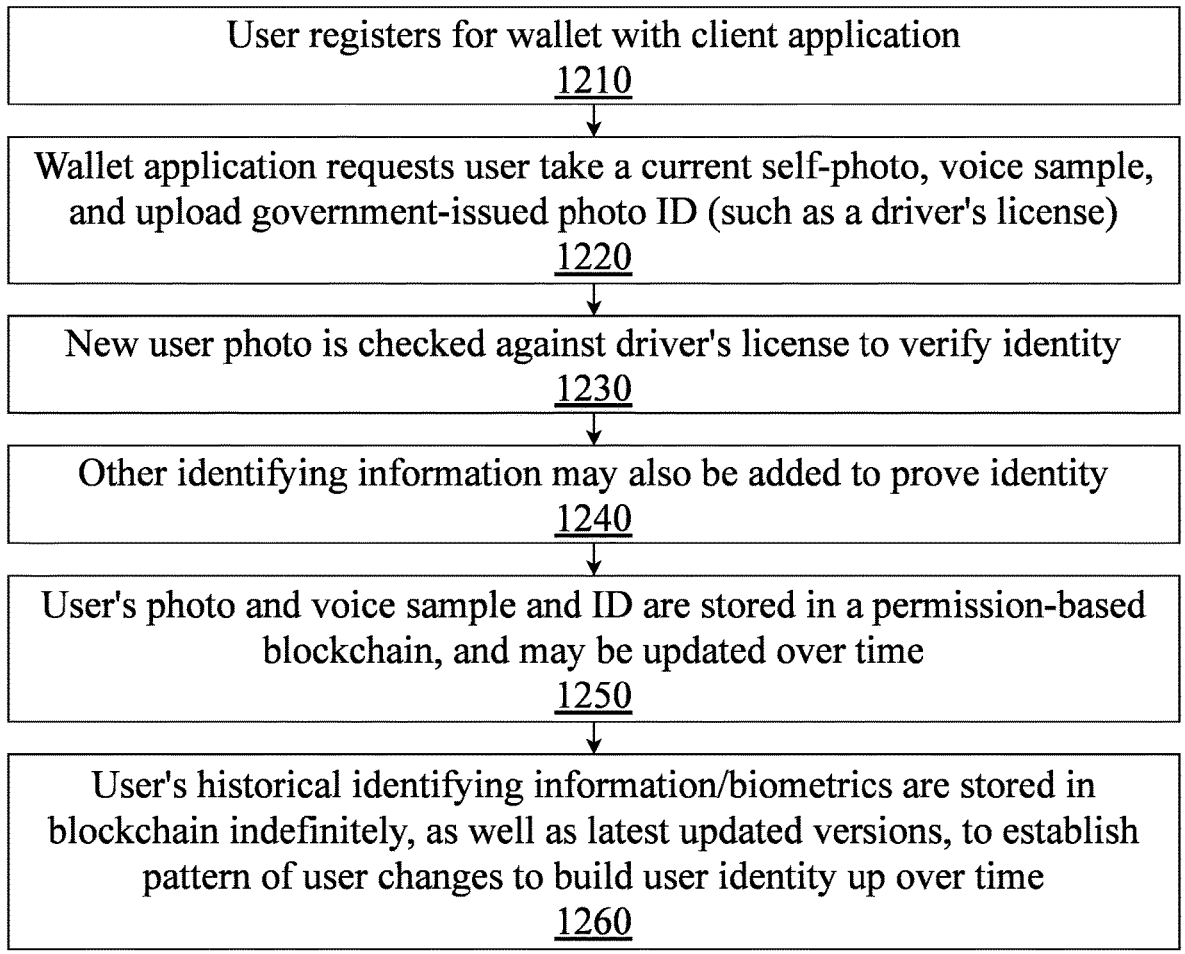
FIG. 12 is a method diagram illustrating steps in updating user credentials and biometrics, according to an aspect.

FIG. 12 is a method diagram illustrating steps in updating user credentials and biometrics, according to an aspect. An individual may register for a wallet with a smart wallet client application 1210, which may require some combination of password, biometric security, and personal information in order to register for it and access it in the future. A smart wallet application may request a user take a current self-photo or "selfie," and a voice sample, and upload government-issued photo ID (such as a driver's license) 1220 through a photograph which may have optical character recognition software identify the specific text of the ID. The new user photo may be checked against the ID to verify a user's identity 1230 and ensure the user is who they claim to be, using facial recognition and mapping software, while other identifying information may also be added to prove identity 1240 such as their social security number or a similar piece of identifying information, depending on the user's jurisdiction. The user's photo and voice sample and ID may be stored in a permission-based blockchain, and may be updated over time 1250 using a historical database or server that tracks changes in a user's voice and appearance, while a user's historical identifying information and biometrics are stored in the smart wallet blockchain indefinitely along with the updated versions, to establish patterns of user changes in order to build up a user identity over time 1260. In this way, unexpected user changes such as losing a limb, changing hairstyles, growing older, or similar, may be accounted for and will not prevent a user from accessing their smart wallet.

Figure 13:
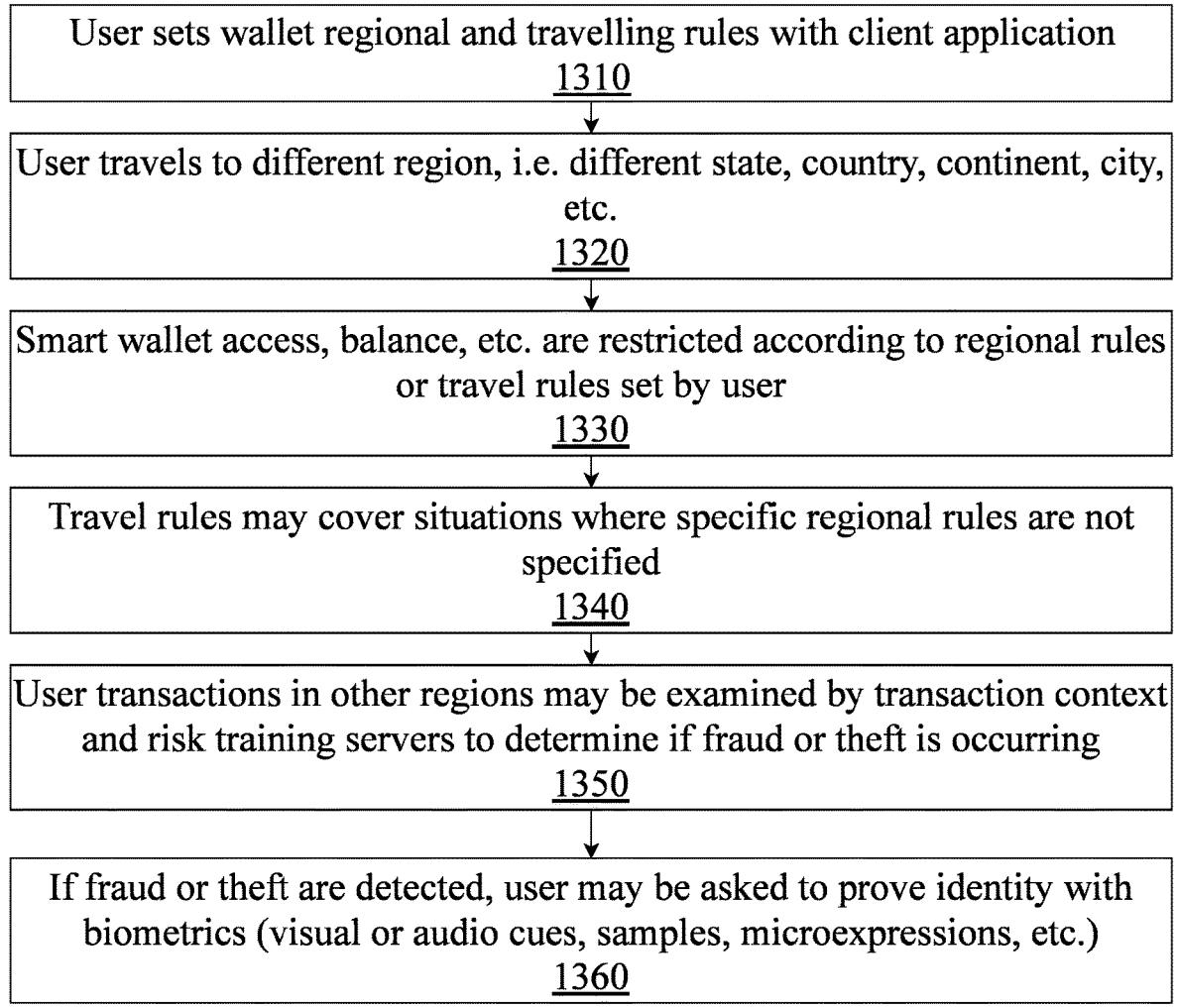
FIG. 13 is a method diagram illustrating steps in a smart wallet having altered settings and capabilities for a user during travel, according to an aspect.

FIG. 13 is a method diagram illustrating steps in a smart wallet having altered settings and capabilities for a user during travel, according to an aspect. A user may set a wallet's regional rules and travelling rules with client application 1310, in which there may be rules for wallet configuration when travelling to or from specific areas, and rules for when a user travels in general which may be applied when more specific rules are not being applied, or which may be applied if they are compatible with the more specific regional rules set by the user. A user may then travel to a different region, such as a different state, country, continent, city, or other jurisdiction or region 1320, at which point the smart wallet access, balance, and other features may be restricted according to the user's regional rules or travel rules 1330. The travel rules may cover situations where specific regional rules are not specified 1340 as previously mentioned, and user transactions in other regions may be examined by transaction context and risk training servers to determine if fraud or theft is occurring 1350, such as if a user was in Seattle one moment and then suddenly logs a wallet user at London making transactions the next moment. If fraud or theft are detected, the attempting user may be asked to prove their identity with biometrics such as visual or audio cues, voice samples, and microexpressions 1360, before transactions can go through, ensuring only the true user may access the wallet.

Figure 14:
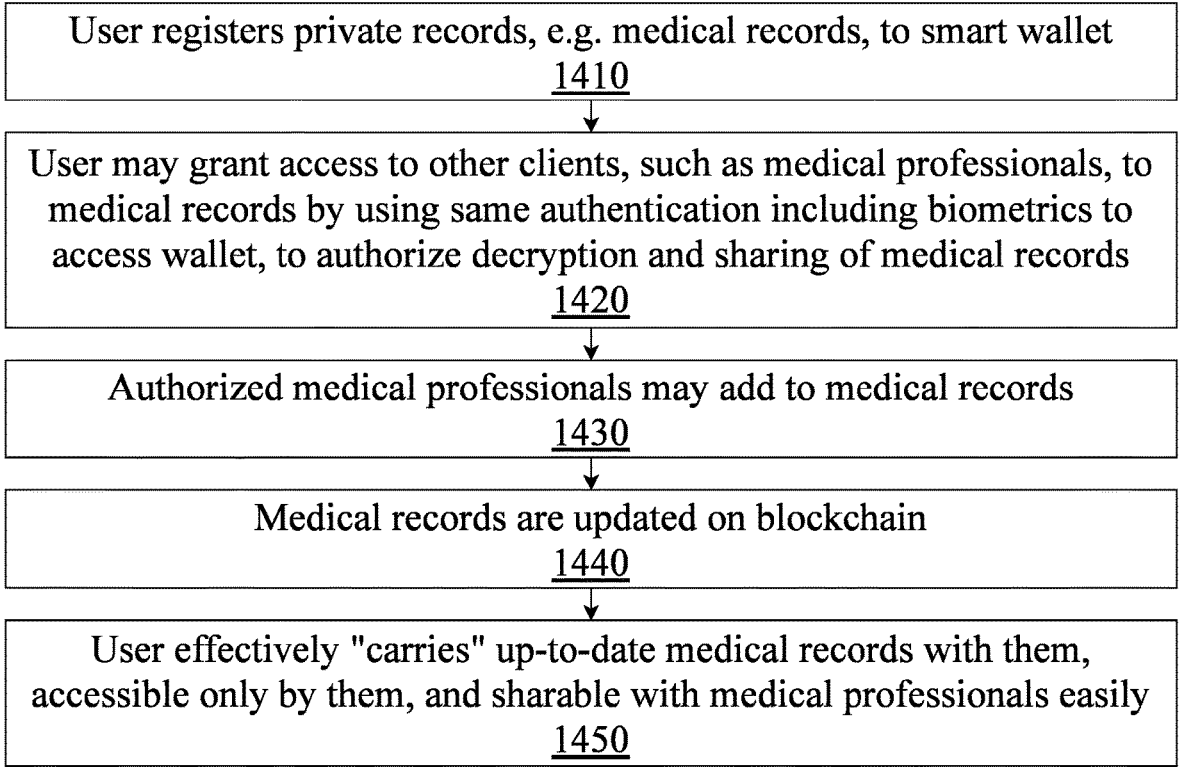
FIG. 14 is a method diagram illustrating steps in having medical records stored in a permissioned blockchain that a smart wallet user may access and grant others access to, according to an aspect.

FIG. 14 is a method diagram illustrating steps in having medical records stored in a permissioned blockchain that a smart wallet user may access and grant others access to, according to an aspect. A user may register private records, e.g. medical records, to a smart wallet 1410, through a smart wallet application, which may be written to the smart wallet blockchain. The user may then grant access to other clients, such as medical professionals, to medical records by using the same authentication established for their wallet, including biometrics to access the wallet, to authorize decryption and sharing of medical records 1420, which may be accomplished over a network, through email, or through some other method of sharing data between devices. The authorized medical professionals may add to the medical records 1430 by using the connection between their device and the user's device, which manages the data to be written to the wallet blockchain, at which point the medical records may be updated on the blockchain 1440. In this way, the user may carries up-to-date medical records with them, accessible only by them, which may be sharable with medical professionals easily 1450 and swiftly wherever they go.

FIG. 15 is a method diagram illustrating steps in real-time credit scoring of a smart wallet user, according to an aspect. According to this aspect, real-time credit scoring may be performed with multiple servers such as a microexpression detection server, transaction context server, and risk training server, and may utilize a connection to other information and services such as medical records and jurisdiction changes 1510, in order to generate and maintain a new kind of credit scoring that uses a smart wallet and user behaviors to track and maintain user credit worthiness. Microexpression detection may identify a user or other parties as being potentially illicit in intent 1520 specifically, such as determining that a user may be unsure of their ability to pay a loan back when applying, or determining that a car dealer is potentially behaving unscrupulously based on body language (if available to examine) or voice intonation and wording. Credit score information of the user may be encoded in the smart wallet blockchain, accessible by agencies requiring a credit score if they have installed software to communicate with the smart wallet server and make a request for only the credit score segment of a user wallet, as a result of the smart wallet credit scoring 1530. As part of the credit scoring and individual evaluations, the wallet software may even be configured to warn others if the user is behaving potentially illicitly, or warn its own user if another party or parties are behaving suspiciously based on body language (point camera at each other if allowed) or speech patterns, changes in voice and tone, specific wording and phrasing 1540, outright helping individuals avoid dangerous or illicit interactions based on microexpression validation.

Figure 16:
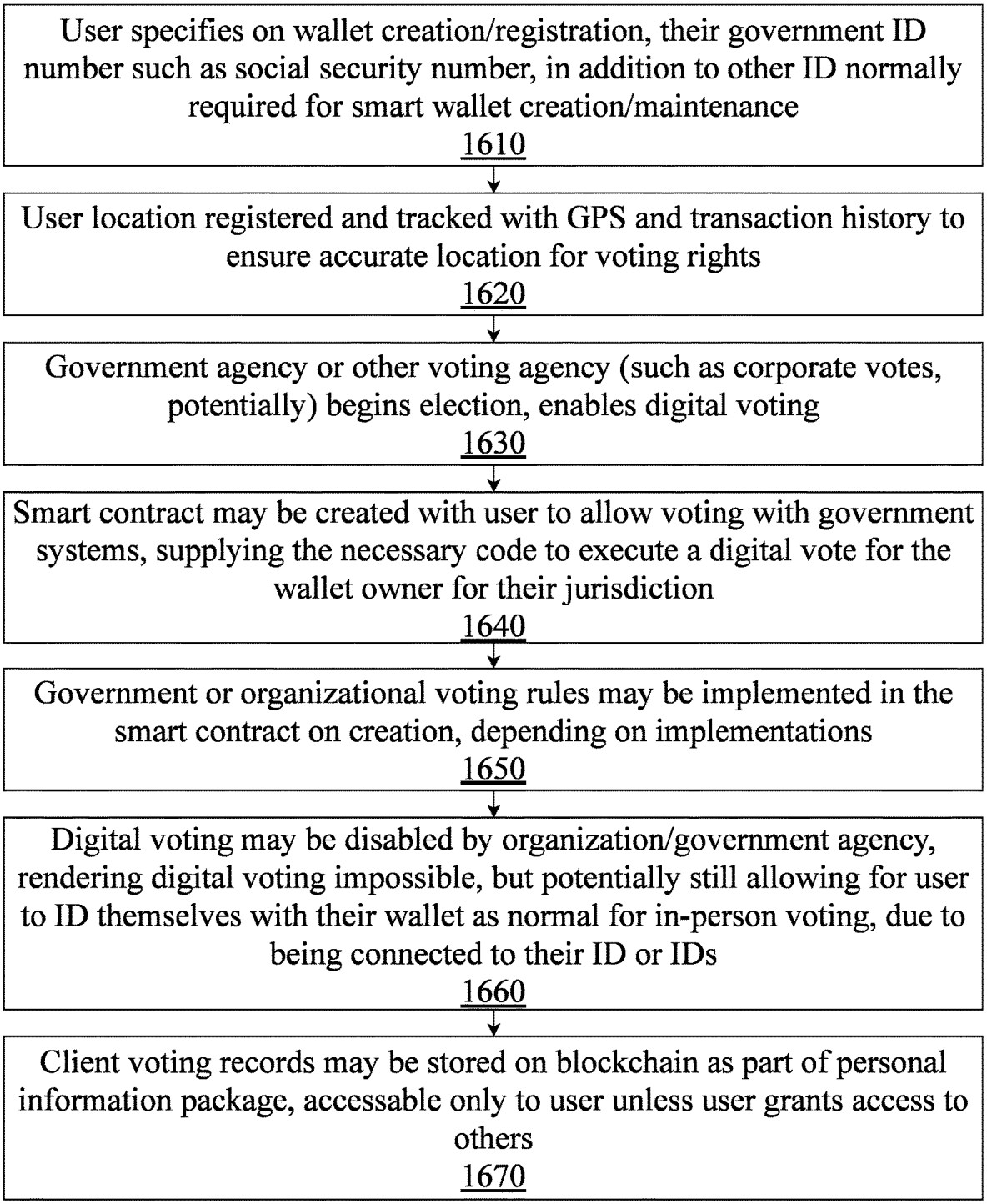
FIG. 16 is a method diagram illustrating steps in having voting records and identification stored in a permissioned blockchain that a smart wallet user may access and use for personal identification and digital voting, according to an aspect.

FIG. 16 is a method diagram illustrating steps in having voting records and identification stored in a permissioned blockchain that a smart wallet user may access and use for personal identification and digital voting, according to an aspect. A user may specify, upon wallet registration, their government ID number such as social security number, in addition to other ID or biometrics normally required for smart wallet creation 1610. The user's location may then be registered and tracked with GPS and their transaction history, when possible, to ensure an accurate user location is available for voting purposes 1620, so that if and when a government agency or other voting agency including a corporate voting agency begins an election and enables digital voting 1630, a smart contract may be created involving the user, to allow voting with the voting agency or agencies, supplying the necessary code to execute a digital vote for the wallet owner for their jurisdiction 1640. In this way, a smart contract validation server and a jurisdiction server may, together, allow for a user to use their smart wallet and personal identifying information to maintain their voter registration and cast their votes. Government or organizational voting rules may be implemented in the smart contract on contract creation, depending on implementations 1650, and digital voting may be disabled by organization/government agency, rendering digital voting impossible, but potentially still allowing for user to ID themselves with their wallet as normal for in-person voting, due to being connected to their ID or IDs 1660. In this sense the smart wallet acts not as a voting device, but as an identification tool. Client voting records may also be stored on the blockchain as part of a user's personal information, accessible only to the user unless the user grants access to others 1670, as with medical records.

Figure 17:
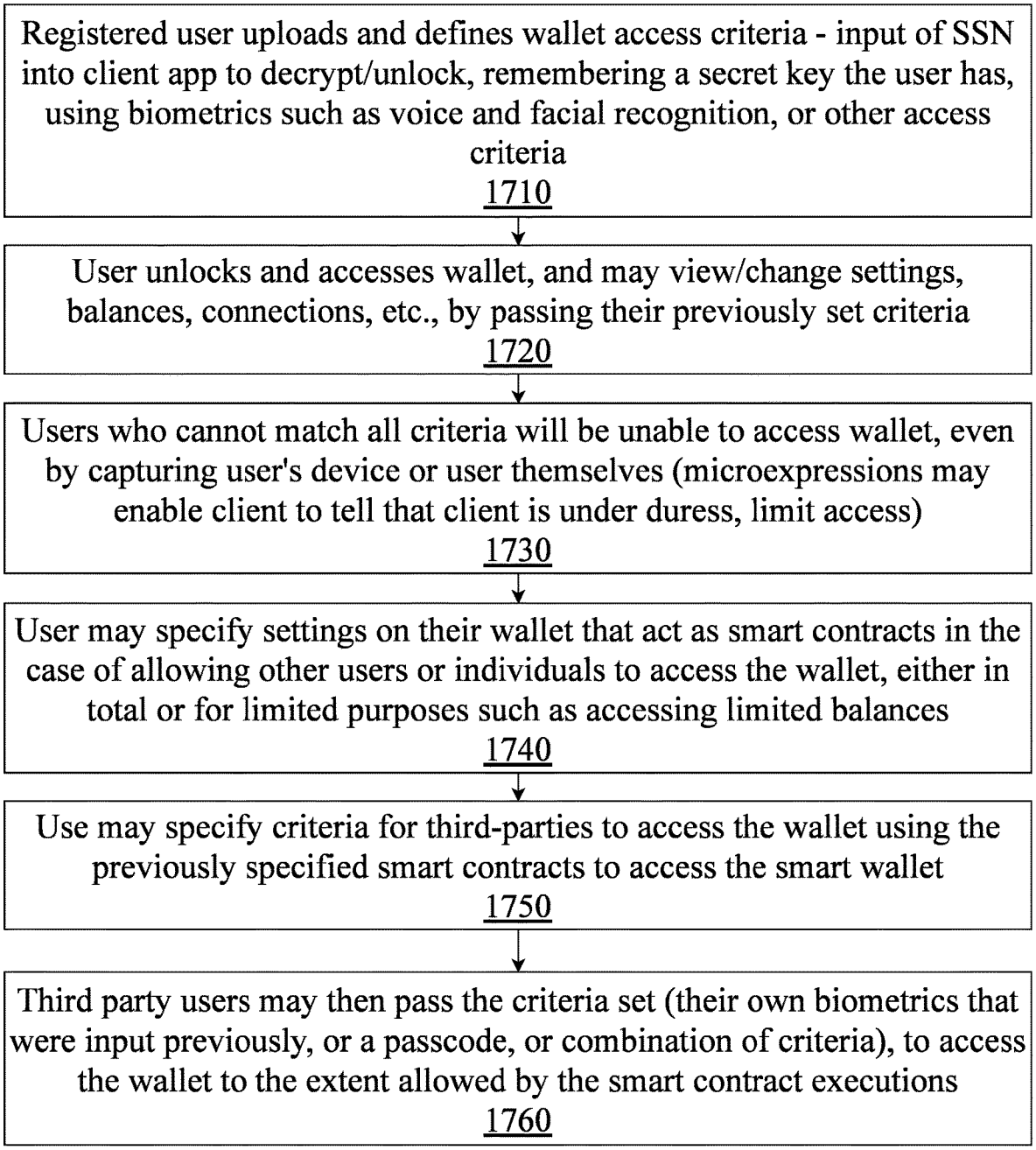
FIG. 17 is a method diagram illustrating steps in a smart wallet utilizing intelligent identification and access controls, according to an aspect.

FIG. 17 is a method diagram illustrating steps in a smart wallet utilizing intelligent identification and access controls, according to an aspect. A registered user may upload and define wallet access criteria including a user's SSN if applicable, into the smart wallet client application to access the wallet, or remembering a secret key the user has such as those common in many encryption standards, using biometrics such as voice and facial recognition, or other access criteria 1710, after which a user may unlock and access the wallet, and may view and change settings, balances, connections, and other configuration details by passing their previously set criteria 1720 to access the wallet. Potential wallet users who cannot match all criteria will be unable to access the wallet, even by capturing the original user's device or the user themselves. Microexpressions may enable the smart wallet application to discern that the user is under extreme duress, and limit access or disable wallet 1730. The user may specify settings on their wallet that act as smart contracts in the case of allowing other users or individuals to access the wallet, either in total or for limited purposes such as accessing limited balances 1740, and the user may specify criteria for third-parties to access the wallet using the previously specified smart contracts 1750. Third party users may pass the criteria set such as their own biometrics that were specified in the smart contracts, or a passcode, or combination of criteria, to access the wallet to the extent allowed by the smart contract executions 1760.

FIG. 18 is a method diagram illustrating steps in utilizing blockchain smart gateways and tiered blockchains to implement region-specific limits on a given smart wallet, according to an aspect. Smart security gateways may be operated by government agencies to implement regional control or region-specific limitations on smart wallets 1810, such as permitting only blockchain requests from IP addresses or phone numbers that come from a specific region, or that are identified with specific users or organizations. Smart gateways, and tiered-access blockchains, allow smart wallets of specific origins or of certain tiers not to operate freely in a given region 1820, such as restricting them in ways other than complete denial, for instance an American travelling to France might have regional controls in France preventing their wallet from making transactions over $1500 or an equivalent amount in another currency, until certain security checks are made to ensure transactions are non-fraudulent and safe 1830. Conversely, a wallet of a high tier such as from a wealthy businessman who travels frequently, may be authorized by smart gateways to make transactions of large amounts without hassle 1840, using the smart gateways. The smart gateways provide an external layer of security and configuration for controlling wallet behavior according to rules specified by the agency or agencies, or government, operating them, and may alter wallet behaviors in ways that users do not necessarily have to consent to or set up in advance, since they are restrictions imposed on users by an outside organization for the smart wallet blockchain, such as for purposes of regulation compliance.

Figure 19:
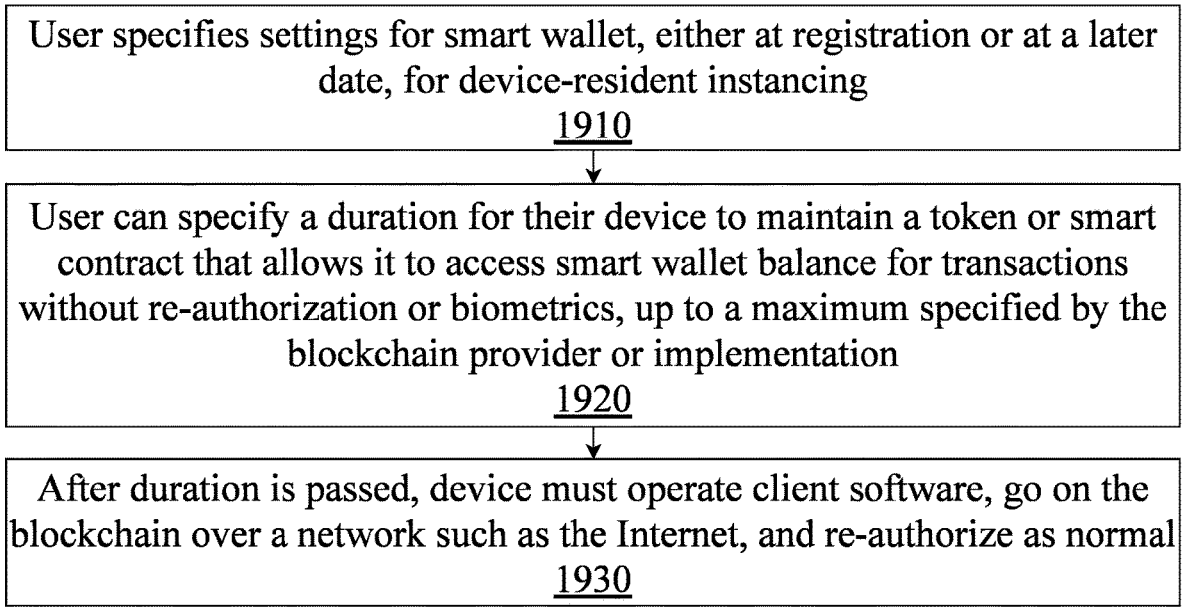
FIG. 19 is a method diagram illustrating steps in smart wallet being utilized with a dedicated device-resident instance that can operate offline temporarily, according to an aspect.

FIG. 19 is a method diagram illustrating steps in smart wallet being utilized with a dedicated device-resident instance that can operate offline temporarily, according to an aspect. A user may specify settings for their smart wallet with a smart wallet application on a mobile device, either at wallet registration or at a later time, for device-resident instancing 1910. A user can specify a duration for their device to maintain a token or for a smart contract to last before execution on smart wallet and smart contract validation servers, that allow the device to access a smart wallet balance for transactions without re-authorization or biometrics, up to a maximum specified by the blockchain provider or implementation 1920. After the duration is passed, the token expires or smart contract executes causing the device to no longer be authorized for access to the blockchain, and the device must operate client software and go on the blockchain over a network such as the Internet, and re-authorize as normal 1930, through the use of user permissions such as passwords or personal identifying information or biometric authentication, or some combination thereof, as preferred by the implementation of the blockchain and servers and services at hand.

FIG. 20 is a method diagram illustrating steps in microexpression learning, according to an aspect. A user, when first creating a smart wallet, may perform pre-set gestures in front of their mobile device camera, which may be self-held, or held by another person or a stand of some kind, depending on what their typical use case might be 2010. By "pre-set gestures" it is meant either gestures that the smart wallet application asks a user to make for calibration purposes, or gestures that a user decides upon to teach the smart wallet application and microexpression detection server how to recognize specific gestures, microexpressions, and movements in accordance with specific behaviors, or in accordance with a baseline of normal body movement. Pre-set actions may be those defined by the user in advance, i.e. "what I will do now is typical body language while talking to someone," or defined by client application, i.e. "please make a hand gesture" or "please roll your eyes derisively" 2020. The client application may request the user to repeat gestures multiple times, and may ask for or be given increasingly subtle gestures and contexts for them 2030. A plurality of convolutional neural networks may be applied to photos of numerous angles and repeated gestures to learn how to visually analyze user gestures and microexpressions 2040, and if the client application or microexpression detection server identify something incorrectly in production, a user may select an instance of the wallet taking action, and flag it as inaccurate, requiring re-learning, and backtesting of historical actions with re-learned models to attempt to differentiate its judgement, to improve performance 2050.

FIG. 21 is a method diagram illustrating steps in a smart wallet showing variable balance amounts, variable limits, and features based on rules specified by a user or by risk assessment and regional jurisdictions, according to an aspect. A user may set specific circumstances or rules in the smart wallet client application for variable balances, limits, and other features for their smart wallet 2110, such limitations may take the form of a smart contract that executes its code when conditions are met, limiting the smart wallet until conditions change 2120. Conditions may include location which may be tracked by transactions, GPS and phone location, venues and merchants to spend money at, or be context dependent, such as being under duress, detecting a suspicious third party actor such as an untrustworthy salesman, or other contextual conditions for limiting the smart wallet 2130. When conditions are met, the user balance may show a lower amount or user may have their spending limit temporarily lowered, to prevent misuse, fraud, and obey user directives for such limits if set prior, as well as limits not required to be set by a user such as limiting purchases if fraudulent or untrustworthy transactions are suspected 2140.

Figure 22:
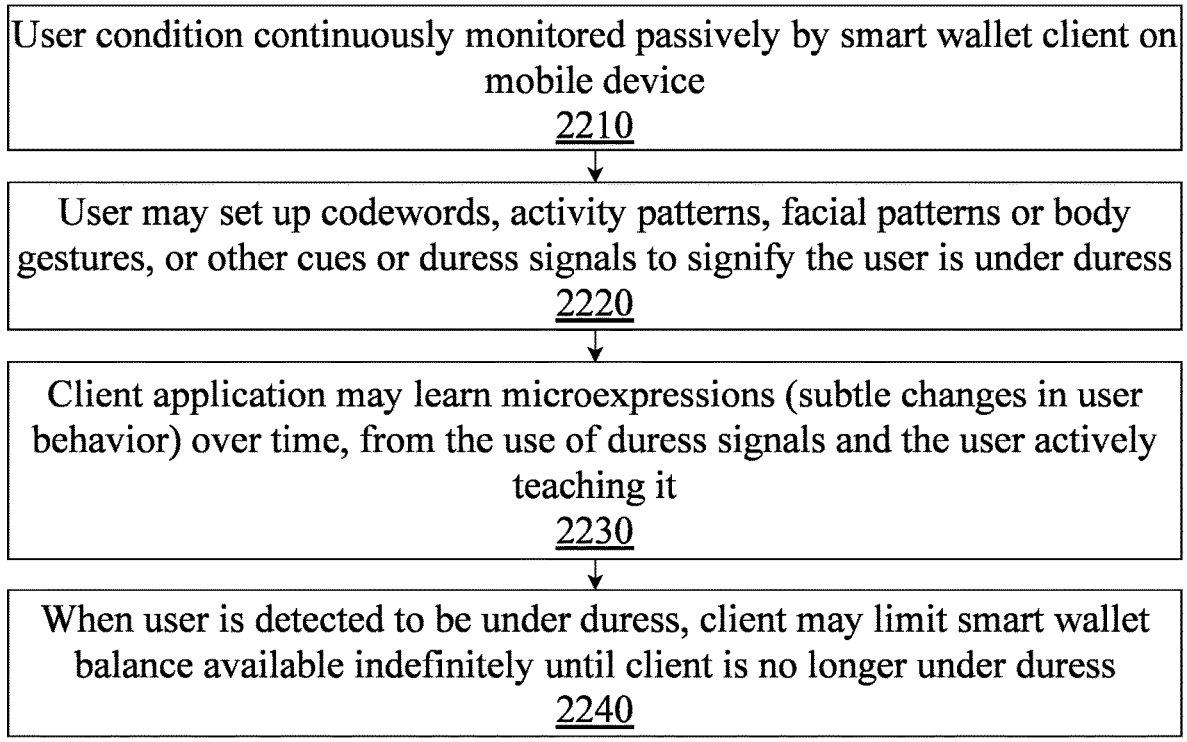
FIG. 22 is a method diagram illustrating steps in utilizing and teaching condition signaling such as duress signals that can limit balances and alter the functionality of a smart wallet in discrete or passive ways, according to an aspect.

FIG. 22 is a method diagram illustrating steps in utilizing and teaching condition signaling such as duress signals that can limit balances and alter the functionality of a smart wallet in discrete or passive ways, according to an aspect. A user's condition is continuously monitored passively by a smart wallet client on a user's mobile device 2210, listening for verbal cues of events occurring and for the purposes of evaluating the user's mental or emotional state with the help of a microexpression detection server. A user may set up at any time with their smart wallet application, a single or plurality of codewords, activity patterns, facial patterns or body gestures, or other cues or duress signals to signify that the user is under duress 2220, which may alter smart wallet behavior. The client application may learn microexpressions and verbal cues of the user over time, from the use of duress signals and the user actively teaching it 2230, or this learning and application may be relegated to a microexpression detection server and risk analysis server. When the user is detected to be under duress or in danger, the client application may limit the available smart wallet balance indefinitely until client is no longer under duress 2240, both by using microgesture and verbal detection, and user biometrics, to ensure both that the user is the one attempting to access the wallet and that the user is not under duress.

Figure 23:
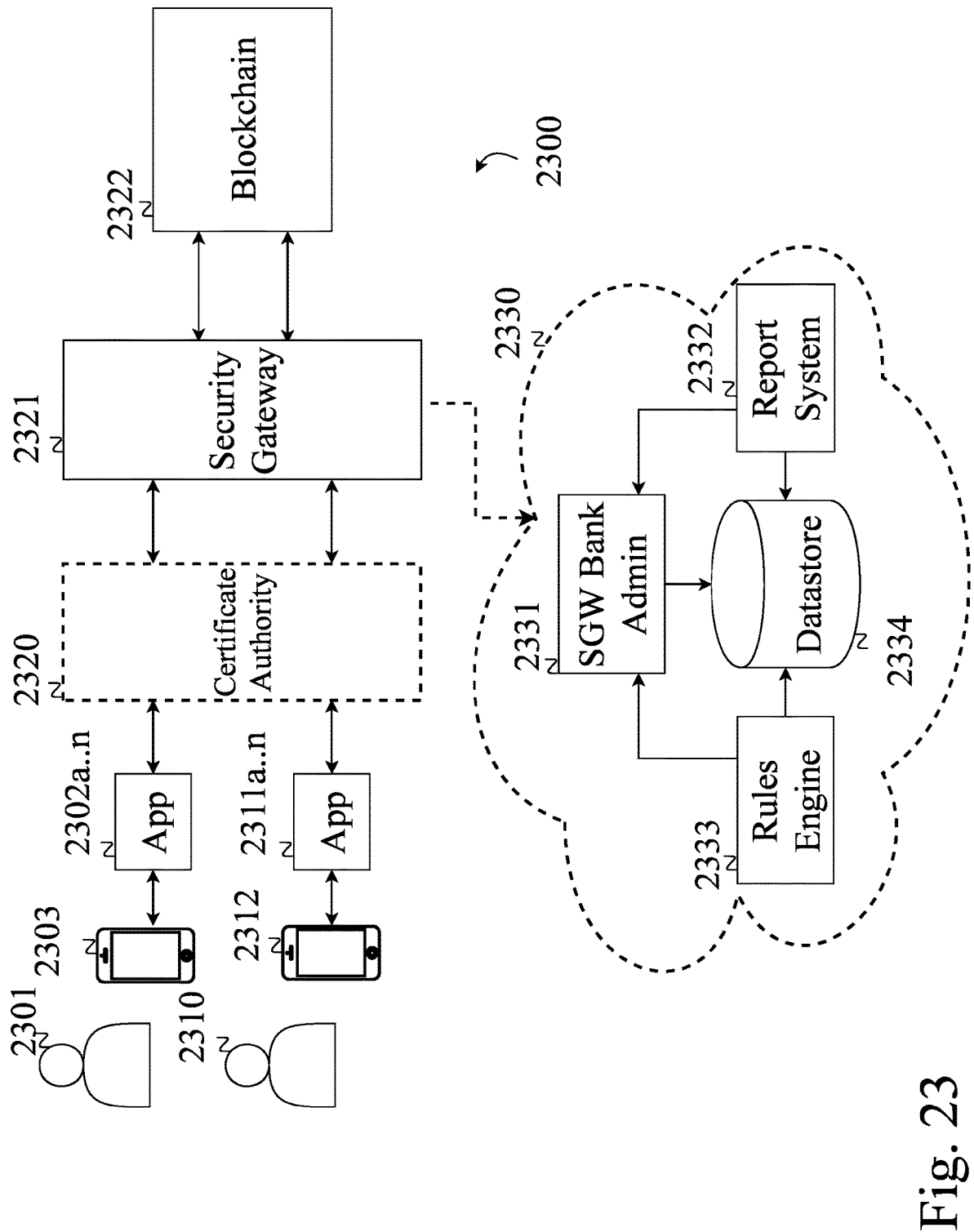
FIG. 23 is a system diagram illustrating an overview of an exemplary security gateway integration schema.

FIG. 23 is a system diagram illustrating an overview of an exemplary security gateway ("SGW") integration schema. This integration schema may be between a user and for example, one or a plurality or combination of banks, insurance companies, utilities companies, governments, or other public or private institutions, to name just few examples of possible organizations which may be involved in the interaction with a user. In an exemplary overview 2300, user 2301 may wish to access information from an organization or organization manager 2310, but must first request access to the organization's information via blockchain 2322 (the main data store for all money transfers), going through a possible plurality of steps and services such as a certificate authority 2320 and security gateway 2321 rather than directly accessing the blockchain network 2322. Alternative arrangements of such elements or the addition of further elements to increase security and scrutiny in the system may be possible, and this exemplary overview is not limiting on the number of other elements which may be present in an overall completed system of this type.

A user 2301 and exemplary organization or organization manager 2310 may use their applications 2302a . . . n and 2311a . . . n, which may be singular applications designed to interface with such a firewalled blockchain network, or may be a plurality of applications for this purpose, to request and send information on their devices 2303 and 2312, respectively. These devices 2303, 2312 may be mobile cellular devices, personal digital assistants ("PDA"), laptop or desktop or other personal computing devices, tablets, or other computing devices capable of operating applications and communicating over a network. User application 2302a . . . n may be a web application such as a browser-enabled application, or an application from an application marketplace such as those on modern smartphones including ANDROID™ and IPHONE™ devices, which allows the user to have several accounts in different organizations/ currencies, stores money, and sends transactions to other accounts. Organization manager application 2311a . . . n may be a web application such as a browser-enabled application, or an application from an application marketplace such as those on modern smartphones including ANDROID™ and IPHONE™ devices, which acts as an interface for the organization's SGW.

In a potential first step, a user application 2302a . . . n may request a digital certificate from a certificate authority ("CA") service 2320, which is a separate container responsible for basic security and identity verification, such as for example the hypertext transfer protocol secure ("HTTPS"). A user application 2302a . . . n may then send an access request to SGW 2321, a separate container which manages the organization's business rules, users, data access, and transactions; and provides local cache mechanisms. After the SGW 2321 validates the application parameters and checks access, user application or applications 2302a . . . n may access blockchain 2322 (the main data store for all money transfers). Blockchain 2322 then sends a success response back to user application 2302a . . . n via SGW 2321.

Such communications may take place with communications protocols over networks including the Internet or a PSTN using dial-tones. User 2302a . . . n and organization manager applications 2311a . . . n can only access the SGW, and only the SGW 2321 can access the blockchain. This restricted access is critical because it creates the firewall.

SGW 2321 may contain at least four elements 2330 including a rules engine 2333 which may inspect requests to make sure requests comply with a set of rules, allowing only select, compliant requests to be passed on to the blockchain. Further, an SGW may include an organization admin 2331 or generic admin module, a report system 2332, and local database (DB) 2334. In this example the datastore 2334 may contain only one organization's data, for instance data pertaining to the users and rulesets for a particular bank's operation. An organizational administration module 2331 may allow qualifying administrators in the system, as specified in the local database 2334, to make changes to the system as required of administrators, including potentially adding other administrators or changing the rules encompassed in the rules engine 2333, or viewing and acting on reports from the report system 2332 which may include reports on unauthorized access attempts, or even a log of authorized SGW usage. However, a database 2334, rules engine 2333, and a security gateway 2321 could potentially be configured to operate for multiple organizations or groups or administrators (or some combination thereof), allowing a centralized system to operate as a blockchain firewall for multiple organizations and users rather than only one.

In addition to deciding whether or not a user application request may continue on to the blockchain, the SGW in this example may manage users at least by creating new accounts, setting account balances, managing rules by checking black and white lists, processing the accounts' limitations, managing data access which guarantees that the user can see only his/her transactions and the organization can manage only its own users, managing transactions which guarantees that the user's transitions are atomic, and provides local cache mechanisms to ensure fast searching and provide rules management.

Figure 24:
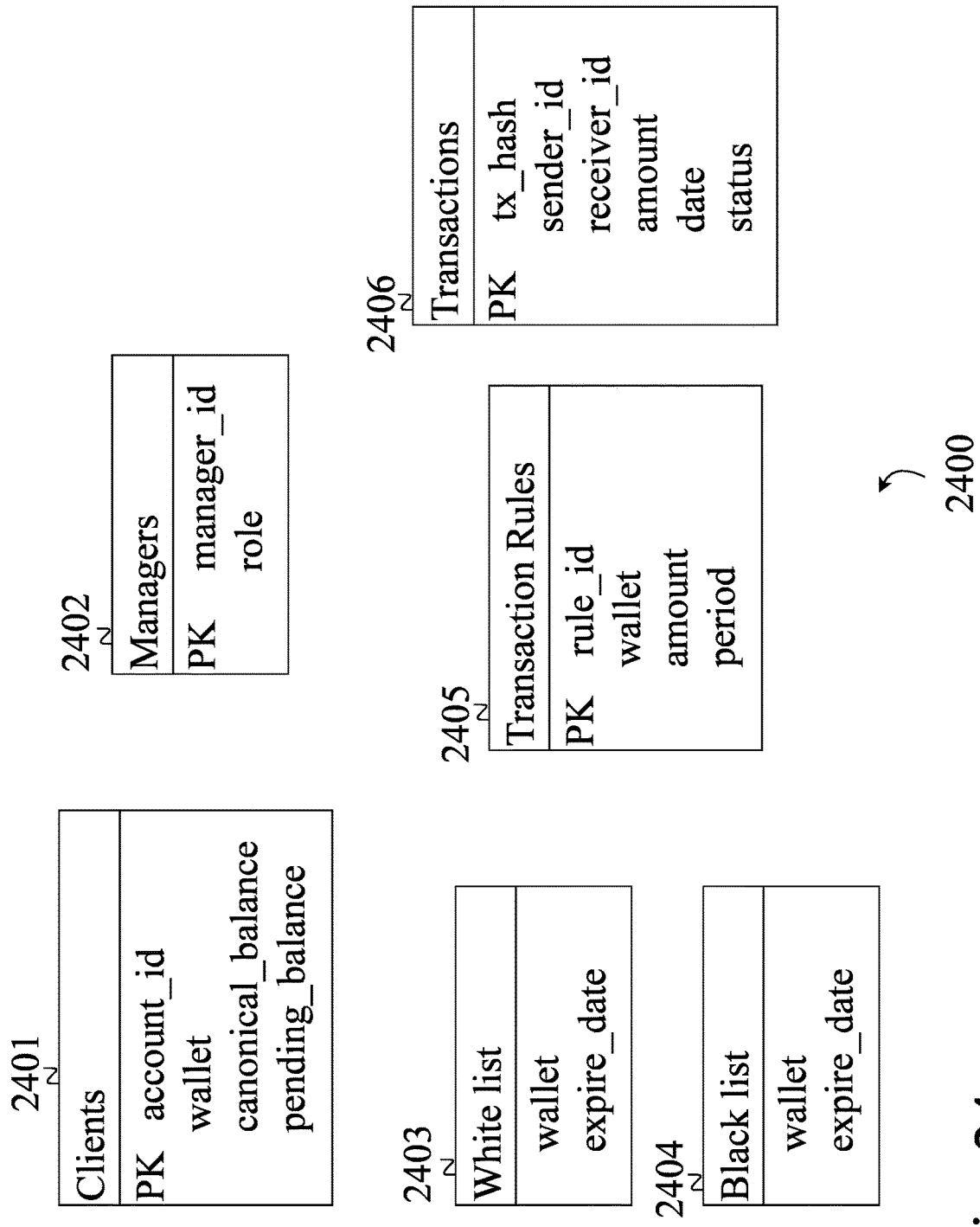
FIG. 24 is a diagram showing possible exemplary database tables for a security gateway in a system with only one organization.

FIG. 24 is a diagram showing possible exemplary database tables for a security gateway in a system with only one organization. The SGW database structure example 2400 contains 6 elements, including a table for clients 2401, managers 2402, a white list 2403, a blacklist 2404, transaction rules 2405, and transactions 2406. This SGW database structure 2400 skips the user's and manager's private information, access control system, and version control system, all of which might be included in some implementations of the system, as well as other information. Notably, several tables include having access tied to private/public key pairs, including the tables for clients 2401, managers 2402, transaction rules 2405, and transactions history 2406. In this way, only users with the proper keys and therefore authorizations are able to view (or both) the appropriate table information. With a clients table 2401, it is possible to keep account of a client's account ID internal to the organization that works with the client, their wallet identification and contents, their "canonical" or "current" balance, and their pending balance which may include transactions that have been initiated but not finalized yet. A manager table 2402 may include at least information including the manager's ID and their role in the organization, as well as being locked by a public/private key encryption to ensure only authorized personnel may attain access to the database or the system with the manager credentials. A white list 2403 and black list 2404 both may maintain lists of wallet ID's and their expiration date, which may be either the expiration date of the wallet or the expiration date of that wallet's entry in the relevant database table, the white list being a list of wallets which are explicitly permitted to be used in the system, whilst the black list is the opposite, a list of explicitly denied wallets not permitted to be used in the system, depending on the rules system in place for the system with the given organization or organizations. It is important to note that "table" in this context does not refer to a specific, rigid implementation of database structure, but that multiple database forms may be utilized, including structured query language ("SQL") databases, no-SQL databases, and others. A "table" may be a traditionally understood database table, or it may be some other variation, including a "view" which is a technique utilized in some database systems to form a virtual table that does not actually exist in the database itself, but is an abstraction of connections between data elsewhere in the database. Transaction rules 2405 may include a rule ID corresponding to individual rules or groups of rules depending on a specific implementation, a wallet ID field along with an amount and period field to represent rules relating to what manner of transactions a given wallet is allowed to take part in, and for how long the rule is in effect, in this exemplary database schema. Lastly, a transactions table 2406 contains data pertaining to transactions in the blockchain that have passed through the SGW system, including fields for transaction hash or "tx_hash," the sender ID and receiver ID for the respective parties in a transaction, the amount the transaction was for, the date it took place on, and the status of the transaction, for instance either "SUCCESS," "FAILED," "INSUFFICIENT FUNDS," or some other status that might be useful depending on the implementation. This database schema is only one of many possible database schemas, and should not be taken to be limiting on the invention but rather exemplary of the invention's possible conceptual architecture.

Figure 25:
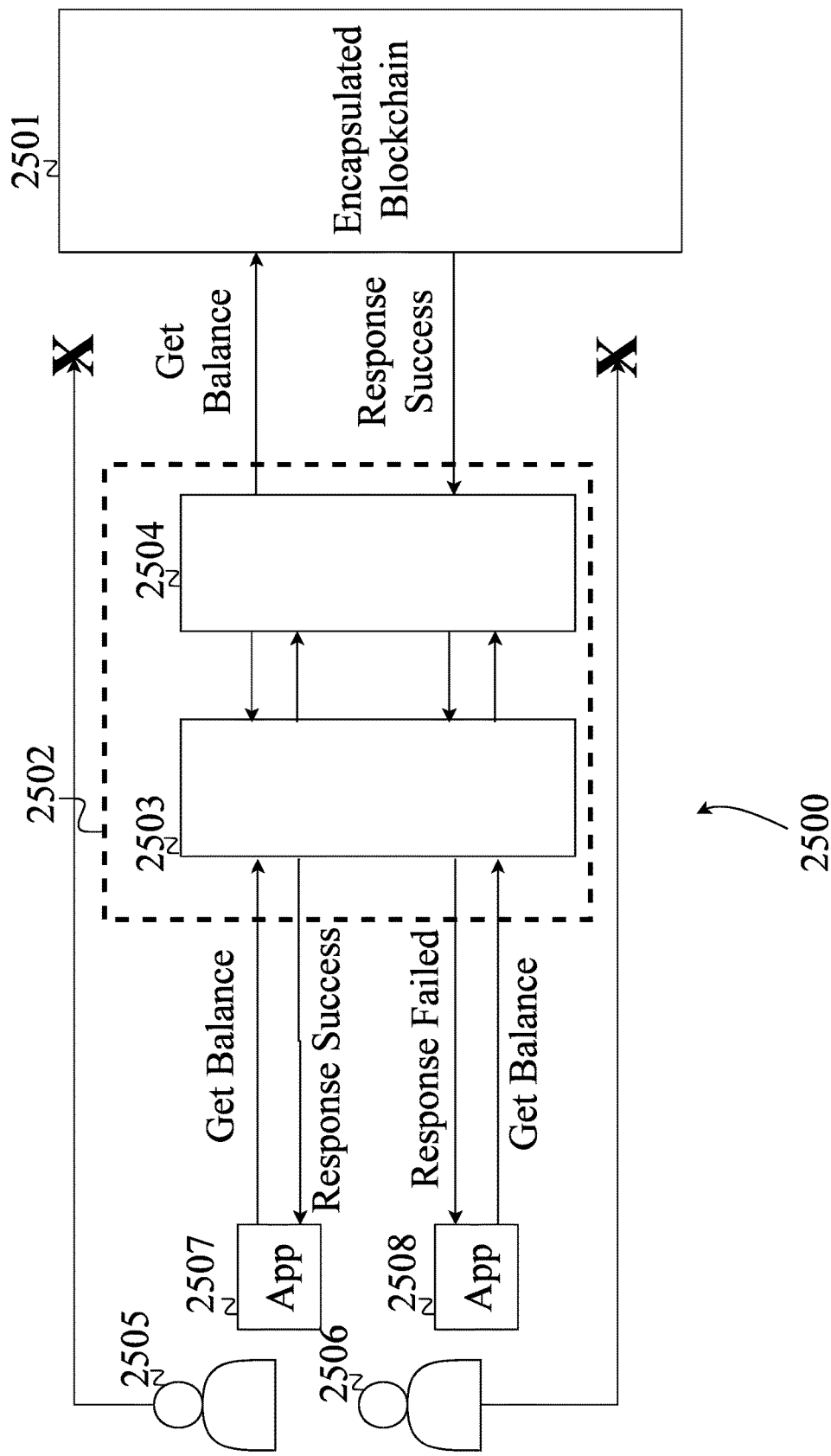
FIG. 25 is a diagram showing an overview of an exemplary security gateway workflow for a standard ETHEREUM® blockchain.

FIG. 25 is a diagram showing an overview of an exemplary security gateway workflow 2500 for a standard ETHEREUM® blockchain. When considering a standard ETHEREUM® wallet application, users connect via standard wallets and applications, and a custom connection to the SGW is needed. A main goal of a SGW 2502 is to encapsulate blockchain 2501 so only the SGW has access to the blockchain via wallets (or other applications), thereby providing the firewall effect desired in order to make the blockchain secure.

An exemplary SGW workflow for a user 2505 may begin with a user 2505 sending a request to the SGW 2502, for instance to see their balance, the request being sent via their user application or applications 2507. Such requests may be sent over the Internet, over a wide area or local area network, over the PSTN, or over some other network, and the application or applications may be operating on a device including but not limited to a cellular phone, personal digital assistant, tablet computer, personal computer or laptop, or other computing device capable of the requisite connections and application execution. After an initial request or requests are sent from a user, the SGW 2502 would receive these requests and may check if the request type is allowed 2503 such as with a ruleset or with any of the checks in a database schema such as described earlier, including verifying or having another service verify the identity and authorization of the user making the request. The SGW might determine if the user 2505 is provisioned to make the request to 2504 based on the database entries including ruleset values, before the SGW 2502 may forward the request to the encapsulated blockchain 2501, whereupon the encapsulated blockchain 2501 may process the request. The encapsulated blockchain

2501 may then send a success response to SGW 2502, and the SGW 2502 may pass the success response to user 2505. The SGW workflow for a blacklisted user 2506 may follow a similar succession, except the SGW 2502 may not forward the user request (sent via blacklisted user application 2508) to the blockchain, and instead may send a standard ETHEREUM® error response back to blacklisted user 2506 after step 3.

It is important to note that the specific steps in the use of the SGW system to produce a secure, firewalled blockchain are not specific only to the ETHEREUM® blockchain implementation, and this system may be used with other forms of blockchain networks, including those used for purposes other than currency transfers. Smart contracts are capable of being executed through the blockchain firewall and security gateway system if the ruleset for permitted transactions and network connections through the SGW includes smart contract executions, and further, a ruleset and SGW could be configured to allow only specific kinds of smart contracts, or only smart contracts for specific users, to be executed. The system offers highly modular functionality which may work across numerous network types and in numerous possible situations, and the methodology described merely describes exemplary implementations.

The SGW is crucial to ensure that only select users (those not blacklisted) request the balance of a wallet In a workflow without an SGW, any user can request the balance of any wallet. In a workflow with an SGW, the standard wallet will send the same request as if there was no SGW, but the SGW will only allow the user request to pass on if the wallet is not blacklisted. If the wallet is blacklisted, the user will receive a standard error message. Therefore, with a SGW, only select users can request the balance of any wallet.

After the blockchain grants the user access, the user can log in to the SGW online and manage the blacklist and list of users. Managing these lists gives the user control of which users can send requests to the blockchain and gain access to the balance of a wallet.

In other cases, rather than organizations, this SGW could be used for online shopping, supply chain management, software management etc. or any other suitable situation in which insecure devices need to access a secure blockchain section.

In some cases, where users with insecure devices need to access a system with a secure blockchain, a security gateway may be employed. In the systems, the SGW may have at least two sets of communication ports, a rules engine, an admin module, a reporting system, and a local database. The SGW rules engine is responsible for checking the credentials of the requestor; inspecting access requests (which may include a TPSC); inspecting the TPSC to ensure compliance with a rule set; and either rejecting or passing on these requests to the blockchain. In cases where a TPSC transfer is accepted, the transfer may only be completed after the TPSC is wrapped in a safety wrapper so it is partially or fully disabled. In some cases, a SGW with at least two sets of communication ports, one connected to the secure blockchain, with several modules including at least one rules engine, admin module, reporting system, and local database, will have a rules engine that is learning and creating new rules based on inspection of previous transactions on the blockchain. In yet another case, between a secure blockchain, users on a not secure network, a SGW with at least two sets of communication ports, one connected to the secure blockchain, and that SGW having several modules including at least one rules engine, admin module, reporting system, and local database, that rules engine inspects transactions for compliance with a set of rules, and only fully compliant transactions are passed on. Further, such compliance includes checking of credentials of the transaction initiator. Furthermore, the request or transaction may include a TPSC. In yet some cases, the TPSC is inspected for its behavior according to a rule set, and in response to the outcome of the inspection a transfer may be rejected. Further, that TPSC is inspected for its behavior according to a rule set, and in response to the outcome of the inspection a transfer may be completed only after wrapping the token in a safety wrapper disabling at least part of its active functionality. Moreover, some TPSC are inspected for their behavior according to a rule set, and in response to the outcome of the inspection a transfer may be completed only after placing those tokens in a safety container disabling all of its active functionality. In some cases, in a system with a secure blockchain, users on a not secure network, a SGW with at least two sets of communication ports, one connected to the secure blockchain, the SGW having several modules including at least one rules engine, admin module, reporting system, and local database, that gateway enforcing secure access between endpoints to a blockchain domain that comprises a ledger. In some other cases, in a system with a secure blockchain, users on a not secure network, an SGW with at least two sets of communication ports, one connected to the secure blockchain, that SGW having several modules including at least one rules engine, admin module, reporting system, and local database, that gateway enforcing communication filtering, hardening and Distributed Denial of Service ("DDoS") protection. In yet other cases, in a system with a secure blockchain, users on a not secure network, an SGW with at least two sets of communication ports, one connected to the secure blockchain, that SGW having several modules including at least one rules engine, admin module, reporting system, and local database, wherein the gateway enforces blockchain protocol filtering based on organizational policy. In some cases, in a system with a secure blockchain, users on a not secure network, a SGW with at least two sets of communication ports, one connected to the secure blockchain, the SGW having several modules including at least one rules engine, admin module, reporting system, and local database, wherein the gateway enforces blockchain protocol filtering based on user identification and adjust to the user permissions.

Figure 26:
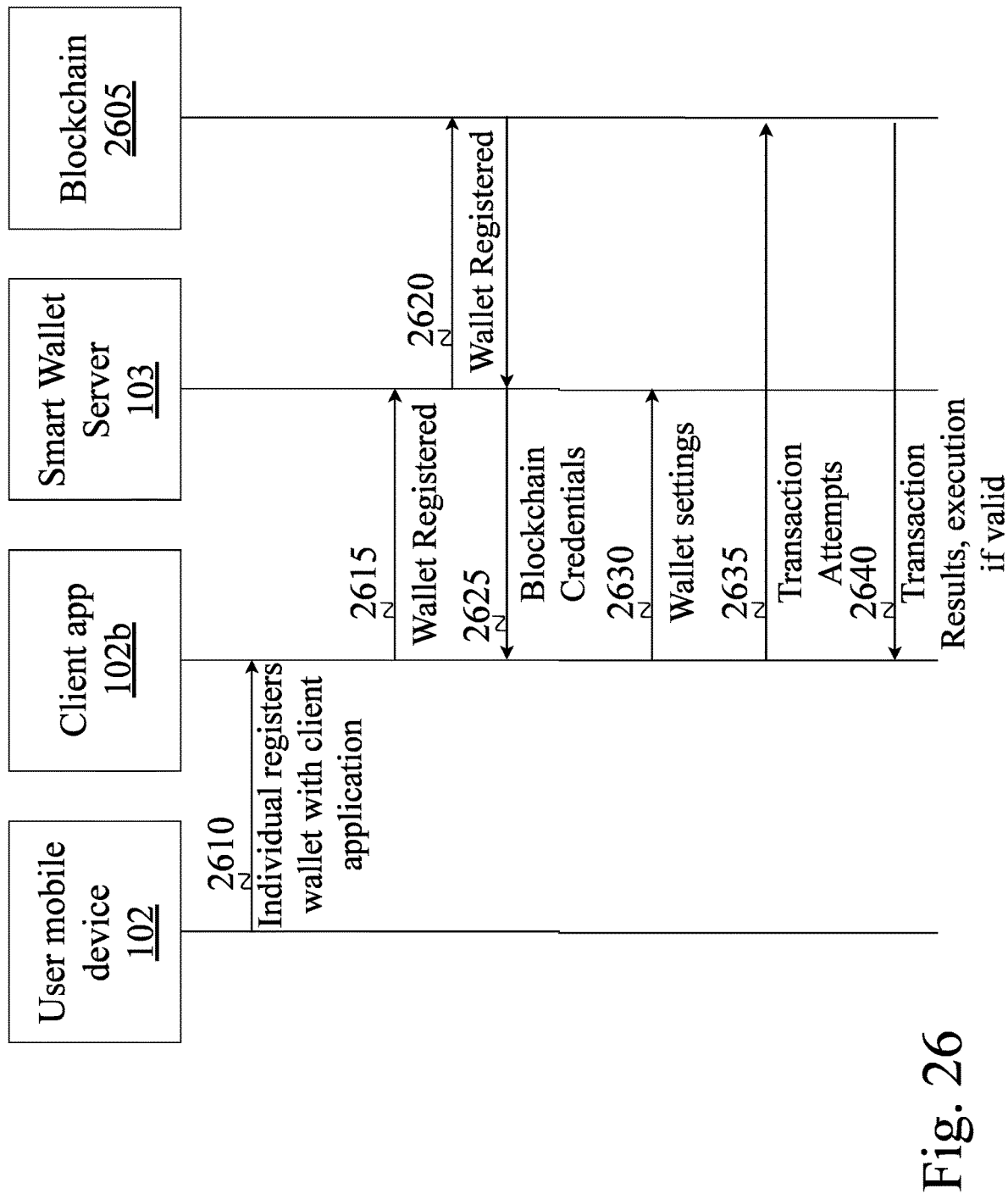
FIG. 26 is a message flow diagram illustrating steps in various users using different tiers or group-settings of smart wallets, according to an aspect.

FIG. 26 is a message flow diagram illustrating steps in various users using different tiers or group-settings of smart wallets, according to an aspect. A user mobile device 102, client application 102b, smart wallet server 103, and blockchain 2605 exist in the exemplary flow of messages, according to an aspect. A network may be present in communications between one or more systems in the diagram shown, such as a wide area network, local area network, PSTN, or the internet.

An individual may register for a wallet with a smart wallet client application 2610, which may require some combination of password, biometric security, and personal information in order to register for it and access it in the future. A user may perform the registration steps with the smart wallet client application 102b, at which point actual registration with the blockchain is attempted by the application, sending data to the smart wailer server 103 which is then written onto the blockchain 2605 if registration is successful 2615, 2620. The smart wallet server 103 then sends the blockchain credentials and information to the client application 102b, 2625. An individual may use the wallet according to a specific wallet configuration 2630, in this case an individual wallet. User configurations that may be specified for wallets include the permission method and values, the wallet connection to a bank account or other financial institution (if any), preset limits on how much the wallet is allowed to spend on any one transaction, or other configuration settings. In another embodiment, multiple individuals may register a smart wallet with a client application, each registering individually and with their own device and application, wherein the wallets are set up with an organization configuration which may be specified through the use of smart contracts in the smart wallet blockchain, or which may be specified by the organization the wallet is tied to, using the smart wallet application itself to maintain the connection rather than the blockchain. Individuals with the organizational wallets may utilize the wallets as separate individuals, but with organizational rules and settings, such as any limits the organization's administrator may impose on the spending limit of the wallets, or jurisdiction limitations (such as being unable to use the organizational wallets outside of a specific country, or not being able to use them in a given jurisdiction such as a city), and their wallets may all connect to the same or separate business funding accounts depending on how the organization chooses to set up the wallets. According to a different embodiment for a shared group-wallet, a group of individuals may create a group wallet in a blockchain client application, or may be registered in an existing group wallet by authorized members of the group wallet. In the case of a group wallet, users of the group wallet share one true wallet, with shared permissions and one account balance for the group to utilize, and potentially one transaction history for the wallet that they all share and write to. Regardless of the configuration chosen, the wallet settings are sent from the client application to the smart wallet server 103, 2630, and transaction attempts may then be made with the client application 102 to the smart wallet blockchain 2605, 2635, using the smart wallet server 103 as an intermediary in some embodiments. Whether the transaction is executed or not, the result is reported back to the client application based on the state of the blockchain 2640, letting a user or users (depending on its configuration) know the state of the wallet.

Figure 27:
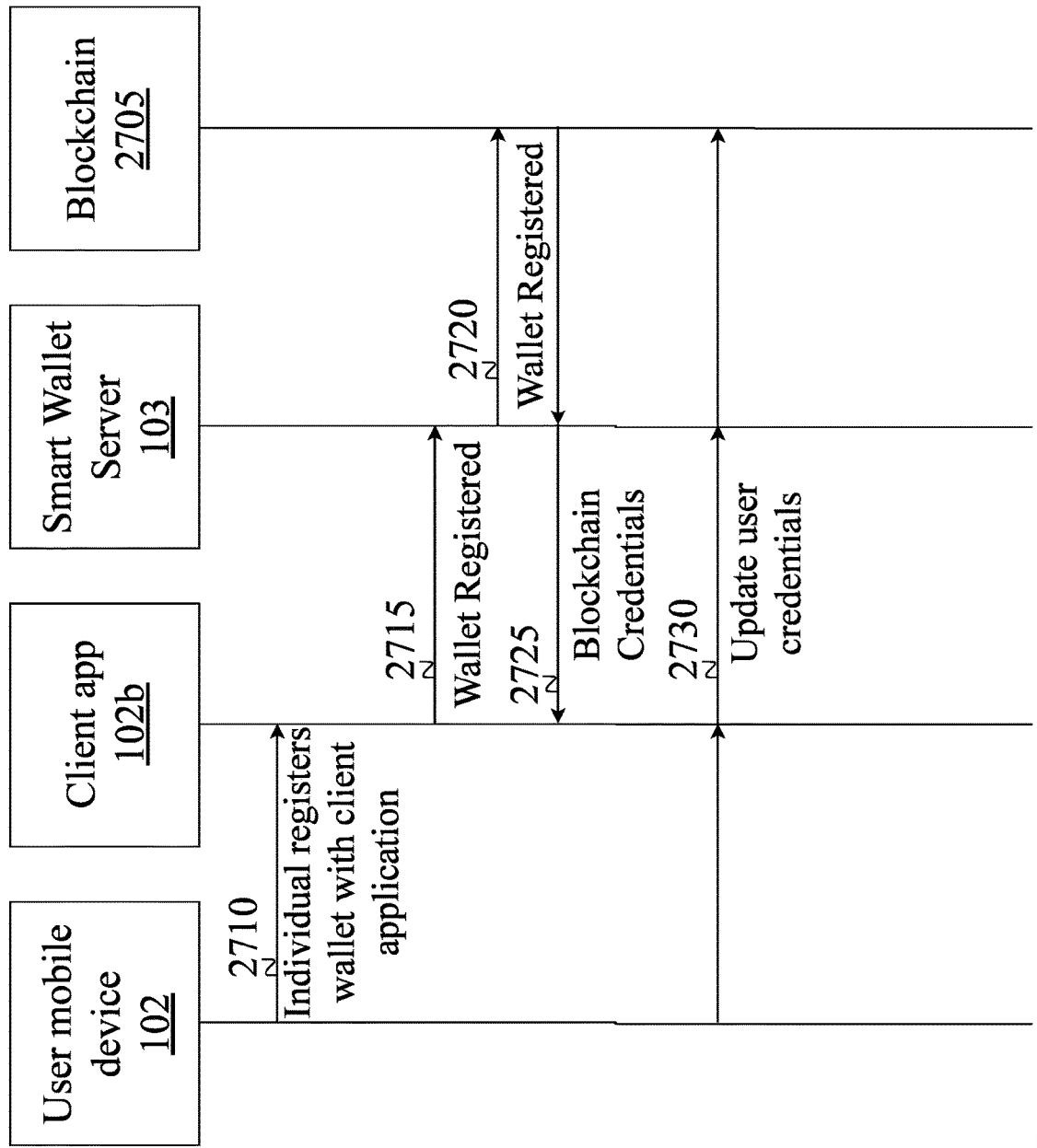
FIG. 27 is a message flow diagram illustrating steps in updating user credentials and biometrics, according to an aspect.

FIG. 27 is a message flow diagram illustrating steps in updating user credentials and biometrics, according to an aspect. A user mobile device 102, client application 102b, smart wallet server 103, and blockchain 2605 exist in the exemplary flow of messages, according to an aspect. A network may be present in communications between one or more systems in the diagram shown, such as a wide area network, local area network, PSTN, or the internet.

An individual may register for a wallet with a smart wallet client application 2710, 2715, 2720, which may require some combination of password, biometric security, and personal information in order to register for it and access it in the future. Blockchain credentials 2725 and decrypted data may be sent to the client application 102b after successful registration on the blockchain 2705, 2720. A smart wallet application may request a user take a current self-photo or "selfie," and a voice sample, and upload government-issued photo ID (such as a driver's license) through a photograph which may have optical character recognition software identify the specific text of the ID. The new user photo may be checked against the ID to verify a user's identity and ensure the user is who they claim to be, using facial recognition and mapping software, while other identifying information may also be added to prove identity such as their social security number or a similar piece of identifying information, depending on the user's jurisdiction. The user's photo and voice sample and ID may be stored in a permission-based blockchain, and may be updated over time 2730 using a historical database or server that tracks changes in a user's voice and appearance, while a user's historical identifying information and biometrics are stored in the smart wallet blockchain indefinitely along with the updated versions, to establish patterns of user changes in order to build up a user identity over time. In this way, unexpected user changes such as losing a limb, changing hairstyles, growing older, or similar, may be accounted for and will not prevent a user from accessing their smart wallet.

Figure 28:
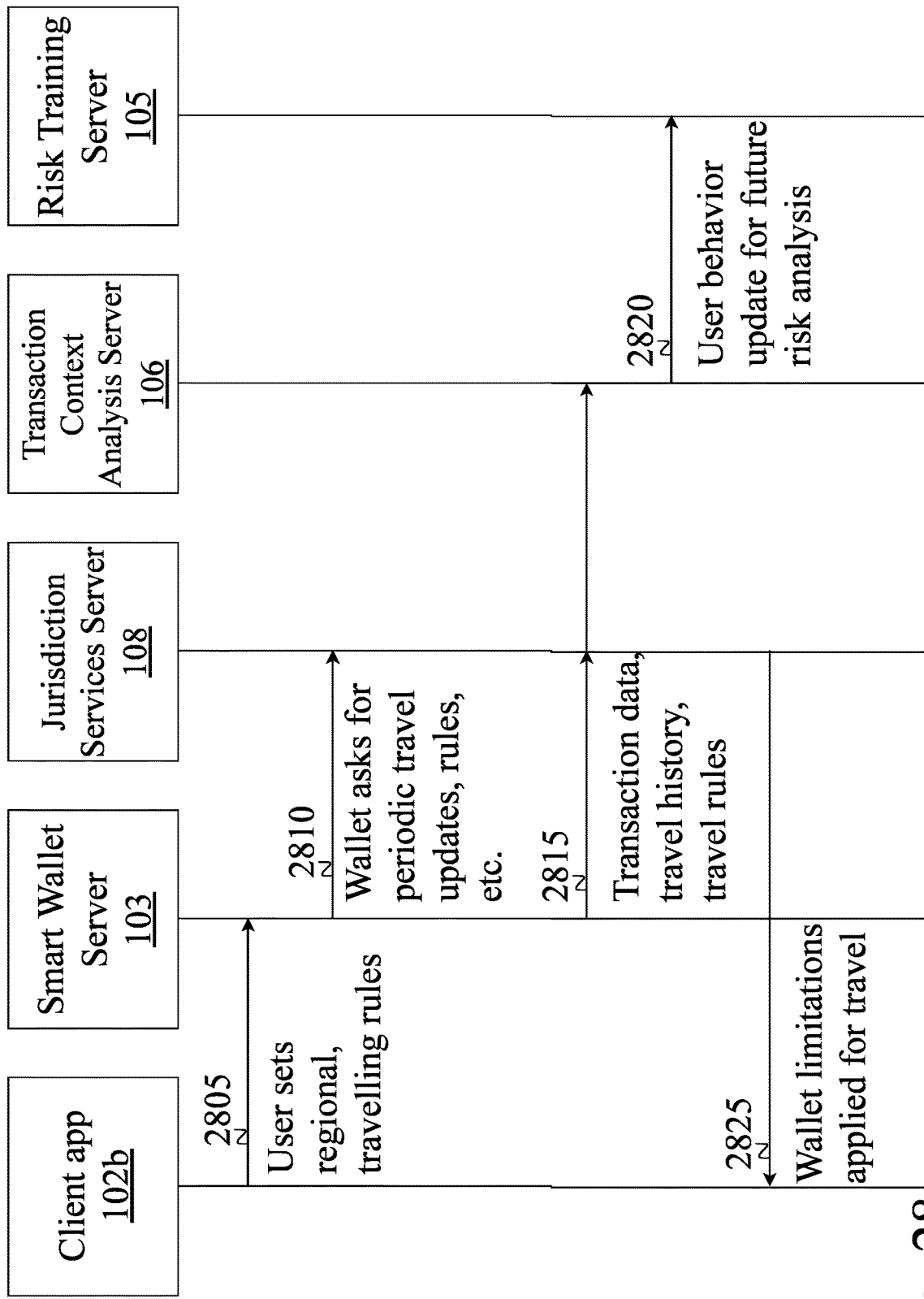
FIG. 28 is a message flow diagram illustrating steps in a smart wallet having altered settings and capabilities for a user during travel, according to an aspect.

FIG. 28 is a message flow diagram illustrating steps in a smart wallet having altered settings and capabilities for a user during travel, according to an aspect.

A user may set a wallet's regional rules and travelling rules with client application 2805, in which there may be rules for wallet configuration when travelling to or from specific areas, and rules for when a user travels in general which may be applied when more specific rules are not being applied, or which may be applied if they are compatible with the more specific regional rules set by the user. The wallet server 103 may then ask for periodic updates of the user's position if any, and hand these off to the jurisdiction services server 108, 2810 for processing. A user may then travel to a different region, such as a different state, country, continent, city, or other jurisdiction or region, as detected by a user's GPS coordinates, or cell tower usage, or transactions which may be tied to a specific geographic location, at which point the smart wallet access, balance, and other features may be restricted according to the user's regional rules or travel rules 2815. The travel rules may cover situations where specific regional rules are not specified as previously mentioned, and user transactions in other regions may be examined by transaction context and risk training servers to determine if fraud or theft is occurring 2815, 2820, such as if a user was in Seattle one moment and then suddenly logs a wallet user at London making transactions the next moment. If fraud or theft are detected, the attempting user may be asked to prove their identity with biometrics such as visual or audio cues, voice samples, and microexpressions, before transactions can go through, ensuring only the true user may access the wallet. If a user's travel is legitimate but they have set up rules restricting the wallet's operation abroad for security reasons, the wallet will restrict itself according to their rules 2825, as determined by the jurisdiction services and smart wallet servers 108, 103.

Figure 29:
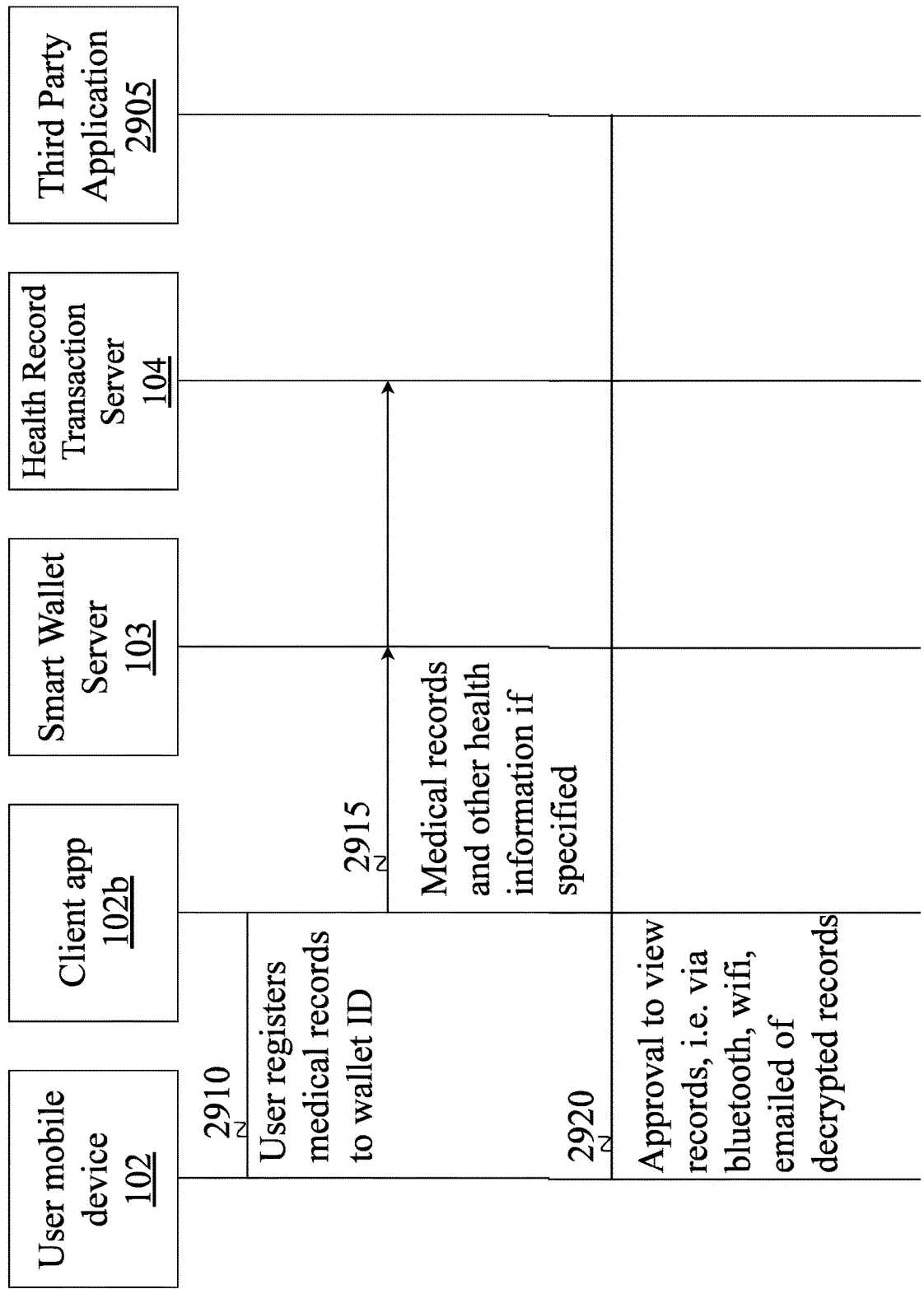
FIG. 29 is a message flow diagram illustrating steps in having medical records stored in a permissioned blockchain that a smart wallet user may access and grant others access to, according to an aspect.

FIG. 29 is a message flow diagram illustrating steps in having medical records stored in a permissioned blockchain that a smart wallet user may access and grant others access to, according to an aspect. A user mobile device 102, client application 102b, smart wallet server 103, health record transaction server 104, and third party application 2905 exist in the exemplary flow of messages, according to an aspect. A network may be present in communications between one or more systems in the diagram shown, such as a wide area network, local area network, PSTN, or the internet.

A user may register private records, e.g. medical records, to a smart wallet 2910, through a smart wallet application, which may be written to the smart wallet blockchain, with the use of a specialized health record transaction server 104, 2915. The health record transaction server 104 may provide special functionality and regulation implementations to safeguard user data, such as double encryption. The user may then grant access to other clients, such as medical professionals, to medical records by using the same authentication established for their wallet, including biometrics to access the wallet, to authorize decryption and sharing of medical records, which may be accomplished over a network, through email, or through some other method of sharing data between devices 2920. The authorized medical professionals may add to the medical records by using the connection between their device and the user's device, which manages the data to be written to the wallet blockchain, at which point the medical records may be updated on the blockchain. In this way, the user may carries up-to-date medical records with them, accessible only by them, which may be sharable with medical professionals easily and swiftly wherever they go.

Figure 30:
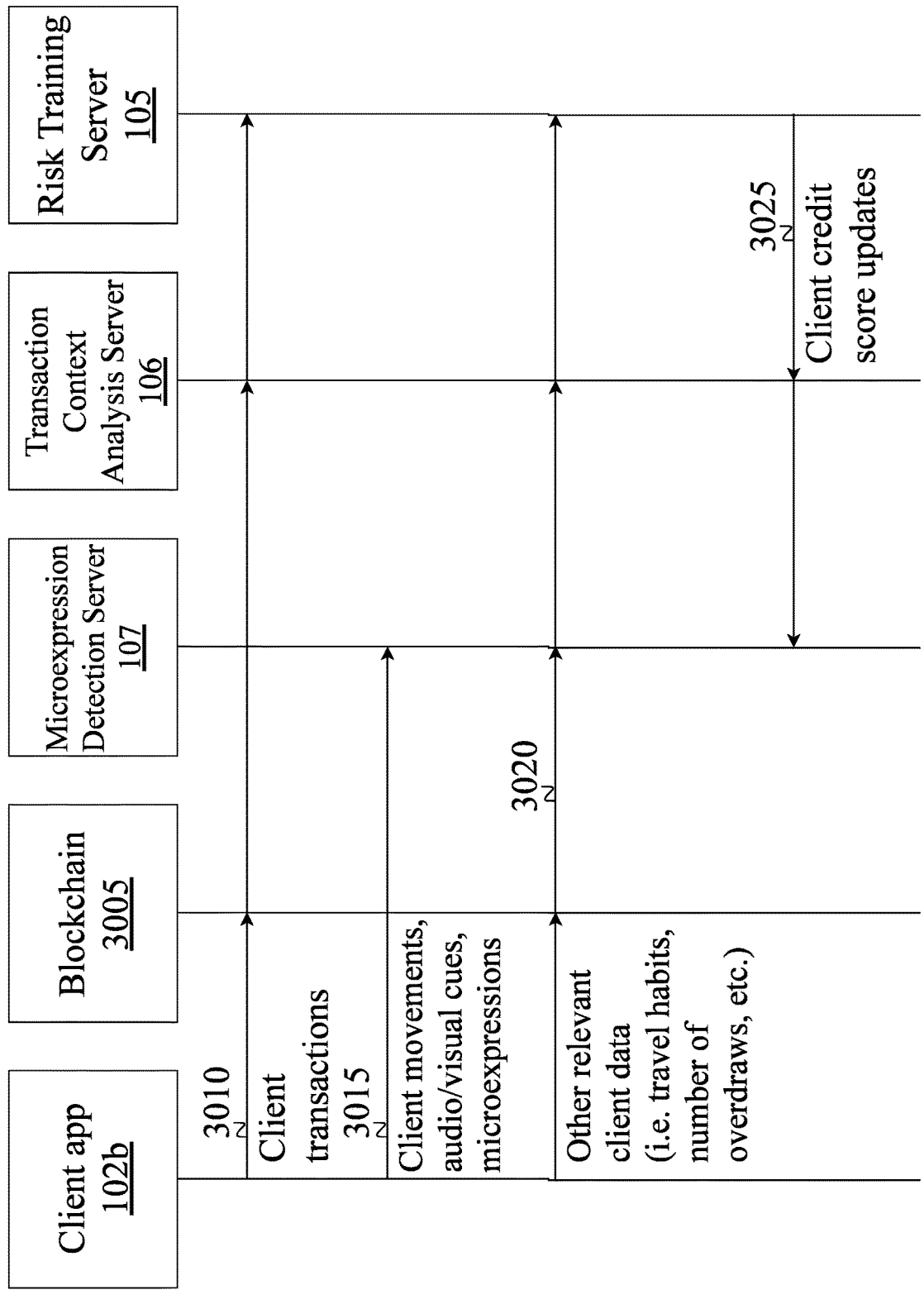
FIG. 30 is a message flow diagram illustrating steps in real-time credit scoring of a smart wallet user, according to an aspect.

FIG. 30 is a message flow diagram illustrating steps in real-time credit scoring of a smart wallet user, according to an aspect. A client application 102b, blockchain 3005, microexpression detection server 107, transaction context analysis server 106, and risk training server 105 exist in the exemplary flow of messages, according to an aspect. A network may be present in communications between one or more systems in the diagram shown, such as a wide area network, local area network, PSTN, or the internet.

According to this aspect, real-time credit scoring may be performed with multiple servers such as a microexpression detection server, transaction context server, and risk training server, and may utilize a connection to other information and services such as medical records and jurisdiction changes, in order to generate and maintain a new kind of credit scoring that uses a smart wallet and user behaviors to track and maintain user credit worthiness. Client transaction data are tracked and sent to not only the blockchain 3005 but also a transaction context analysis server 106 and risk training server 105, 3010, to be examined for anomalous behavior, credit limit usage of the smart wallet is tied to a credit account, loan payments if applicable, and large transactions which may be a good or bad thing for a user's credit worthiness in different circumstances. Microexpression detection may identify a user or other parties as being potentially illicit in intent 3015 specifically, such as determining that a user may be unsure of their ability to pay a loan back when applying, or determining that a car dealer is potentially behaving unscrupulously based on body language (if available to examine) or voice intonation and wording. Credit score information of the user may be encoded in the smart wallet blockchain, accessible by agencies requiring a credit score if they have installed software to communicate with the smart wallet server and make a request for only the credit score segment of a user wallet, as a result of the smart wallet credit scoring. As part of the credit scoring and individual evaluations, the wallet software may even be configured to warn others if the user is behaving potentially illicitly, or warn its own user if another party or parties are behaving suspiciously based on body language (point camera at each other if allowed) or speech patterns, changes in voice and tone, specific wording and phrasing, outright helping individuals avoid dangerous or illicit interactions based on microexpression validation. Other relevant client data such as travel habits may be sent to servers to be analyzed 3020, and with these data points, the risk training server 105 may issue internal client credit score updates 3025 which may be held only on the servers and may be made available to credit reporting agencies, but in other implementations may also be written to the blockchain 3005.

Figure 31:
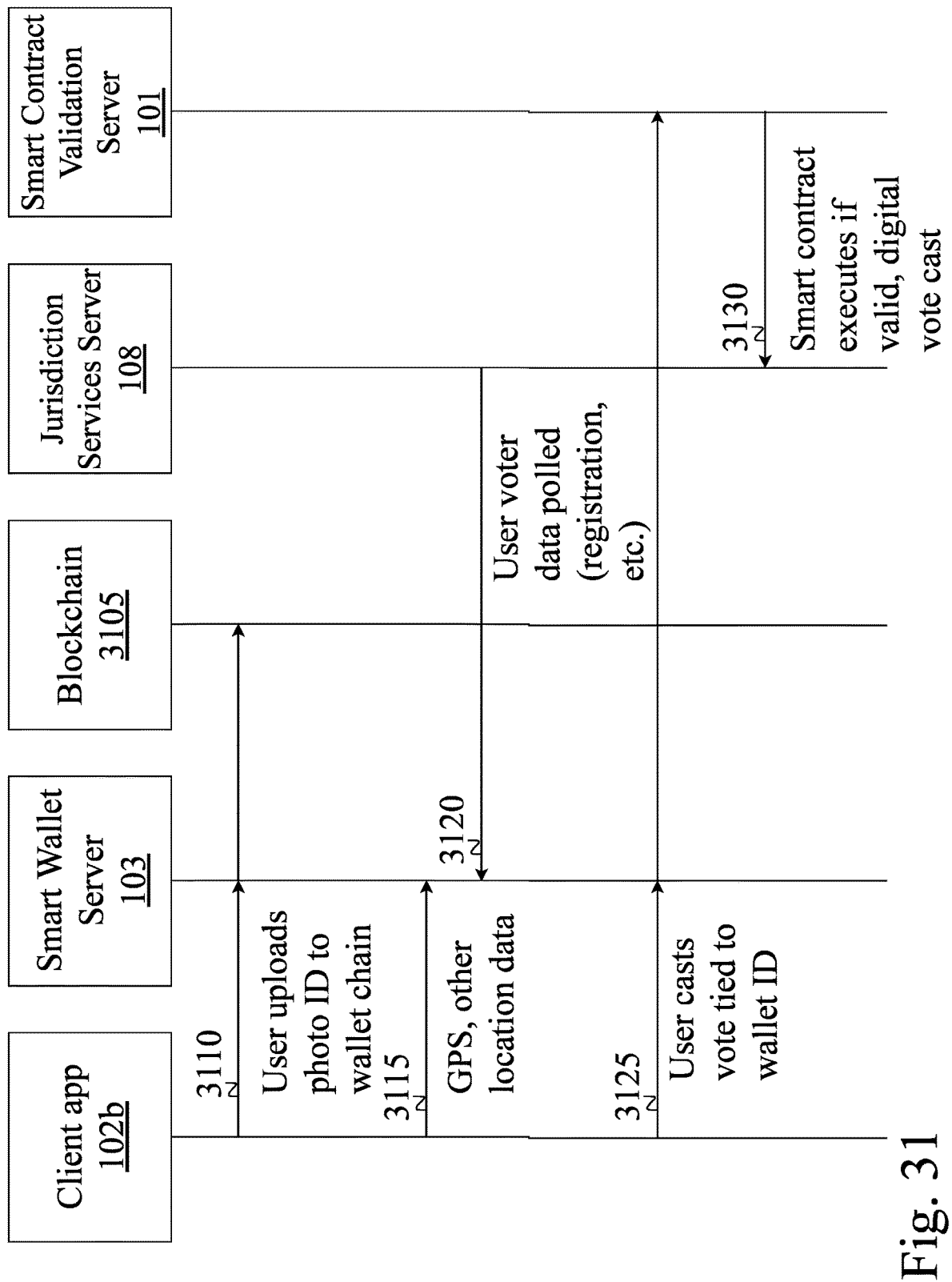
FIG. 31 is a message flow diagram illustrating steps in having voting records and identification stored in a permissioned blockchain that a smart wallet user may access and use for personal identification and digital voting, according to an aspect.

FIG. 31 is a message flow diagram illustrating steps in having voting records and identification stored in a permissioned blockchain that a smart wallet user may access and use for personal identification and digital voting, according to an aspect. A client application 102b, smart wallet server 103, blockchain 3105, jurisdiction services server 108, and smart contract validation server 101 exist in the exemplary flow of messages, according to an aspect. A network may be present in communications between one or more systems in the diagram shown, such as a wide area network, local area network, PSTN, or the internet.

A user may specify, upon wallet registration, their government ID number such as social security number, in addition to other ID or biometrics normally required for smart wallet creation 3110. The user's location may then be registered and tracked with GPS and their transaction history, when possible, to ensure an accurate user location is available for voting purposes 3115, so that if and when a government agency or other voting agency including a corporate voting agency begins an election and enables digital voting, a smart contract may be created involving the user, to allow voting with the voting agency or agencies, supplying the necessary code to execute a digital vote for the wallet owner for their jurisdiction. A user's voter registration data must also be confirmed by a jurisdiction services server 108 based on a user's identifying information 3120 in order for a user to be allowed to case a digital vote with their smart wallet. In this way, a smart contract validation server and a jurisdiction server may, together, allow for a user to use their smart wallet and personal identifying information to maintain their voter registration and cast their votes 3125. Government or organizational voting rules may be implemented in the smart contract on contract creation, depending on implementations, allowing a smart contract validation server 101 to validate and then execute the code to cast the user's vote 3130. Some governments may not allow digital voting, and digital voting may be disabled or simply not implemented by an organization or government agency, rendering digital voting impossible, but potentially still allowing for user to ID themselves with their wallet as normal for in-person voting, due to being connected to their ID or IDs. In this sense the smart wallet acts not as a voting device, but as an identification tool. Client voting records may also be stored on the blockchain as part of a user's personal information, accessible only to the user unless the user grants access to others, as with medical records.

Figure 32:
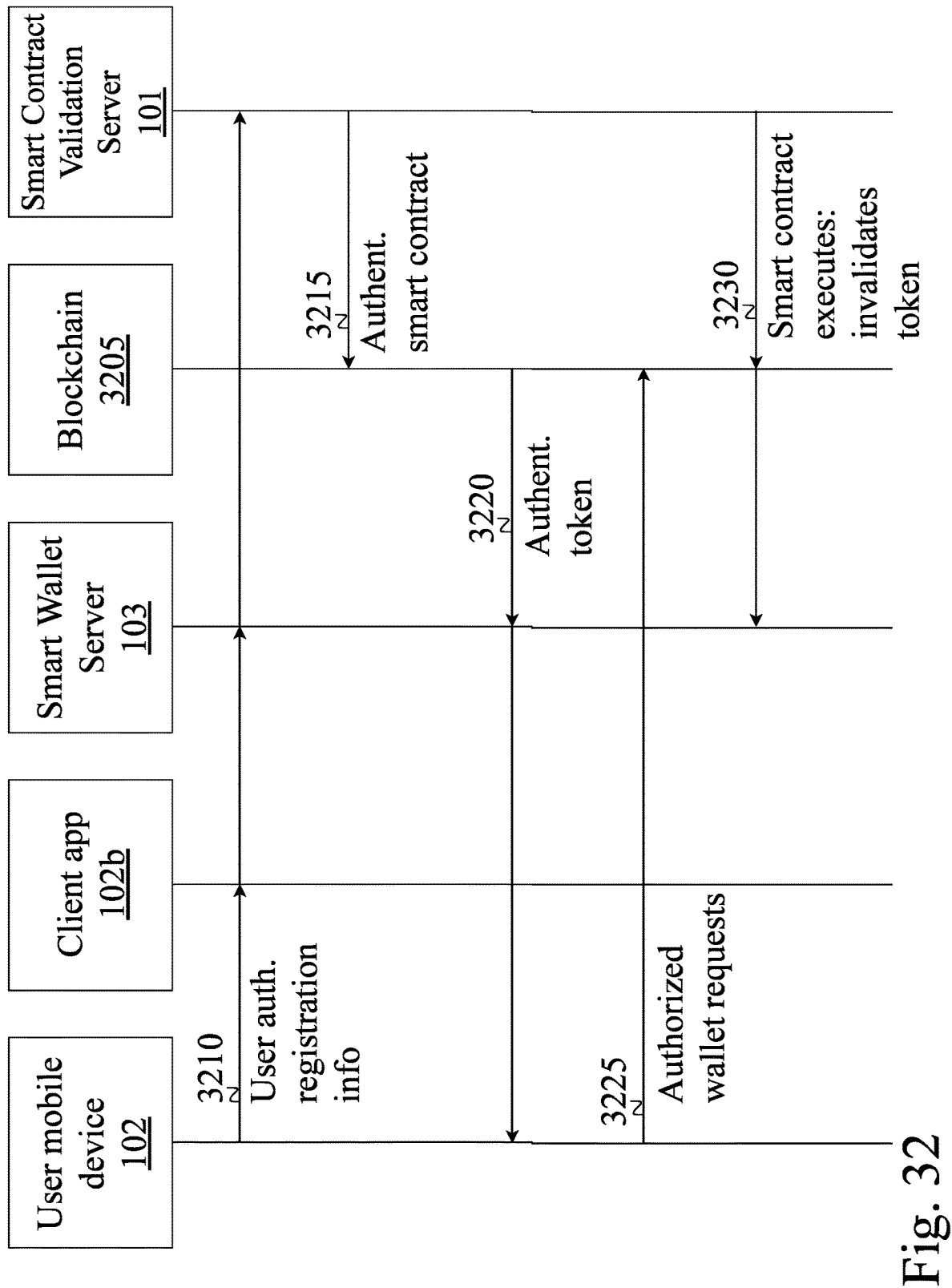
FIG. 32 is a message flow diagram illustrating steps in smart wallet being utilized with a dedicated device-resident instance that can operate offline temporarily, according to an aspect.

FIG. 32 is a message flow diagram illustrating steps in smart wallet being utilized with a dedicated device-resident instance that can operate offline temporarily, according to an aspect. A user mobile device 102, client application 102b, smart wallet server 103, blockchain 3205, and smart contract validation server 101 exist in the exemplary flow of messages, according to an aspect. A network may be present in communications between one or more systems in the diagram shown, such as a wide area network, local area network, PSTN, or the internet.

A user may specify account settings including login and registration information for their smart wallet with a smart wallet application on a mobile device, either at wallet registration or at a later time, for device-resident instancing 3210. A user can specify a duration for their device to maintain a token or for a smart contract to last before execution on smart wallet and smart contract validation servers 3215, that allow the device to access a smart wallet balance for transactions without re-authorization or biometrics, up to a maximum specified by the blockchain provider or implementation 3220. While this validation token is valid, a user may make wallet requests without having to re-authorize, from the same device 3225. After the duration is passed, the token expires due to the smart contract executing causing the device to no longer be authorized for access to the blockchain 3230, and the device must operate client software and go on the blockchain over a network such as the Internet, and re-authorize as normal, through the use of user permissions such as passwords or personal identifying information or biometric authentication, or some combination thereof, as preferred by the implementation of the blockchain and servers and services at hand.

Figure 33:
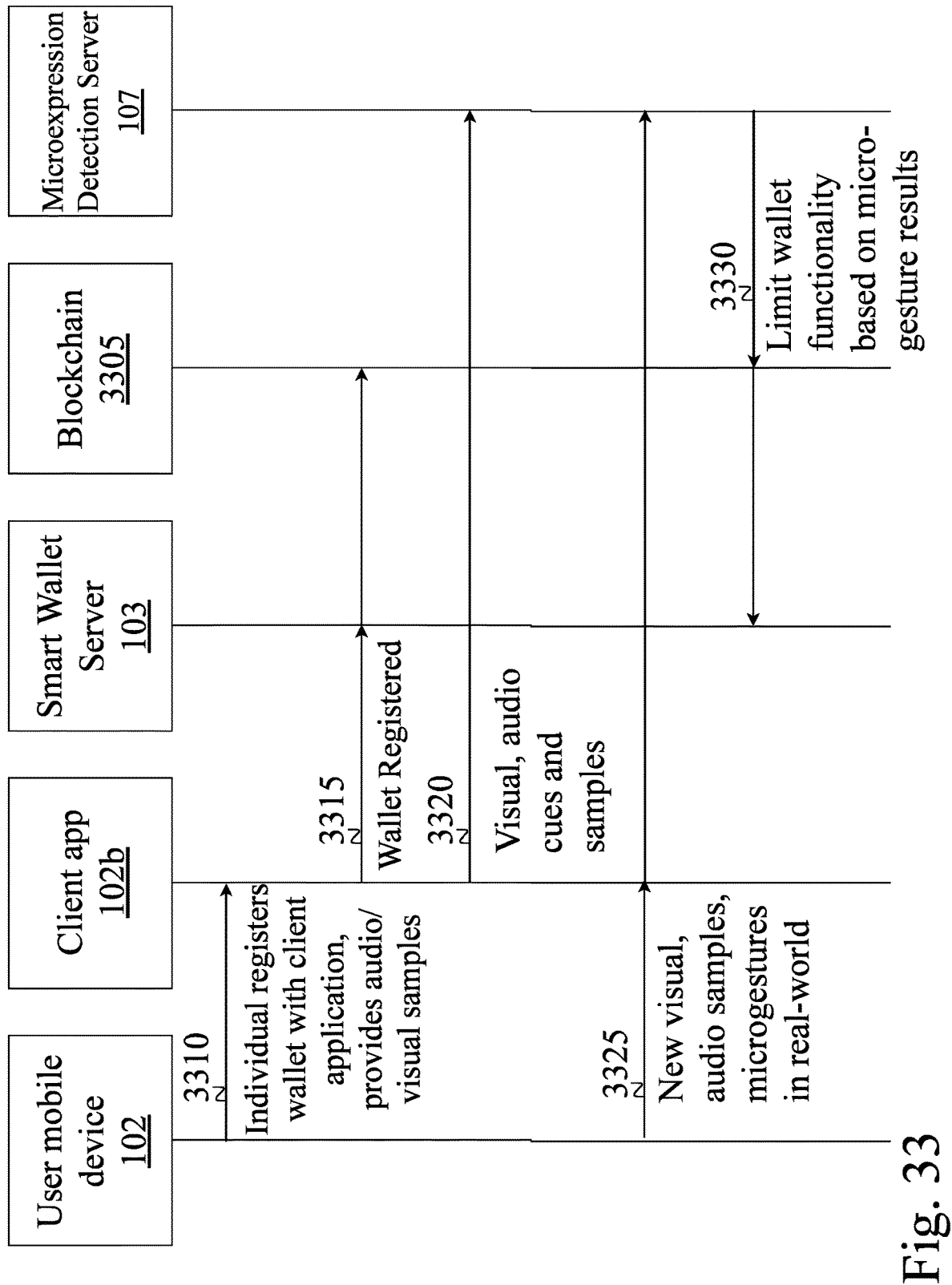
FIG. 33 is a message flow diagram illustrating steps in microexpression learning, according to an aspect.

FIG. 33 is a message flow diagram illustrating steps in microexpression learning, according to an aspect. A user mobile device 102, client application 102b, smart wallet server 103, blockchain 3305, and microexpression detection server 107 exist in the exemplary flow of messages, according to an aspect. A network may be present in communications between one or more systems in the diagram shown, such as a wide area network, local area network, PSTN, or the internet.

A user, when first creating a smart wallet, may perform pre-set gestures and audio cues in front of their mobile device camera, which may be self-held, or held by another person or a stand of some kind, depending on what their typical use case might be 3310, 3315, 3320. By "pre-set gestures" it is meant either gestures that the smart wallet application asks a user to make for calibration purposes, or gestures that a user decides upon to teach the smart wallet application and microexpression detection server how to recognize specific gestures, microexpressions, and movements in accordance with specific behaviors, or in accordance with a baseline of normal body movement. Pre-set actions may be those defined by the user in advance, i.e. "what I will do now is typical body language while talking to someone," or defined by client application, i.e. "please make a hand gesture" or "please roll your eyes derisively". The client application may request the user to repeat gestures multiple times, and may ask for or be given increasingly subtle gestures and contexts for them. A plurality of convolutional neural networks may be applied to photos of numerous angles and repeated gestures to learn how to visually analyze user gestures and microexpressions, and if the client application or microexpression detection server identify something incorrectly in production, a user may select an instance of the wallet taking action, and flag it as inaccurate, requiring re-learning 3325, and backtesting of historical actions with re-learned models to attempt to differentiate its judgement, to improve performance. When the specified gestures or audio cues are detected by the smart wallet application, the smart wallet may limit its own functionality 3330 until the user both authorizes themselves, clears the error, and there are no longer any flagging expressions, movements, or verbal cues being displayed.

Figure 34:
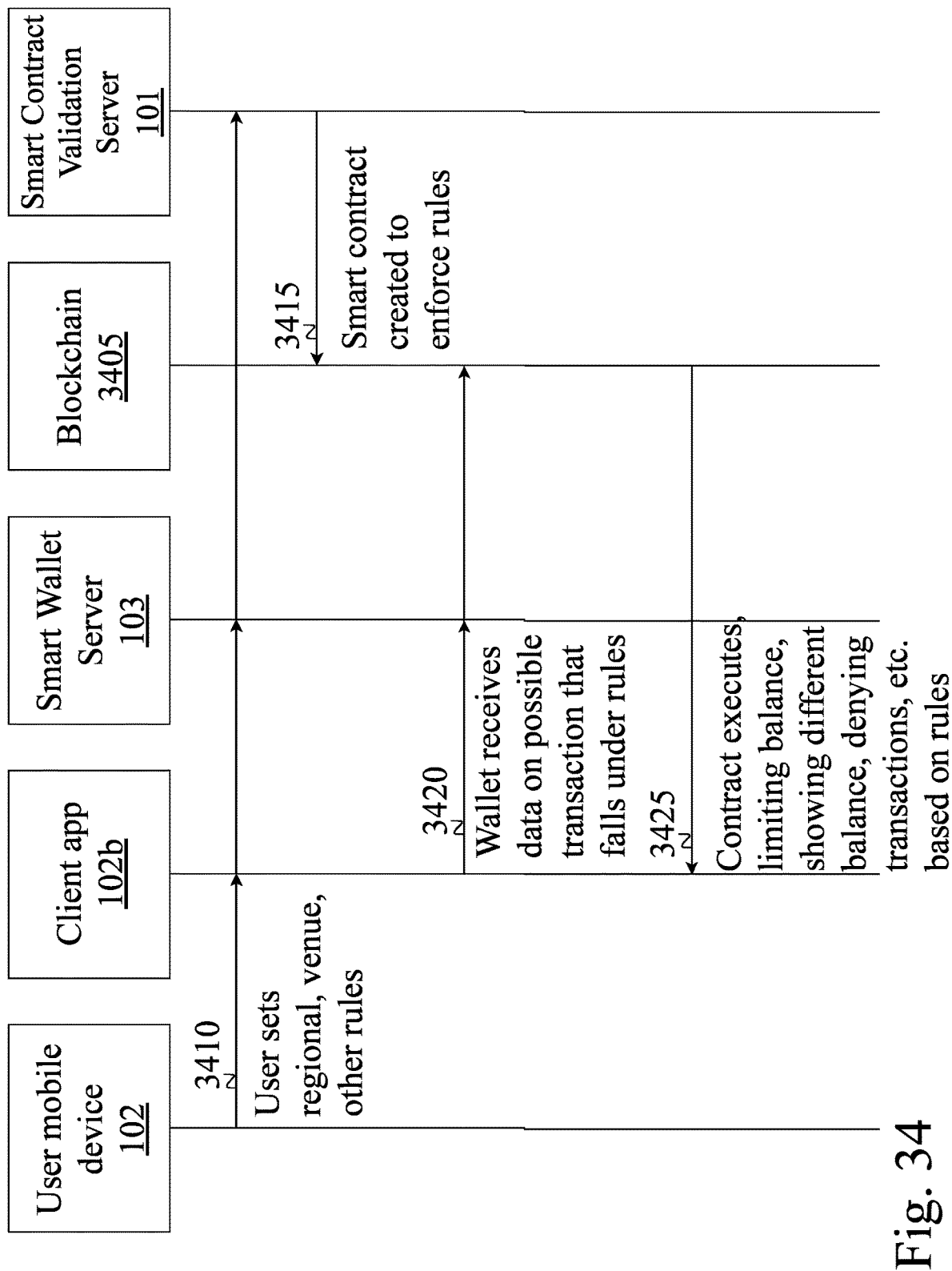
FIG. 34 is a message flow diagram illustrating steps in a smart wallet showing variable balance amounts, variable limits, and features based on rules specified by a user or by risk assessment and regional jurisdictions, according to an aspect.

FIG. 34 is a message flow diagram illustrating steps in a smart wallet showing variable balance amounts, variable limits, and features based on rules specified by a user or by risk assessment and regional jurisdictions, according to an aspect. A user mobile device 102, client application 102b, smart wallet server 103, blockchain 3405, and smart contract validation server 101 exist in the exemplary flow of messages, according to an aspect. A network may be present in communications between one or more systems in the diagram shown, such as a wide area network, local area network, PSTN, or the internet.

A user may set specific circumstances or rules in the smart wallet client application for variable balances, limits, and other features for their smart wallet 3410, such limitations may take the form of a smart contract that executes its code when conditions are met, limiting the smart wallet until conditions change 3415. Conditions may include location which may be tracked by transactions, GPS and phone location, venues and merchants to spend money at, or be context dependent, such as being under duress, detecting a suspicious third party actor such as an untrustworthy salesman, or other contextual conditions for limiting the smart wallet. When conditions are met 3420, the user balance may show a lower amount or user may have their spending limit temporarily lowered, to prevent misuse, fraud, and obey user directives for such limits if set prior, as well as limits not required to be set by a user such as limiting purchases if fraudulent or untrustworthy transactions are suspected 3425.

Figure 35:
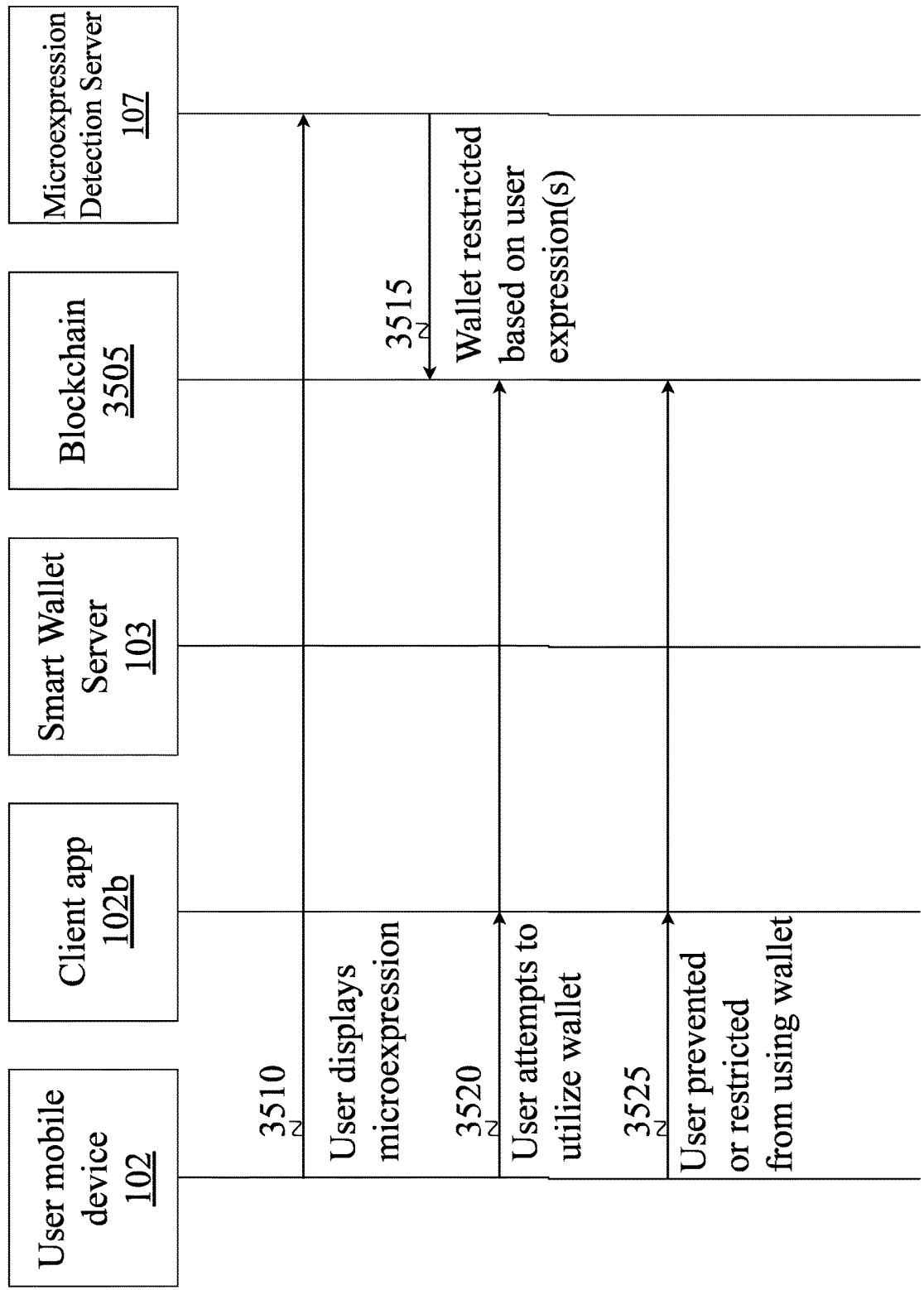
FIG. 35 is a message flow diagram illustrating steps in utilizing and teaching condition signaling such as duress signals that can limit balances and alter the functionality of a smart wallet in discrete or passive ways, according to an aspect.

FIG. 35 is a message flow diagram illustrating steps in utilizing and teaching condition signaling such as duress signals that can limit balances and alter the functionality of a smart wallet in discrete or passive ways, according to an aspect. A user mobile device 102, client application 102b, smart wallet server 103, blockchain 3505, and microexpression detection server 107 exist in the exemplary flow of messages, according to an aspect. A network may be present in communications between one or more systems in the diagram shown, such as a wide area network, local area network, PSTN, or the internet.

A user's condition is continuously monitored passively by a smart wallet client on a user's mobile device 3510, listening for verbal cues of events occurring and for the purposes of evaluating the user's mental or emotional state with the help of a microexpression detection server. A user may set up at any time with their smart wallet application, a single or plurality of codewords, activity patterns, facial patterns or body gestures, or other cues or duress signals to signify that the user is under duress 3510, which may alter smart wallet behavior. The client application may learn microexpressions and verbal cues of the user over time, from the use of duress signals and the user actively teaching it, or this learning and application may be relegated to a microexpression detection server and risk analysis server. When the user is detected to be under duress or in danger 3515, the client application may limit the available smart wallet balance and functionality indefinitely, such that the user may attempt a transaction 3520 but is prevented from using the wallet's full functionality 3525 so that a potentially dangerous or fraudulent transaction does not take place, until client is no longer under duress, both by using microgesture and verbal detection, and user biometrics, to ensure both that the user is the one attempting to access the wallet and that the user is not under duress.

Figure 36:
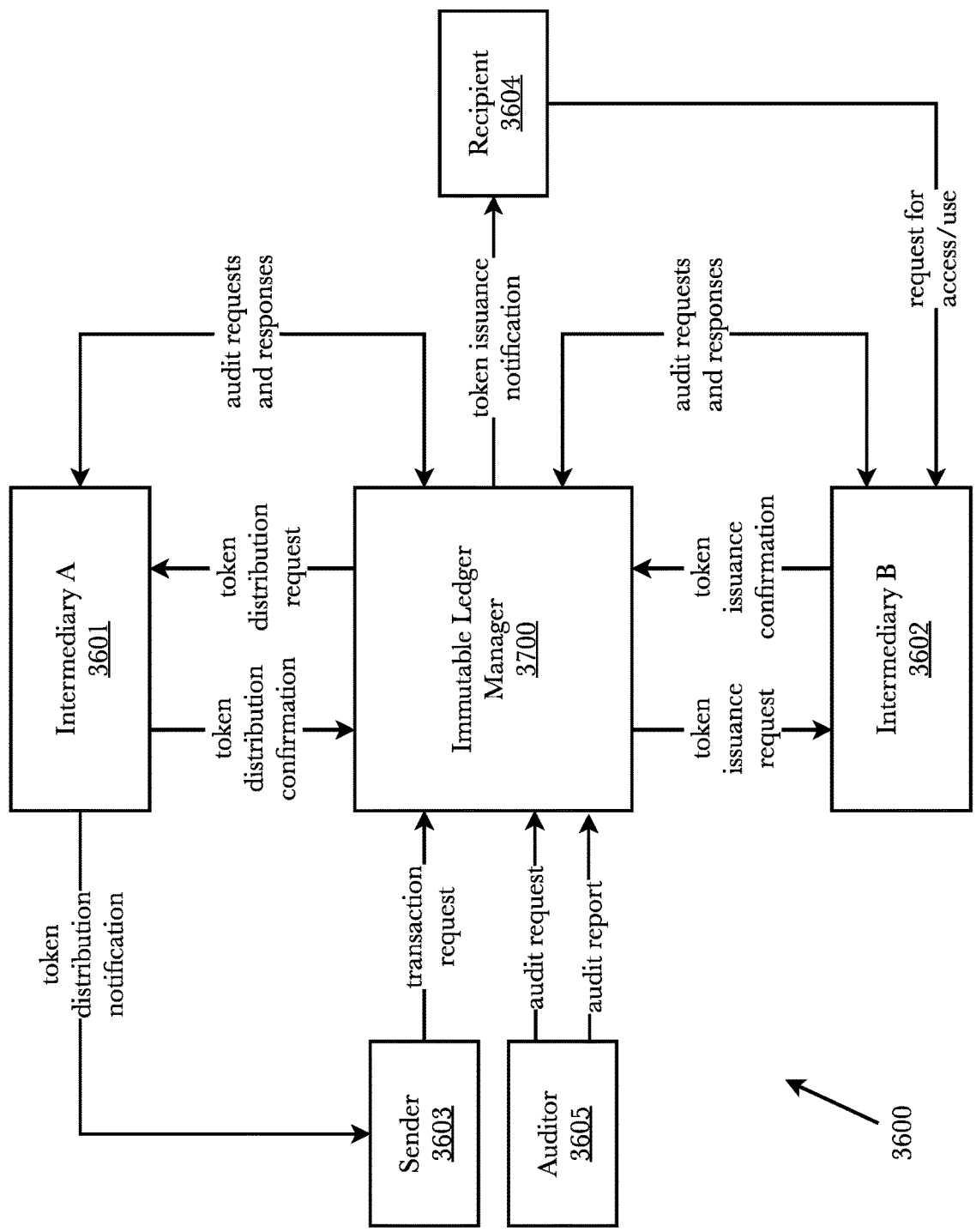
FIG. 36 is a block diagram showing an exemplary system architecture for a digital smart wallet communications platform.

FIG. 36 is a block diagram showing an exemplary system architecture 3600 for a digital smart wallet communications platform In this embodiment, the core of the system is an immutable ledger manager 3700, which coordinates the data transmissions between a sender 3503 and a receiver 3604, each of which has tokens stored at an intermediary 3601-3602, and optionally allows for auditing of immutable ledgers by an auditor 3605. The intermediaries 3601-3602 are any entities capable of storing and updating an immutable ledger containing tokens. In some embodiments, the intermediaries 3601-3602 will be traditional banks that have added immutable ledger technology to their systems, but in other embodiments, the intermediaries 3601-3602 may be servers operated by private individuals. These are but two of many possible forms that intermediaries 3601-3602 may take. In some embodiments, intermediaries are not required at all, and the immutable ledger manager can handle transactions directly between the sender 3603 and recipient 3604, each of whom stores and operates his or her own immutable ledger.

When the sender 3603 sends a transaction request to transfer token value to the recipient 3604, the transaction request goes to the immutable ledger manager 2700, which issues a token distribution request to intermediary A 3601, which checks its immutable ledger for entries associated with the sender 3603. If the sender 3603 has a sufficient token value in the intermediary A's 3601 immutable ledger, intermediary A 3601 adds a new entry to its immutable ledger reducing the sender's 3603 token value and issuing a new token for the value the sender requested to distribute. The sender 3603 is notified of the reduction in value of the sender's token and a confirmation of the creation of the new token in favor of the recipient 3604 is sent to the immutable ledger manager 3700. Note that, in this embodiment, the new token itself is not transferred, just the confirmation of the creation and storage of the new token in the immutable ledger of intermediary A 3601, which has now also become a token holder for the recipient 3604. However, in other embodiments, an entry about the new token may be entered in the immutable ledger of intermediary A 3601 and an actual digital token transferred.

Upon receipt of the token distribution confirmation, the immutable ledger manager 3700 issues a token issuance request to intermediary B 3602, an intermediary which holds tokens for the recipient 3604. Intermediary B 3602 adds a new entry to its immutable ledger, adding value to the recipient's token in the amount of the new token generated and stored at intermediary A 3601, and sending a token issuance confirmation to the immutable ledger manager 3700, which sends a token issuance notification both to the recipient 3604 and to intermediary A 3601, which adds an entry to its immutable ledger canceling the new token on its own immutable ledger. The recipient 3604 may then request access to or use of the value of the new token stored at intermediary B 3602 on the recipient's 3604 behalf.

In other embodiments, instead of canceling the token at intermediary A 3601, intermediary B 3602 simply notes that the new token exists on the immutable ledger of intermediary A 3601 in favor of the recipient 3604 (i.e., a pointer is created on the immutable ledger of intermediary B 3602 pointing to the existence of the new token held by intermediary A 3601 in favor of the recipient 3604).

In this example, because the immutable ledgers at the intermediaries 3601-3602 are privately held and not open to public inspection as in distributed blockchain implementations, a different form of trust and verification must be used. Here, auditors 3605 may be allowed to access the immutable ledgers of the intermediaries 3601-3602. Various auditor arrangements may be used to provide trust and verification while still maintaining the confidentiality of the privately held immutable ledgers. As one example, third party private auditors may be hired by contract to conduct audits under an obligation of confidentiality. As another example, small groups of intermediaries (e.g., small local banks) may group together to arrange their immutable ledgers into small distributed immutable ledgers wherein the members of the group verify the integrity of one another's immutable ledgers by performing testing of the hashes of those immutable ledgers.

Figure 37:
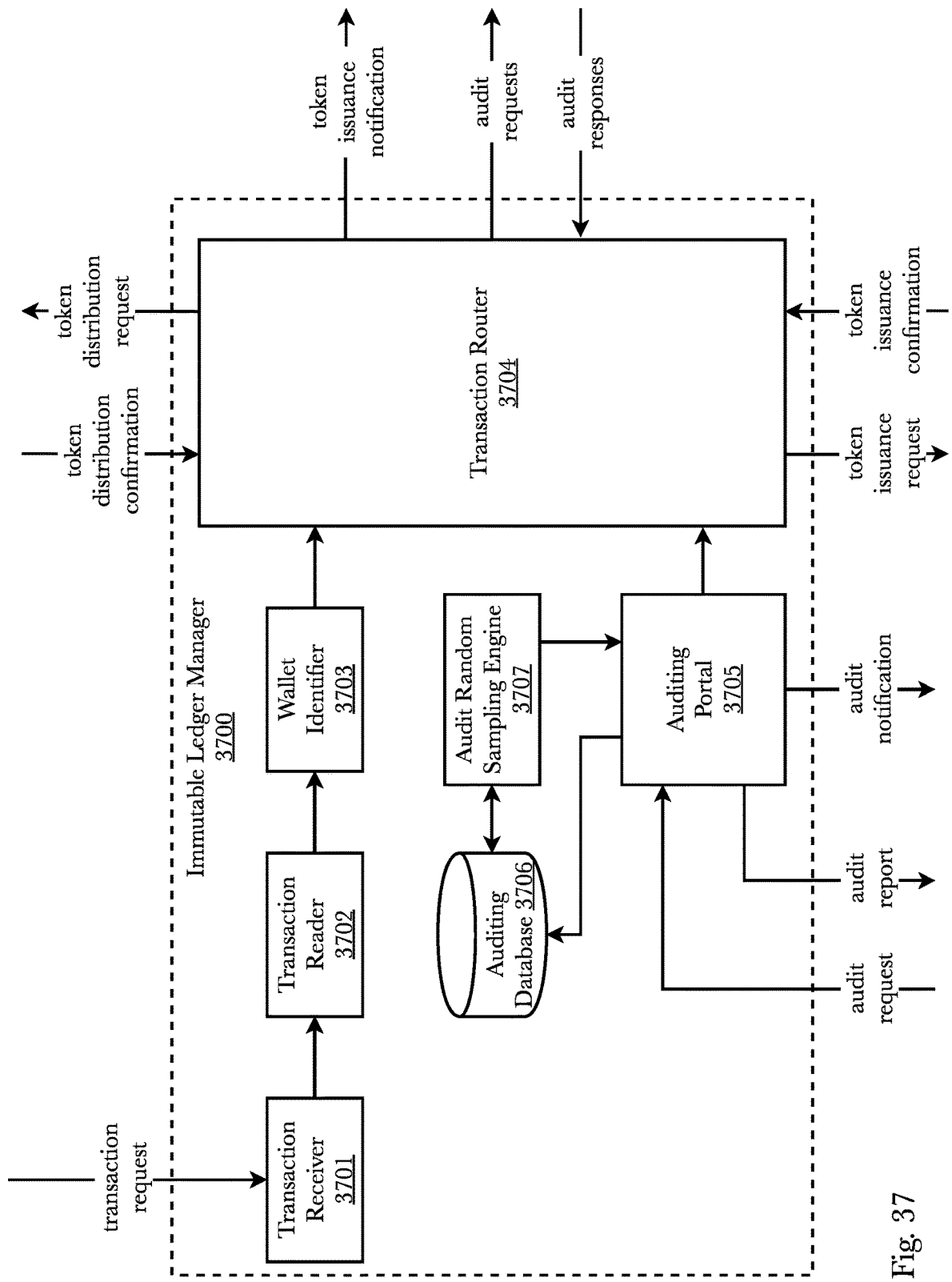
FIG. 37 is a block diagram showing an exemplary system architecture for the immutable ledger manager aspect of a digital smart wallet communications platform.

FIG. 37 is a block diagram showing an exemplary system architecture for the immutable ledger manager aspect 3700 of a digital smart wallet communications platform. In this embodiment, the immutable ledger manager 3700 comprises a transaction receiver 3701, a transaction reader 3702, a wallet identifier 3703, a transaction router 3704, and three auditing components, an auditing portal 3705, an audit random sampling engine 3707, and an auditing database 3706. As a transaction request is received by the transaction receiver 3701 it is verified for authenticity using smart wallet credentials supplied as part of the transaction request 3701. A transaction 3702 reader parses the transaction request and identifies the sender, recipient, and any intermediaries. A wallet identifier 3703 identifies the wallet details including routing information for the recipient and any intermediaries. As in the example above, a transaction router 3704 issues a token distribution request to the sender's intermediary and receives a token distribution confirmation. The transaction router 3704 then sends a token issuance request to the recipient's intermediary and receives a token issuance confirmation. Notification of the token issuance is sent both to the sender and recipient (which notification may be sent through the intermediaries in some embodiments).

Audits may be conducted manually, or by automated random sampling, or both. In the case of a manual audit, an audit request is received by the auditing portal 3705, which verifies that the credentials contained in the audit request are valid, and then provides access to the immutable ledger of interest through the transaction router 3704. The results of the audit may be stored in an auditing database 3706 for subsequent verification. In an audit conducted by automated random sampling 3707, the audit random sample engine 3707 may periodically select random tokens to query from a random immutable ledger and confirm with that ledger that the value of those tokens is as stored in the auditing database 3706, or may randomly select an immutable ledger for testing of the hash of that ledger against a hash in the auditing database to confirm the validity of the ledger. Many variations of this sort of auditing are possible.

Figure 38:
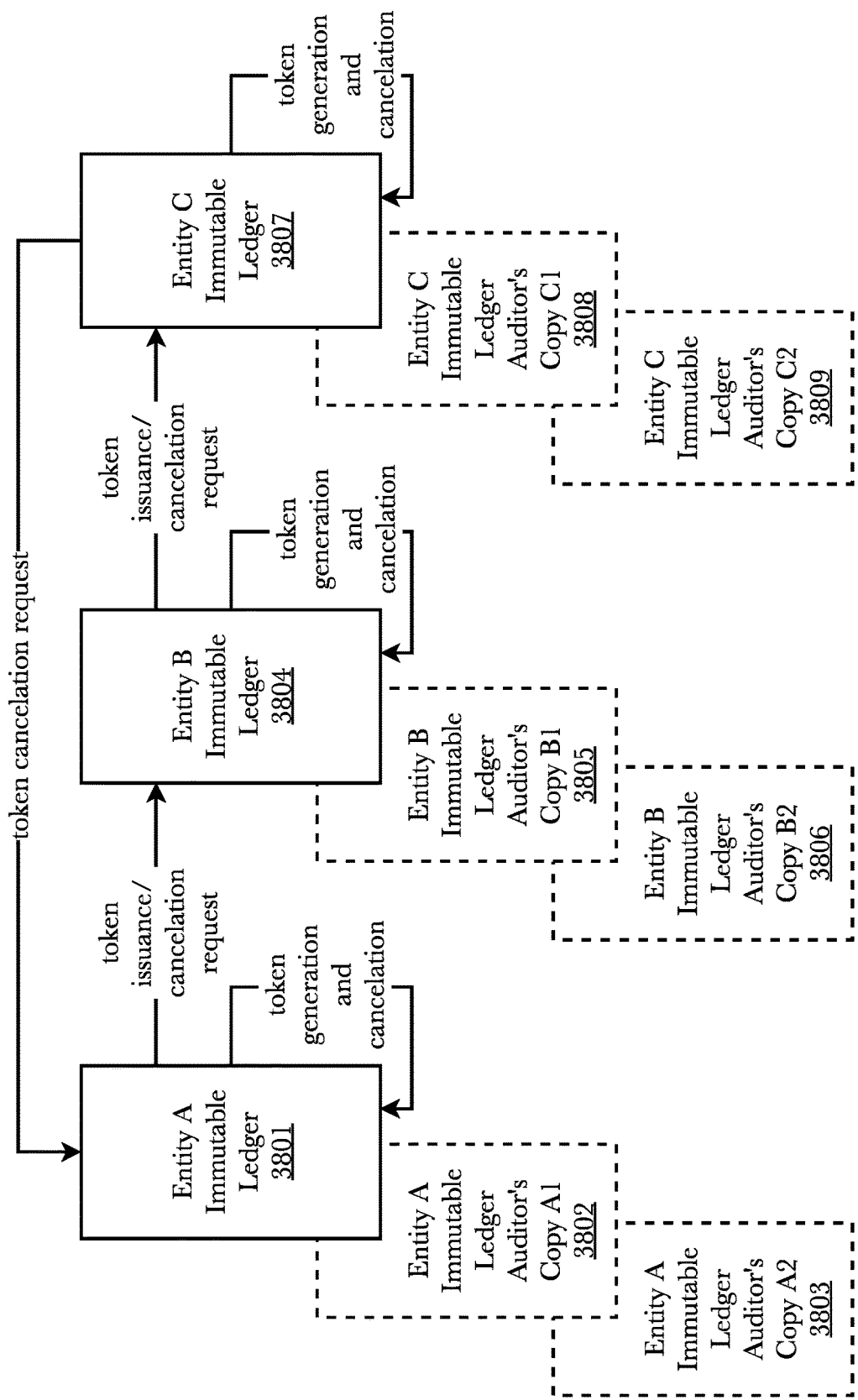
FIG. 38 is a block diagram showing an exemplary implementation of multiple immutable distributed ledgers to track and execute transactions.

FIG. 38 is a block diagram showing an exemplary implementation of multiple immutable distributed ledgers to track and execute transactions. In this example, three entities each hold their own private immutable ledgers. To provide trust and verification of the validity of their immutable ledgers, each of the entities has two copies of its immutable ledger 3801, 3804, 3707 duplicated with two different auditors 3802-3803, 3805-3806, and 3808-3809. Various auditing schemes may be implemented, including but not limited to, manual audits, automated comparisons of the hashes of the immutable ledger with its copies, or a limited distributed immutable ledger comprising the entity and its auditors.

While there are many possible multi-party transactions, for purposes of clarity, let Entity A be a producer of goods, Entity B be a distributor, and Entity C be a merchant. Entity A produces goods for distribution to its merchants. Entity A's immutable ledger 3801 issues an original token for the goods and enters a new entry on its immutable ledger indicating that the goods have been produced. Entity A's immutable ledger further sends a token issuance request to Entity B's immutable ledger 3804, the token issuance request indicating that the goods are ready for pickup and distribution by Entity B. When Entity B picks up the goods, Entity B's immutable ledger issues the requested token and enters a new entry on Entity B's immutable ledger, indicating that the goods have been picked up for distribution. Entity B delivers the goods to Entity C, and Entity B's immutable ledger 3804 sends a token issuance request for a portion of the goods (i.e., a portion of the token issued and stored on Entity B's immutable ledger 3804) to Entity C. Upon acceptance of the portion of the goods delivered, Entity C's immutable ledger 3807 issues the requested token and enters a new entry on Entity C's immutable ledger 3807, indicating that the portion of the goods have been accepted by Entity C. Entity C's immutable ledger 3807 further sends a token cancelation request to Entity A's immutable ledger 3801, whereupon Entity A's immutable ledger 3801 enters a new entry that the portion of goods was received by Entity C, and that that portion of the its originally issued token on Entity A's immutable ledger 3801 for production of the goods can be canceled, as that portion of the goods have been confirmed as delivered to Entity C. The token cancelation process follows through by having Entity A's immutable ledger issue a token cancelation request to Entity B's immutable ledger 3804, which sends a token cancelation request to Entity C's immutable ledger 3807. In this manner, a full accounting and tracking of the entirety of the produced goods and their distribution to various distributors and/or merchants is permanently recorded on three separate, private immutable ledgers, the trust and validity of each of which is ensured by the auditor's copies.

The above example shows a transaction involving a supply chain for production and sale of goods, but this process may be used for any trackable information for which a historical record is needed (e.g., a series of events, a checklist of items to complete, etc.). In the context of supply chains, for example, the token may simply represent the events of producing, shipping, and receiving the goods or a portion of the goods. For purposes of clarity, this simplified example above includes only three entities, but this process may be extended to any number of entities in a supply chain or any other chain of transactions or events. The process may be branched at any level, some connections may be bi-directional, and there may be cyclical processes.

Different processes or concepts may be used for issuance of tokens. In the supply chain example above, an original token is issued by the first entity in the transaction, and all or a portion of it is passed from one entity to the next, whereupon it is eventually returned to the first entity in the transaction to be canceled out (which may occur in parts if the token has been divided along the way). An original token would be the first record of a chain of transactions or events across one or more immutable ledgers, and may be either permanent or temporary. In other embodiments, each entity along the way issues and retains its own permanent tokens, and sends requests to other entities for issuance or cancelation of their own permanent tokens representing all of, or a portion of, the information contained in the token held by the requesting entity. Permanent tokens represent the generation of new trackable information and would not normally expire automatically (e.g., due to expiration of a time limit). In other embodiments, a first entity issues and retains its own permanent tokens, and sends requests to other entities for issuance or cancelation of their own temporary tokens representing all of, or a portion of, the information contained in the token held by the requesting entity. Temporary tokens represent information related to a permanent token, and do not represent new trackable information. Temporary tokens may be configured to expire automatically (e.g., due to expiration of a time limit). In yet other embodiments, a first entity issues and retains its own permanent tokens, and sends requests to other entities to record pointers in their immutable ledgers to all of, or a portion of, the permanent token(s) held by the first entity.

Note that it is not required that each entity create and maintain a separate immutable ledger. If a party in a transaction chain has an immutable ledger that is trusted by other parties in the transaction chain, the parties who trust the immutable ledger may simply rely on the trusted immutable ledger to record the transactions. Thus, in some cases, there may be only one immutable ledger in a chain of transactions (where the immutable ledger is trusted by all parties involved) or there may be any number of such immutable ledgers, where certain parties in the chain of transactions trust the immutable ledgers of some of the other parties, but not others.

Figure 39:
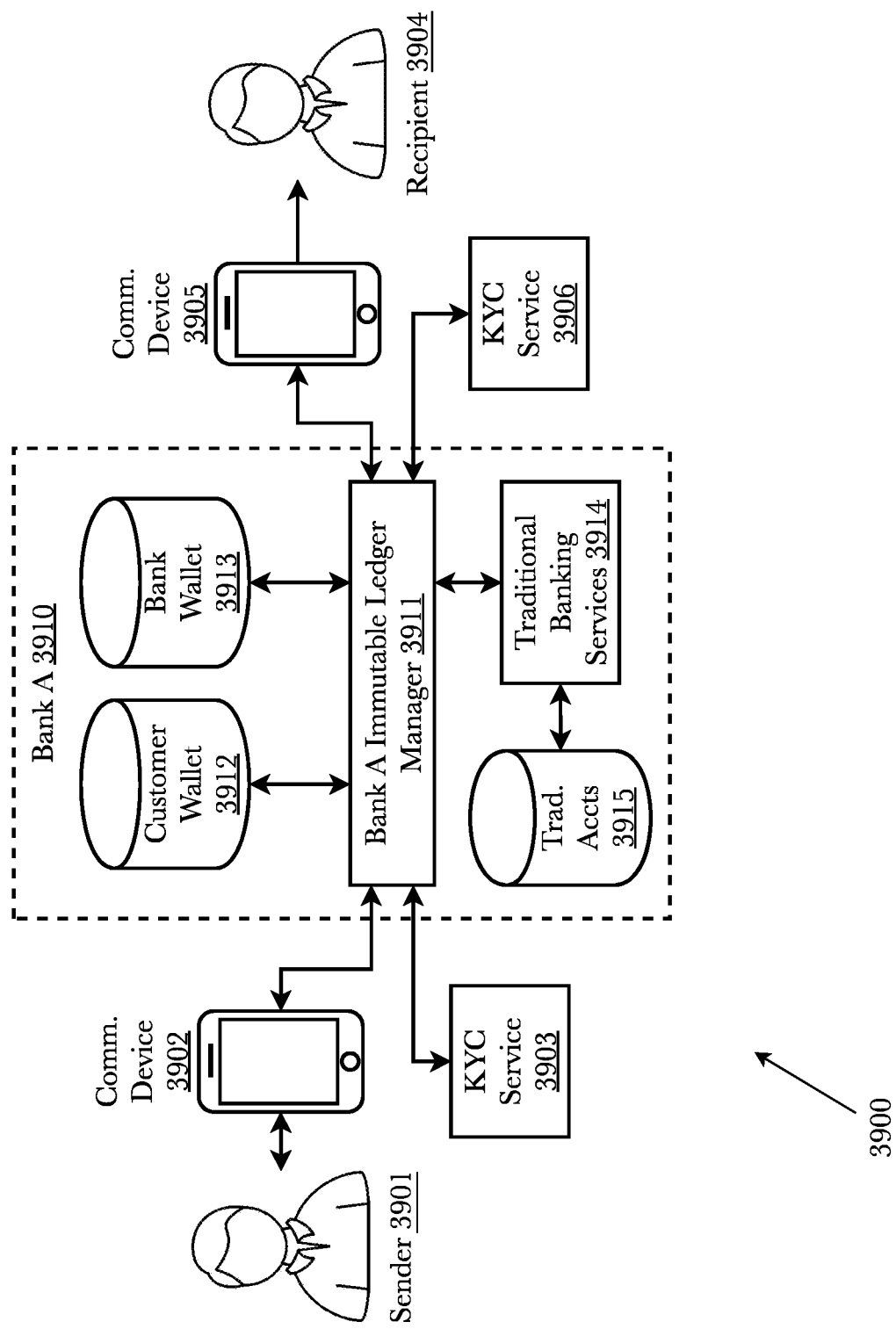
FIG. 39 is a block diagram showing an exemplary single bank implementation of a digital smart wallet communications platform.

FIG. 39 is a block diagram showing an exemplary single bank implementation 3900 of a digital smart wallet communications platform In this embodiment, a single bank 3910 acts as the intermediary between a sender 3901 and recipient 3904 in a transaction. The bank 3910 may have traditional banking services 3914 with traditional accounts 3915 holding money or securities. In addition to those traditional banking services 3914, the bank 3910 will have an immutable ledger manager 3911, configured to process digital smart wallet transactions. The immutable ledger manager 3911 is not required to be integrated with the bank's 3910 traditional banking services 3914 and accounts 3915, but such integration would very convenient to customers of the bank 3910, in that they could easily exchange digital currencies for real currencies. In this embodiment, the bank 3910 stores digital smart wallet information for its customers in a customer wallet database 3912, and may also have its own digital smart wallet or wallets stored in a bank wallet database 3913, which wallet or wallets may represent a pooled account of token values stored in the customers' wallets in the customer wallet database 3912. The bank may have one or more immutable ledgers to track transactions. For example, the bank 3910 may store separate immutable ledgers for each customer in the customer wallet database 3912 or may store a single immutable ledger for all of the bank's customers in the bank wallet database 3913. Other configurations and/or storage locations for the immutable ledger(s) are possible.

The sender 3901 initiates a transaction through his or her communication device 3902, which may be any computing device configurable to support digital smart wallets, the transaction request is received by Bank A's immutable ledger manager 3911, which confirms the identity of the sender 3901 and the validity of the transaction using a know your customer (KYC) or know your customer compliance (KYCC) service 3903 using the credentials contained in the sender's 3901 digital smart wallet stored in the customer wallet database 3912 at Bank A 3910. Bank A's immutable ledger manager 3911 then enters a new entry on its immutable ledger with a token value deduction from the token or tokens stored for the sender and a corresponding token value issuance in favor of the recipient 3904. Where the recipient 3904 is already a customer of the bank 3904 or already has a token or tokens on the bank's 3910 immutable ledger, the bank 3910 may simply notify the recipient 3904 of the new entry showing the token value issuance in favor of the recipient 3904. Where the recipient 3904 is not known to the bank, the bank 3910 may issue a notice to the recipient using information contained in the transaction request. When the recipient 3904 responds to the request, the bank's immutable ledger manager 3911 confirms the identity of the recipient 3904 and the validity of the transaction using a know your customer (KYC) or know your customer compliance (KYCC) service 3906 using the credentials contained in the recipient's response, which may be credentials from the recipient's digital smart wallet stored on the recipient's communication device 3905 or a digital smart wallet stored on a cloud-based service, etc. After confirmation of identity, the recipient 3904 is granted access to, and use of, the token value in his or her favor.

Note that in a single bank embodiment such as the one described here, no reciliation of other immutable ledgers is required (unless the bank's implementation has multiple internal immutable ledgers). Further, while this example shows a bank as an intermediary, the intermediary may be of any form capable of operating an immutable ledger manager and an immutable ledger. This may include the communications devices 3902, 3905 of the sender 3901 and/or the recipient 3904, in which case the transaction is made directly between the communication devices 3902, 3905 without an intermediary.

Figure 40:
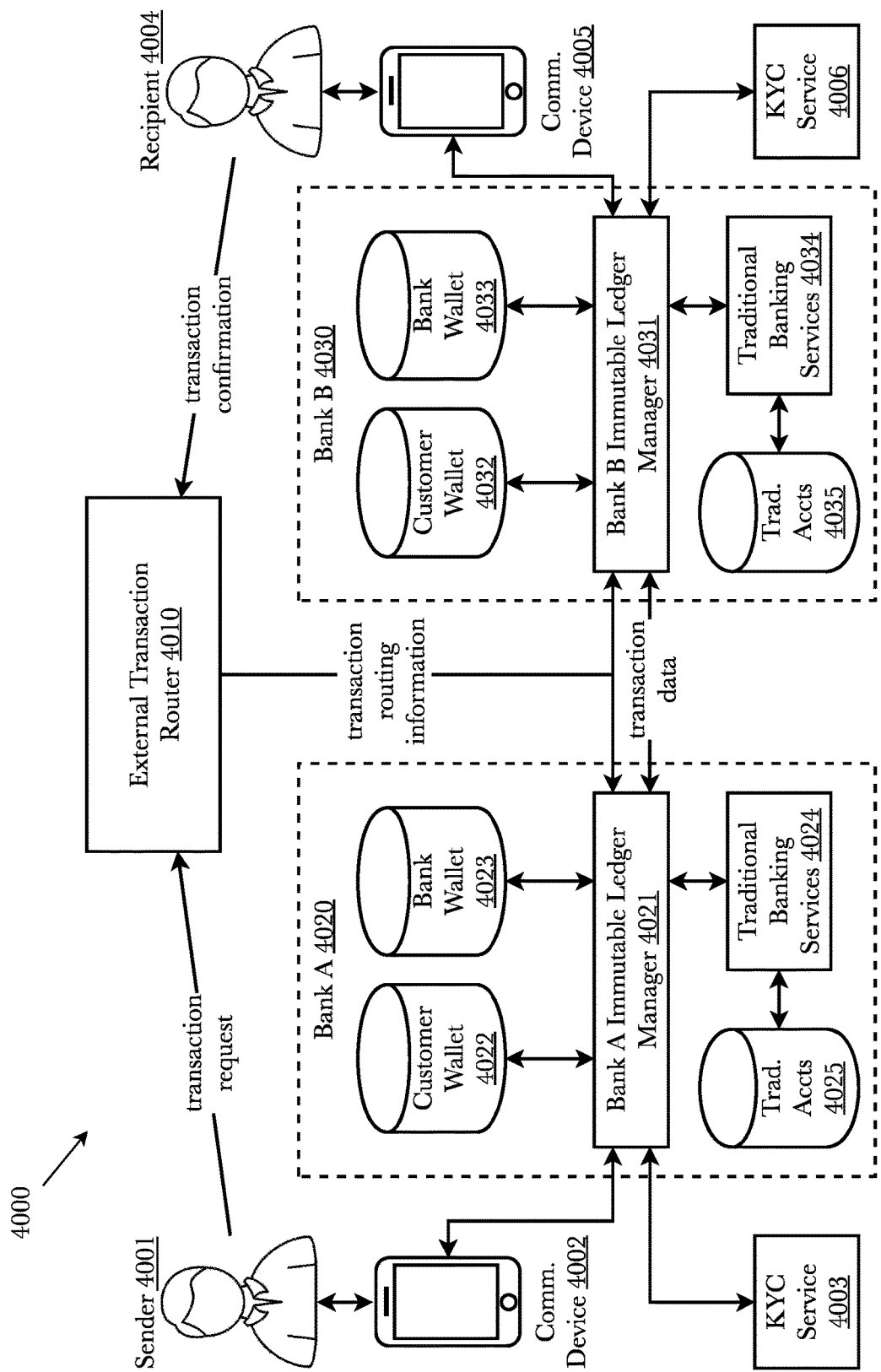
FIG. 40 is a block diagram showing an exemplary multiple bank implementation of a digital smart wallet communications platform.

FIG. 40 is a block diagram showing an exemplary multiple bank implementation 4000 of a digital smart wallet communications platform In this embodiment, two banks, Bank A 4020 and Bank B 4030 acts as intermediaries between a sender 4001 and recipient 4004 in a transaction with an external (e.g. cloud-based) transaction router 4010 coordinating the interactions between the sender 4001, the recipient 4002, and their banks 4020, 4030. The banks 4020, 4030 may have traditional banking services 4024, 4034 with traditional accounts 4025, 4035 holding money or securities. In addition to those traditional banking services 4024, 4034, the banks 4020, 4030 will have an immutable ledger managers 4021, 4031, configured to process digital smart wallet transactions. The immutable ledger managers 4021, 4031 are not required to be integrated with the banks' 4020, 4030 traditional banking services 4024, 4034 and accounts 4025, 4035, but such integration would very convenient to customers of the banks 4020, 4030, in that they could easily exchange digital currencies for real currencies. In this embodiment, the banks 4020, 4030 store digital smart wallet information for their customers in customer wallet databases 4025, 4035, and may also have their own digital smart wallet or wallets stored in bank wallet databases 4023, 4033, which wallet or wallets may represent a pooled account of token values stored in the customers' wallets in the customer wallet databases 4025, 4035. The banks 4020, 4030 may have one or more immutable ledgers to track transactions. For example, the banks 4020, 4030 may store separate immutable ledgers for each customer in the customer wallet databases 4025, 4035 or may store a single immutable ledger for each of their respective customers in the bank wallet databases 4023, 4033. Other configurations and/or storage locations for the immutable ledger(s) are possible.

In this example, Bank A 4020 has an immutable ledger containing tokens for sender 4001, and Bank B has an immutable ledger containing tokens for recipient 4004. Neither bank has access to the immutable ledger of the other, so the transaction is coordinated through an external transaction router 4010. The sender 4001 initiates a transaction through his or her communication device 4002, which may be any computing device configurable to support digital smart wallets. The transaction request is received by the external transaction router 4010, which logs the request and coordinates the transaction between Bank A 4020 and Bank B 4030 by routing wallet information of the sender 4001, the recipient 4004, and details of the transaction request to Bank A's immutable ledger manager 4021 and Bank B's immutable ledger manager 4031, both of which confirm the identity of their respective customers and the validity of the transaction using a know your customer (KYC) or know your customer compliance (KYCC) services 4003, 4006 using the credentials contained in the digital smart wallets stored in theirs customer wallet database 4022, 4032. The banks' immutable ledger managers 4021, 4031 then conduct the transaction directly between themselves, and send notifications of the completed transaction to the communication devices 4002, 4005 of the sender 4001 and recipient 4004. The communication device of the recipient 4004 sends a transaction confirmation to the external transaction router 4010, which logs the completion of the request.

In this embodiment, then, the transaction request information is kept separate from the transaction data. The external transaction router 4010 receives the transaction request information and routes the request along with wallet details to the appropriate banks, but does not have access to the details of the transaction data. The transaction is made between the banks and the transaction data are stored on the immutable ledgers of the banks, but not necessarily the transaction request information. Thus, the external transaction router 4010 keeps a record (which may also be an immutable ledger) of requests and routing details, while the immutable ledger managers of the banks 4021, 4031 keep records of the transaction data. Stated another way, the external transaction router 4010 facilitates the transaction between the banks 4020, 4030, but is not privy to the actual details of the transaction. This separation of the routing function from the actual transaction both speeds up the transaction process by decentralizing the transaction process (i.e., the routing is centralized, but the transactions are not), and provides an additional layer of security because the transaction data are not stored in a central location.

Note that the multiple bank embodiment such as the one described here, no reciliation of the immutable ledgers between Bank A 4020 and Bank B 4030 is required. It is sufficient that each bank updates its own immutable ledger as the wallets of both the sender 4001 and recipient 4004 will each contain appropriate pointers to the tokens on each immutable ledger. Further, while this example shows banks as intermediaries, the intermediary may be of any form capable of operating an immutable ledger manager and an immutable ledger. This may include the communications devices 4002, 4005 of the sender 4001 and/or the recipient 4004, in which case the transaction is made directly between the communication devices 4002, 4005 without an intermediary.

Figure 41:
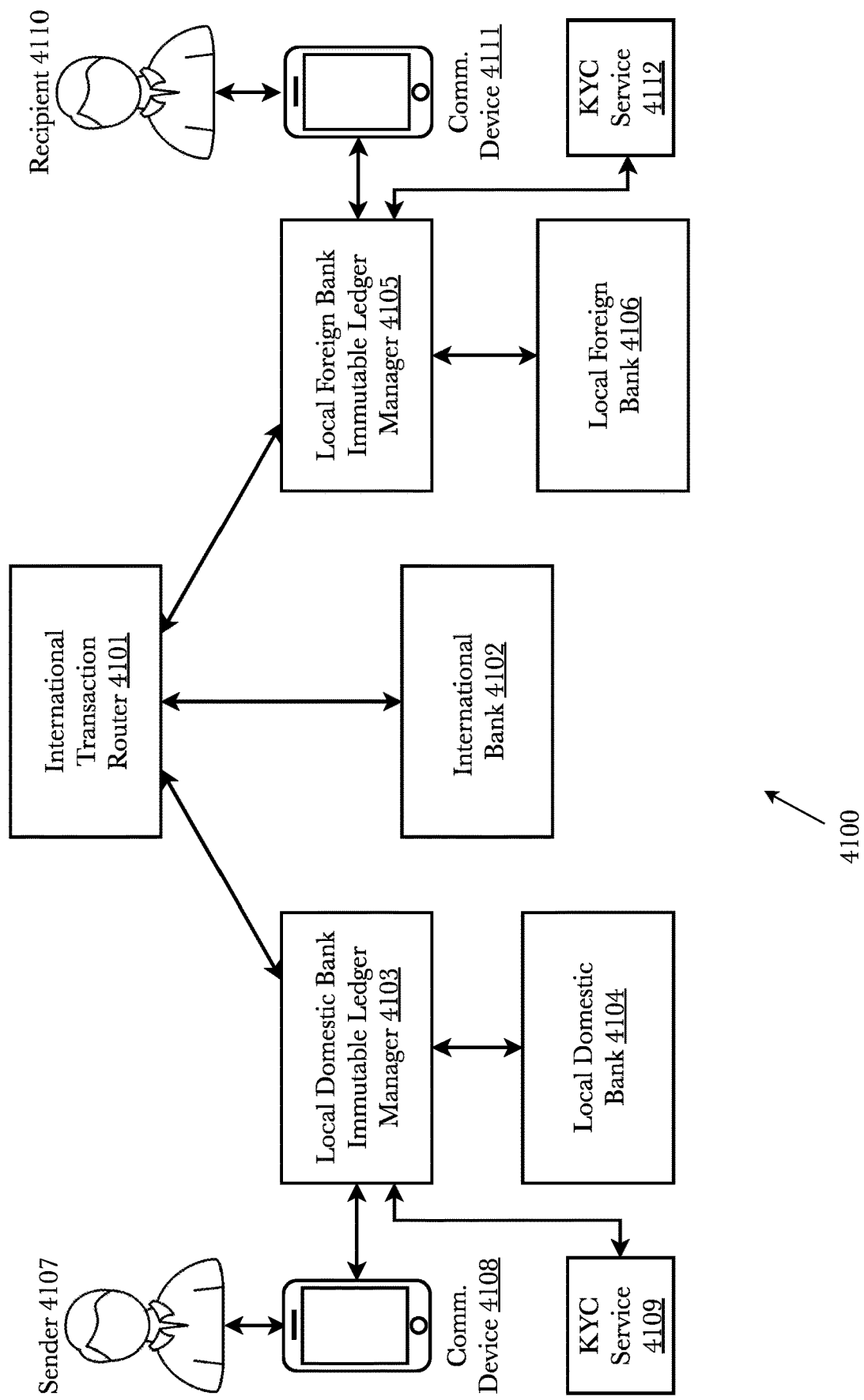
FIG. 41 is a block diagram showing an exemplary international multiple bank implementation of a digital smart wallet communications platform wherein an international bank provides foreign currency exchange.

FIG. 41 is a block diagram showing an exemplary international multiple bank implementation 4100 of a digital smart wallet communications platform wherein an international bank provides foreign currency exchange. In this embodiment, a local domestic bank 4104 and a local foreign bank 4106 act as intermediaries between a sender 4107 and recipient 4110 in a transaction with a third bank (here an international bank capable of making foreign currency exchanges) 4102 acting as an intermediary between the local domestic bank 4014 and the local foreign bank 4106.

When the sender 4107 initiates a transaction through his or her communication device 4108, which may be any computing device configurable to support digital smart wallets, the transaction request is received by the local domestic bank's immutable ledger manager 4103, which confirms the identity of the sender 4107 and the validity of the transaction using a know your customer (KYC) or know your customer compliance (KYCC) service 4109 using the credentials contained in the sender's 4107 digital smart wallet. The local domestic bank's immutable ledger manager 4103 then enters a new entry on its immutable ledger with a token value deduction from the token or tokens stored for the sender and a corresponding token value issuance in favor of the recipient 4110. The local domestic bank's immutable ledger manager 4103 then send a token distribution notification to the international transaction router 4101, which coordinates a foreign currency exchange with the international bank 4102 which may also have an immutable ledger (not shown), and sends a token distribution request for the exchanged value of the token to the foreign bank immutable ledger manager 4105.

In this example, the sender 4107 is not known to the local foreign bank 4106, so the foreign bank's immutable ledger manager 4105 confirms the identity of the sender 4107 and the validity of the transaction using a know your customer (KYC) or know your customer compliance (KYCC) service 4112 using the credentials contained in the sender's token distribution notification, which may be credentials from the sender's digital smart wallet stored on the sender's communication device 4002 or a digital smart wallet stored on a cloud-based service, etc. After confirmation of identity, the exchanged value of the tokens from sender 4107 is entered as a new entry on foreign bank's 4105 immutable ledger in favor of recipient 4004, and notification is sent to the recipient's communication device 4111. In some embodiments, the immutable ledger of the local foreign bank will simply contain a pointer to the token stored on the immutable ledger of the local domestic bank in favor of recipient, and not an actual shift or transfer of token value.

Note that, in this embodiment where there is a foreign currency exchange requirement, settlement between the immutable ledgers of the local domestic bank 4104 and the local foreign bank 4106 may be required. Such a settlement is coordinated by the international immutable ledger 4101, and may be stored as an third immutable ledger kept by the international bank 4102.

Figure 42:
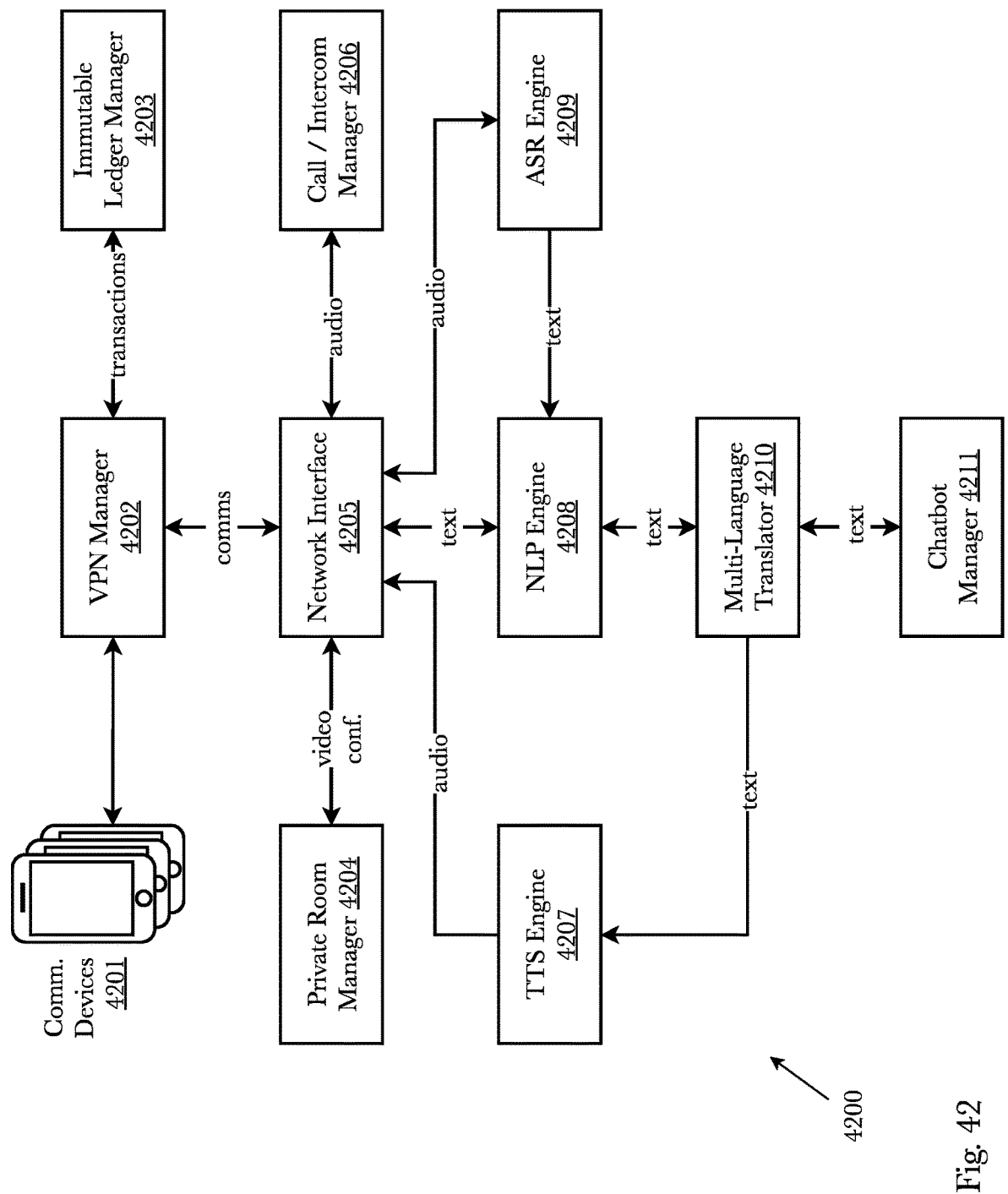
FIG. 42 is a block diagram showing an exemplary system architecture for a communications integration and automation platform.

FIG. 42 is a block diagram showing an exemplary system architecture 4200 for a communications integration and automation platform. This system allows for person-to-person communications, but also allows for automated person-to-device, device-to-person, and device-to-device communications. Of particular utility is the ability of this system to perform automated digital smart wallet transactions without the input of the users of the devices. In this embodiment, the system comprises a virtual private network (VPN) manager or client 4202, an immutable ledger manager 4203, a network interface 4205, a private room manager 4204, a call/intercom manager 4206, a text to speech (TTS) engine, a natural language processing (NLP) engine 4208, an automated speech recognition (ASR) engine 4209, a multi-language translator 4210, and a chatbot manager 4211. The system is accessed by, and coordinates the interactions of, a plurality of communications devices 4201.

The VPN manager establishes a virtual private network among the various communications devices 4201. As communications (including transaction requests) are received by a communications device through the VPN, transactions are separated out and sent to an immutable ledger manager 4203, which updates an immutable ledger to reflect the transaction by creating a new entry on the immutable ledger showing a reduction in value of the token from the wallet associated with the sending device and a corresponding increase in value of the token from the wallet associated with the receiving device. A notification of the new entry on the immutable ledger is sent via the VPN back to the communication devices 4201 involved in the transaction.

Other types of communications are sent to a network interface 4205, which routes audio, video, and text communications to other components of the system. Video conference requests between communication devices 4201 are routed to a private room manager 4204 which establishes a private video conference through the VPN among communication devices 4201 participating in the video conference. Audio to audio communication requests are sent to call/intercom manager 4206 which establishes audio communications through the VPN between participating communication devices 4201. The audio communications may be on different types of audio networks (e.g., one device may be on a cellular network, which the other device is using a voice-over-Internet-protocol (VOIP) audio connection). Audio to text communications (e.g., a voicemail to be translated to a text message) are sent to an ASR engine 4209 and the resulting text is forwarded to an NLP engine 4208 for further processing. Text, whether direct from a text message or converted by the ASR engine 4209 is sent to a natural language processing engine 4208 to determine the context and meaning of the text such that an appropriate response can be formulated. Where the communication devices 4201 involved in the communication operate in different languages, the text may be translated from one language to another using a multi-language translator 4210.

Finally, the text is sent to a chatbot manager 4211 for formulation of a response. When text is received by the chatbot manager 4211 from a sending device to a recipient device, the chatbot manager 4211 determines from the output of the NLP engine 4208 whether a response is needed, and if so, what kind of response. It formulates an appropriate text response (using the NLP engine 4208, where necessary), and sends a response back to the receiving device, answering the text communication sent by the sending device. Where the sending device is communicating by text (e.g., text message) and the receiving device expects an audio response (e.g., voicemail) the response text is sent through a TTS engine 4207 to convert the text of the response to audio for receipt by the receiving device.

Figure 43:
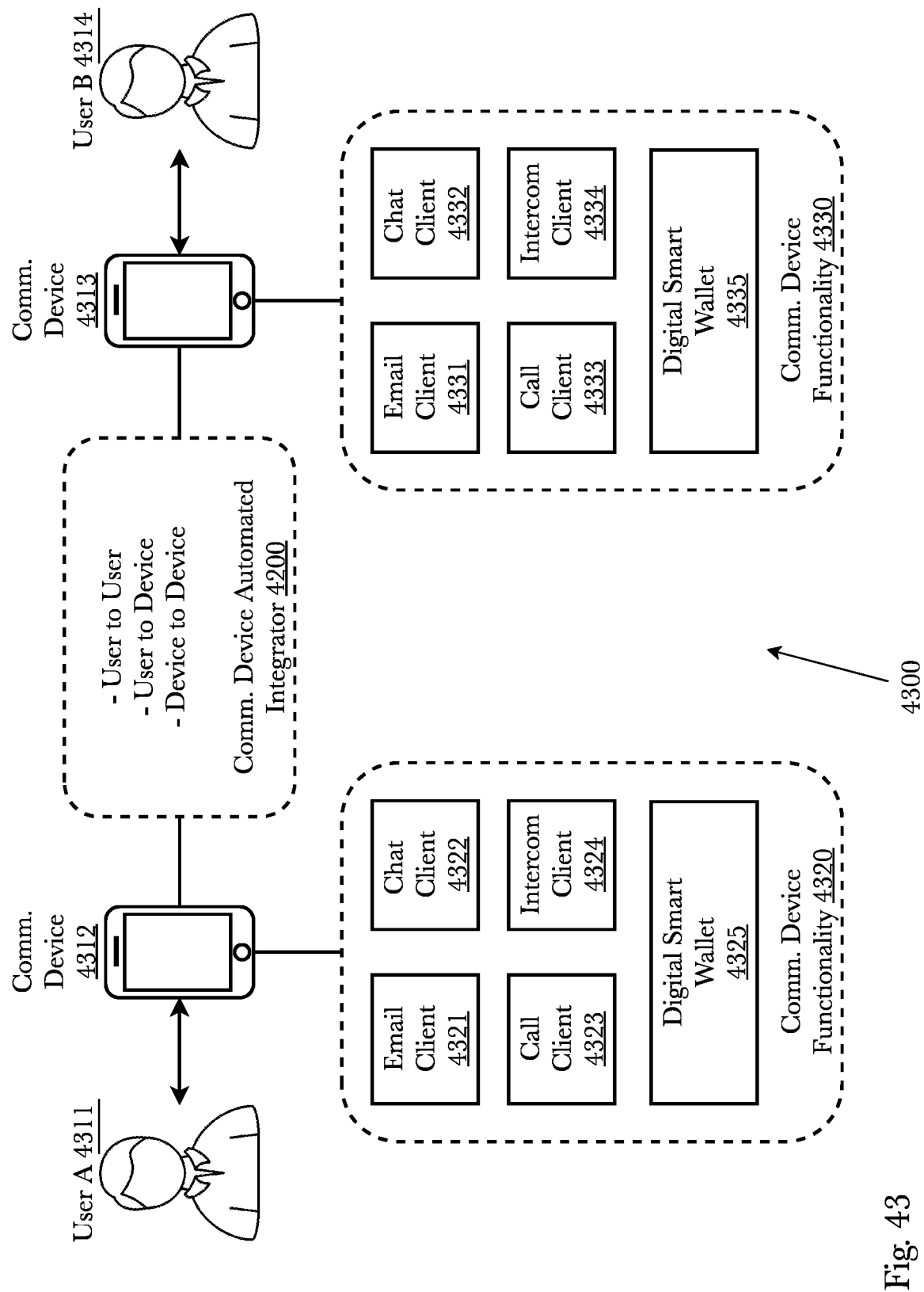
FIG. 43 is a is a block diagram showing exemplary communication device functionality and communication pathways for a communications integration and automation platform.

FIG. 43 is a a is a block diagram showing exemplary communication device functionality and communication pathways 4300 for a communications integration and automation platform. As described previously, the communications integration and automation platform 4200 allows for person-to-person communications, but also allows for automated person-to-device, device-to-person, and device-to-device communications, and the ability to perform automated digital smart wallet transactions without the input of the users of the devices. In some embodiments, these functions will be facilitated by applications and services installed on each communication device connected to the system. In this example, the communications of user A 4311 using communication device 4312 with user B 4314 using communication device 4313 are facilitated by communication device functionalities 4320, 4330 operating on each device as application or services, including email clients 4321, 4331, chat clients 4322, 4332, call clients 4323, 4333, intercom clients 4324, 4334, and digital smart wallets 4325, 4335. Each of these sets of communication device functionalities 4320, 4330 may be configured to operated manually, or be configured to automatically respond to other devices through the communications integration and automation platform 4200, which facilitates their interaction. In some embodiments, the communications integration and automation platform 4200 may formulate the response, but in other embodiments, each individual functionality (email clients 4321, 4331, chat clients 4321, 4332, call clients 4323, 4333, intercom clients 4324, 4334, and digital smart wallets 4325, 4335 may be programmed with its own version of the communications integration and automation platform 4200, allowing it to automatically receive and formulate responses.

As an example, user A 4311 may establish an automatic monthly payment to user B 4314. Each month on the specified date, the digital smart wallet 4325 on user A's 4311 communication device 4312 will send a transaction request through the communications integration and automation platform 4200 to make the payment to user B 4313. The communications integration and automation platform 4200 will coordinate the transfer with the digital smart wallet 4335 on user B's 4314 communication device 4313, and the transfer will be made without any input from either user A 4311 or user B 4314.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 44:
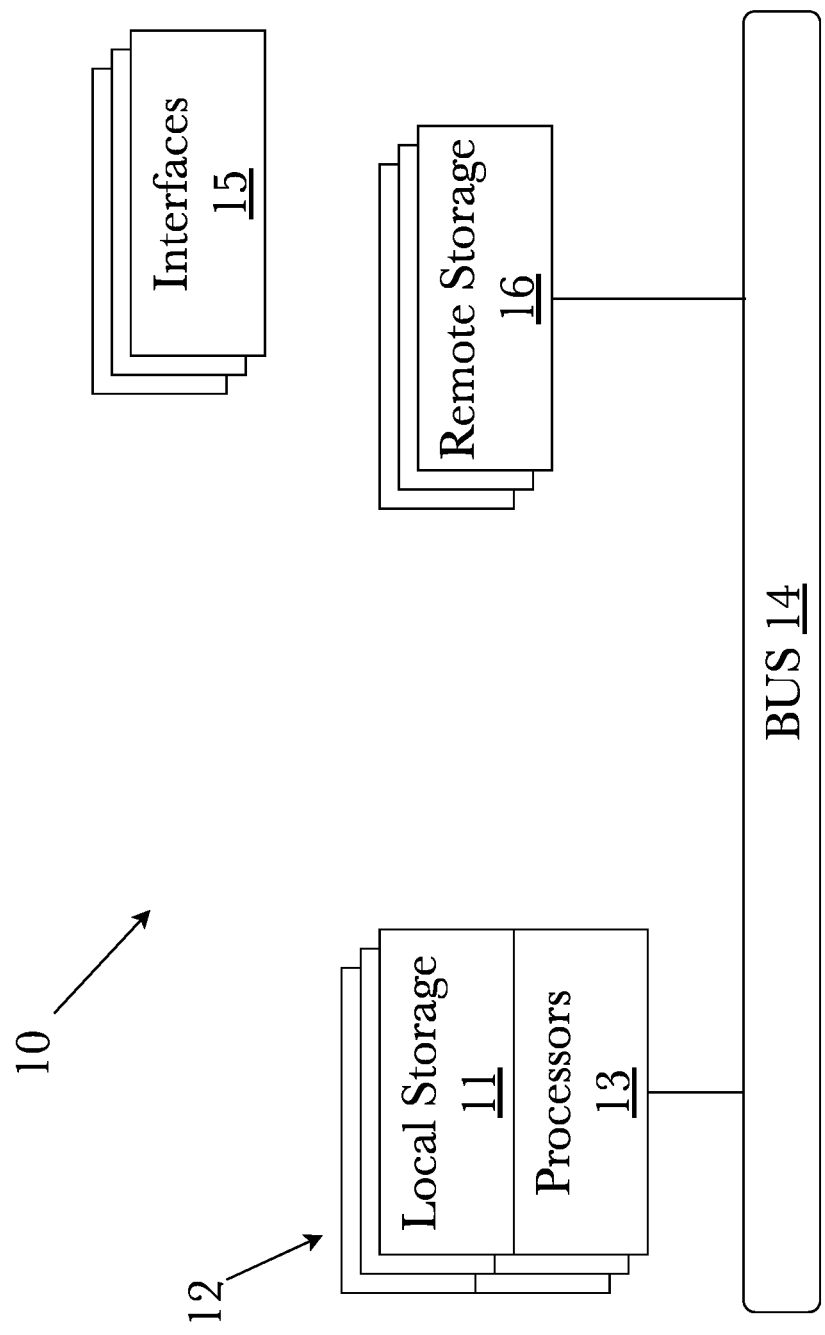
FIG. 44 is a block diagram illustrating an exemplary hardware architecture of a computing device.

Referring now to FIG. 44, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 44 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 45:
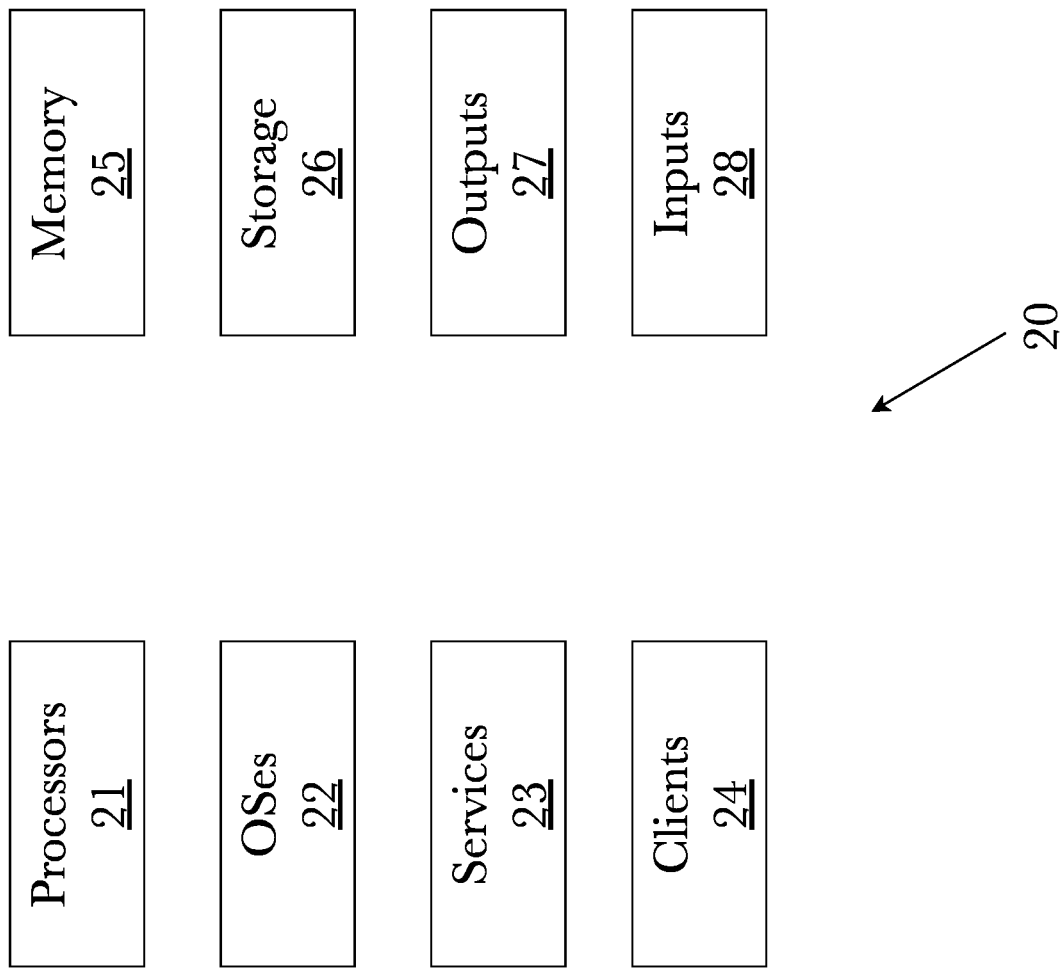
FIG. 45 is a block diagram illustrating an exemplary logical architecture for a client device.

In some aspects, systems may be implemented on a standalone computing system. Referring now to FIG. 45, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 44). Examples of storage devices 26 include flash memory, magnetic hard drive, CD-ROM, and/or the like.

Figure 46:
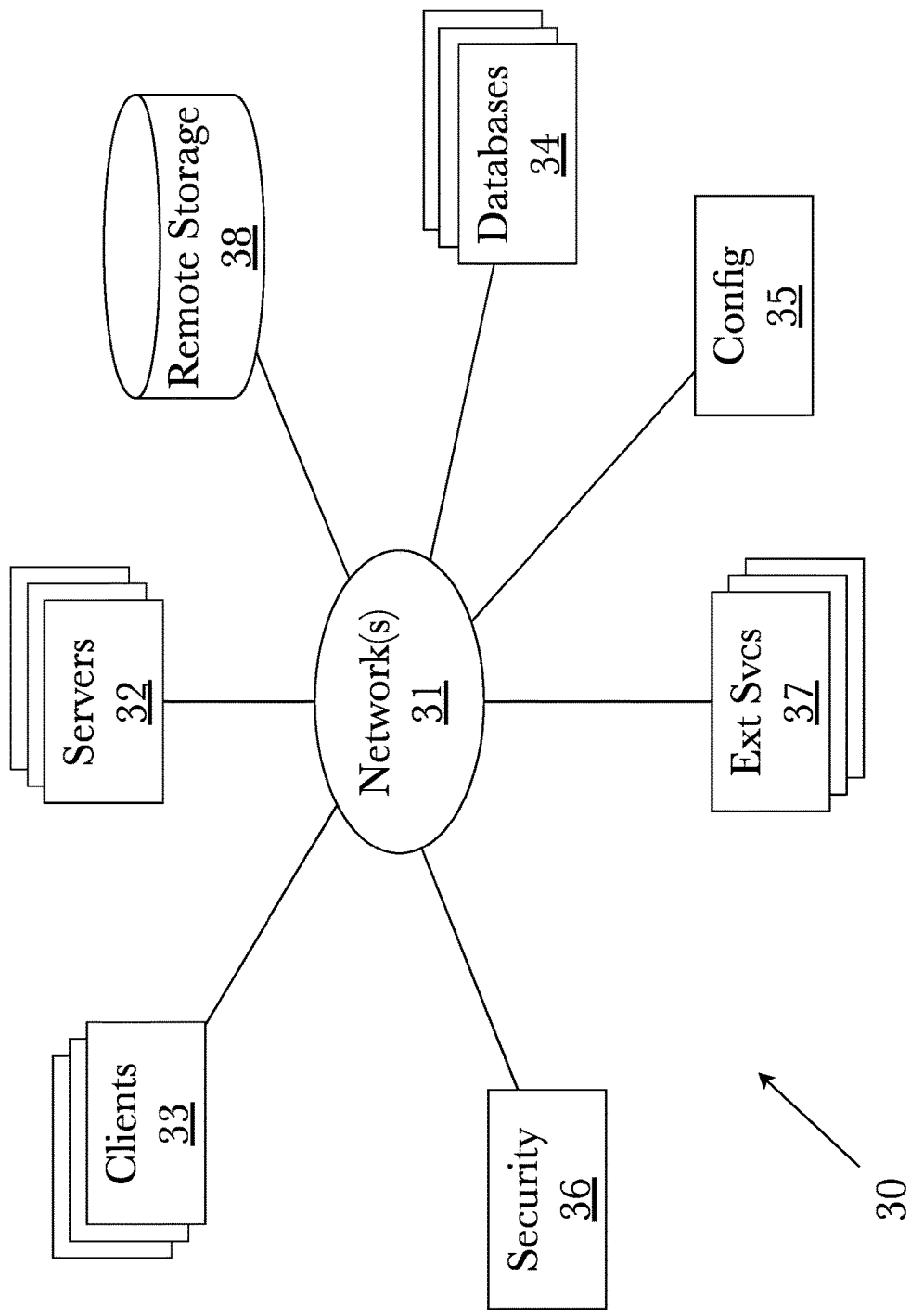
FIG. 46 is a block diagram showing an exemplary architectural arrangement of clients, servers, and external services.

In some aspects, systems may be implemented on a distributed computing network, such as one having any number of clients and/or servers. Referring now to FIG. 46, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 45. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 47:
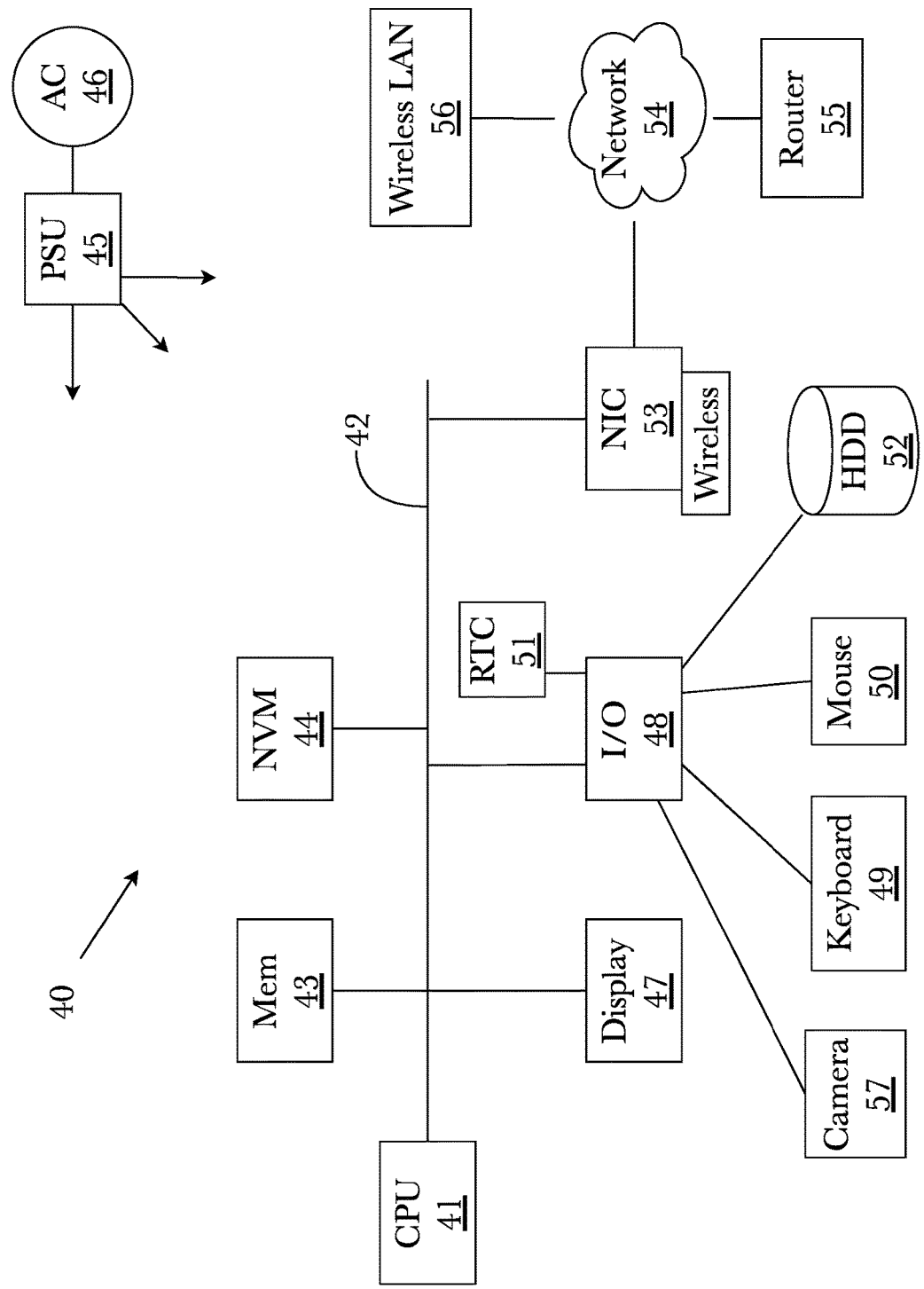
FIG. 47 is another block diagram illustrating an exemplary hardware architecture of a computing device.

FIG. 47 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. MC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for digital smart wallet transactions, comprising:
a first immutable ledger manager, comprising a first immutable ledger and a first plurality of programming instructions stored in a memory of, and operating on a processor of, a first computing device, wherein the plurality of programming instructions, when operating on the processor, cause the first computing device to:
complete a transaction corresponding to a transaction request with a second immutable ledger manager;
record the transaction on the first immutable ledger; and
send a notification of recordation of the transaction on the first immutable ledger to a transaction router;
the second immutable ledger manager, comprising a second immutable ledger and a second plurality of programming instructions stored in a memory of, and operating on a processor of, a second computing device, wherein the plurality of programming instructions, when operating on the processor, cause the second computing device to:
complete the transaction corresponding to the transaction request with the first immutable ledger manager;
record the transaction on the second immutable ledger; and
send a notification of recordation of the transaction on the second immutable ledger to the transaction router;
the transaction router comprising a third immutable ledger and a third plurality of programming instructions stored in a memory of, and operating on a processor of, a third computing device, wherein the first plurality of programming instructions, when operating on the processor, cause the third computing device to:
receive the transaction request from a sender, the transaction request comprising:
instructions to transfer a token to a recipient;
digital smart wallet information for the sender; and
digital smart wallet information for the recipient;
record the transaction request in the third immutable ledger;
route the transaction request to the first immutable ledger manager and the second immutable ledger manager;
receive the notification of recordation from each of the first immutable ledger manager and the second immutable ledger manager; and record a completion of the transaction request in the third immutable ledger; and a distributed immutable ledger for auditing the first and second immutable ledgers, the distributed immutable ledger comprising at least one copy of each of the first and second immutable ledgers wherein a cryptographic hash of the copy of each immutable ledger must match the original of the ledger to which it corresponds prior to creation of a new entry on the original of the ledger.

2. The system of claim 1, wherein the means for auditing of the first and second immutable ledgers is a testing of a cryptographic hash of each ledger against a stored cryptographic hash of that ledger.

3. A system for digital smart wallet transactions, comprising:

an immutable ledger manager comprising a first plurality of programming instructions stored in a memory of, and operating on a processor of, a first computing device, wherein the first plurality of programming instructions, when operating on the processor, cause the first computing device to:

receive a transaction request from a sender;

issue a token distribution request based on the transaction request to a first immutable ledger holding a token or tokens for the sender, the token distribution request comprising instructions to enter a new transaction on the first immutable ledger in favor of a recipient in the amount of the token value;

receive a token distribution confirmation from the first immutable ledger;

notify the sender of the token distribution confirmation from the first immutable ledger;

send a token issuance request to a second immutable ledger, the token issuance request comprising instructions to enter a new transaction on the second immutable ledger in favor of the recipient in the amount of the token value;

receive a token distribution confirmation from the second immutable ledger; and notify the recipient of the token distribution confirmation from the second immutable ledger; and a distributed immutable ledger for auditing the first and second immutable ledgers, the distributed immutable ledger comprising at least one copy of each of the first and second immutable ledgers wherein a cryptographic hash of the copy of each immutable ledger must match the original of the ledger to which it corresponds prior to creation of a new entry on the original of the ledger.

4. The system of claim 3, wherein the means for auditing of the first and second immutable ledgers is a testing of a cryptographic hash of each ledger against a stored cryptographic hash of that ledger.

5. A method for digital smart wallet transactions, comprising the steps of:

receiving a transaction request from a sender;

issuing a token distribution request to a first immutable ledger holding a token or tokens for the sender, the token distribution request comprising instructions to enter a new transaction on the first immutable ledger in favor of a recipient in the amount of the token value;

receiving a token distribution confirmation from the first immutable ledger;

notifying the sender of the token distribution confirmation from the first immutable ledger;

sending a token issuance request to a second immutable ledger, the token issuance request comprising instructions to enter a new transaction on the second immutable ledger in favor of the recipient in the amount of the token value;

receiving a token distribution confirmation from the second immutable ledger; and notifying the recipient of the token distribution confirmation from the second immutable ledger; and providing a means for auditing of the first and second immutable ledgers, wherein the means for auditing of the first and second immutable ledgers is a distributed immutable ledger comprising at least one copy of each of the first and second immutable ledgers wherein a cryptographic hash of the copy of each immutable ledger must match the original of the ledger to which it corresponds prior to creation of a new entry on the original of the ledger.

6. The method of claim 5, wherein the means for auditing of the first and second immutable ledgers is a testing of a cryptographic hash of each ledger against a stored cryptographic hash of that ledger.

* * * * *